(12) United States Patent
Kissa et al.

(10) Patent No.: US 7,408,693 B2
(45) Date of Patent: Aug. 5, 2008

(54) ELECTRO-OPTIC DEVICE

(75) Inventors: Karl Kissa, West Simsbury, CT (US);
Gregory J. McBrien, Glastonbury, CT (US); Glen Drake, Windsor, CT (US);
William J. Minford, Windsor, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/932,356

(22) Filed: Oct. 31, 2007

(65) Prior Publication Data

US 2008/0069491 A1  Mar. 20, 2008

Related U.S. Application Data

(63) Continuation-in-part of application No. 11/189,449, filed on Jul. 26, 2005, now Pat. No. 7,324,257.

(60) Provisional application No. 60/884,653, filed on Jan. 12, 2007, provisional application No. 60/591,458, filed on Jul. 27, 2004.

(51) Int. Cl.
*G02F 1/035* (2006.01)
*G02F 1/03* (2006.01)

(52) U.S. Cl. .......................... 359/245; 385/2

(58) Field of Classification Search ............ 359/245, 359/251–252, 254, 315; 385/1–3, 40, 129–132
See application file for complete search history.

(56) References Cited

U.S. PATENT DOCUMENTS

| | | | |
|---|---|---|---|
| 5,339,369 A | 8/1994 | Hopfer et al. ................ 385/2 |
| 5,388,170 A | 2/1995 | Heismann et al. ............. 385/4 |
| 6,195,191 B1 | 2/2001 | Osenback et al. ........... 359/238 |
| 6,449,080 B1 | 9/2002 | McBrien et al. ............. 359/245 |
| 6,558,585 B1 | 5/2003 | Zhang et al. ............... 264/1.27 |
| 6,560,377 B2 | 5/2003 | Jones et al. .................... 385/2 |
| 6,583,480 B1 * | 6/2003 | Nagata et al. ............... 257/432 |
| 6,583,917 B2 | 6/2003 | Melloni et al. ............. 359/245 |
| 6,646,776 B1 | 11/2003 | Cheung et al. ............. 359/254 |
| 6,674,565 B2 | 1/2004 | Kondo et al. ................ 359/322 |
| 6,819,851 B2 | 11/2004 | Aoki et al. .................. 385/129 |
| 6,853,757 B2 | 2/2005 | Seino ............................ 385/2 |

(Continued)

FOREIGN PATENT DOCUMENTS

EP  0 813 093  12/1997

OTHER PUBLICATIONS

Oh et al, "Recent Advances in Electrooptic Polymer Modulators Incorporating Highly Nonlinear Chromophore", IEEE J. Quantum Electron., vol. 7, No. 5, pp. 826, 2001.

*Primary Examiner*—Scott J. Sugarman
*Assistant Examiner*—Dawayne A Pinkney
(74) *Attorney, Agent, or Firm*—Allen, Dyer, Doppelt, Milbrath & Gilchrist, P.A.

(57) ABSTRACT

The invention relates to an electro-optic modulator structure containing an additional set of bias electrodes buried within the device for applying bias to set the operating point. Thus the RF electrodes used to modulate incoming optical signals can be operated with zero DC bias, reducing electrode corrosion by electro-migration, galvanic, and other effects that can be present in non-hermetic packages. The RF electrodes are supported by a first surface of the electro-optic substrate, while the bias electrodes are supported by a second opposite surface.

25 Claims, 51 Drawing Sheets

U.S. PATENT DOCUMENTS

| | | | |
|---|---|---|---|
| 6,867,134 B2 | 3/2005 | Chen et al. | 438/686 |
| 6,978,056 B2 | 12/2005 | Tavlykaev | 385/2 |
| 7,231,102 B2 | 6/2007 | Ridgway | 385/9 |
| 2001/0008569 A1 | 7/2001 | Rangary | 385/3 |
| 2003/0062551 A1 | 4/2003 | Chen | 257/211 |
| 2003/0103709 A1 | 6/2003 | Grinberg et al. | 385/2 |
| 2004/0086229 A1 | 5/2004 | Ahn et al. | 385/40 |
| 2005/0226547 A1* | 10/2005 | Ridgway | 385/2 |
| 2006/0228064 A1 | 10/2006 | Hunt et al. | 385/2 |
| 2007/0146859 A1 | 6/2007 | Yang et al. | 359/237 |
| 2007/0147725 A1 | 6/2007 | Crespi et al. | 385/9 |

* cited by examiner

ELECTRO-OPTIC DEVICE

CROSS-REFERENCE TO RELATED APPLICATIONS

This application is a continuation-in-part of U.S. patent application Ser. No. 11/189,449 filed on Jul. 26, 2005 now U.S. Pat. No. 7,324,257, which claims priority from U.S. Prov. Pat. Appl. No. 60/591,458 filed Jul. 27, 2004, both of which are hereby incorporated by reference for all purposes. This application, also, claims priority from U.S. Prov. Pat. Appl. No. 60/884,653 filed Jan. 12, 2007 which is hereby incorporated by reference for all purposes.

TECHNICAL FIELD

The present invention relates generally to electro-optic devices and, more specifically, to electro-optic devices used in fiber-optic telecommunications.

BACKGROUND OF THE INVENTION

Fiber-optic telecommunications systems including a laser diode, an external modulator and a photodetector diode are well-known in the field for transmitting optical signals over optical fiber or similar optical waveguides. Chromatic dispersion in optical fiber tends to make the achievable transmission distance of fiber optic communications systems dependent on the modulation rate and the modulation chirp parameter. External modulators, when used to modulate the continuous wave (CW) input optical power from the laser, permit the modulation chirp parameter to be adjusted to a substantially fixed value in a predetermined, controllable manner, thereby minimising the transmission power penalty caused by chromatic dispersion.

External modulation is accomplished, for example, in a dual waveguide device wherein substantially identical input optical beams are supplied to the waveguides and wherein each waveguide is subject to its own individual control. Modulation signals are applied to each waveguide via the separate control. Moreover, control signals are applied to each waveguide for adjusting the modulation chirp parameter to a desired non-zero substantially fixed value.

Typical high-speed electro-optical external modulators use a traveling-wave electrode structure to form a microwave transmission line in the vicinity of the optical waveguide. A microwave signal co-propagates with an optical signal for a prescribed distance, thereby achieving the required optical modulation. To prevent velocity mismatch between the microwave signal and the optical signal in a traveling wave modulator, a thick buffer layer is provided on a wafer to speed up the propagation of the microwave signal. More specifically, the thick buffer layer provides a substantially dielectric medium through which the microwave energy can be distributed. Previously, a silicon dioxide ($SiO_2$) buffer layer was created through known techniques such as electron beam, sputtering, or chemical vapor deposition (CVD). The buffer layer may be planarized throughout the wafer or may be patterned with electrode structures.

Using a $SiO_2$ buffer layer has numerous advantages. A $SiO_2$ buffer layer is produced by devices such as evaporators, sputtering machines, gas supply machines or CVD machines which permit very precise control layer thickness and/or composition. Both of these parameters influence the velocity of propagation of the electrical RF signal as well as the optical signal in the waveguide.

For many applications such as high-speed telecommunications systems, it is important to achieve a high modulation efficiency, which is generally measured in terms of the magnitude voltage $V_\pi$ (sometimes denoted $V_{pi}$) which needs to be applied to the modulator electrodes to achieve an optical phase shift of $\pi$ (pi). Typical design targets are 5 volts or less, however this may vary from manufacturer to manufacturer. Lithium niobate ($LiNbO_3$) is an electro-optic material which can meet this design criterion.

Lithium niobate ($LiNbO_3$) is used in two main crystallographic orientations: X-cut and Z-cut. The term X-cut or Z-cut $LiNbO_3$ refers to $LiNbO_3$ that is cut perpendicular to the X- or Z-crystallographic orientation respectively. The Y-cut is crystallographically equivalent to X-cut and therefore is covered in all descriptions where X-cut is treated.

Most applications require very stable operation of the electro-optical modulator over time and through changes in temperature, humidity and other environmental conditions. In other words, the operating (bias) point of the modulator should remain constant. The operating point of the modulator is controlled via a low frequency or DC bias voltage. The high-frequency modulation signal may be superimposed on the low frequency or DC bias voltage and applied to the RF electrodes, or may be applied to separate bias electrodes.

$LiNbO_3$ is sensitive to temperature changes because the pyroelectric effect in $LiNbO_3$ creates mobile charge as a result of temperature changes within the device. The mobile charges can generate strong electric fields during normal operation of the device. Such strong electric fields are problematic because they can change the operating (bias) point of an electro-optic modulator, such as a Mach-Zehnder Interferometer (MZI), by creating fields across the waveguides that do not match one another. In addition, these strong electric fields can cause time dependent or uncontrolled charge dissipation, which may result in a loss of transmitted data. These fields may also cause arcing, which may also result in a loss of transmitted data.

There are methods known in the art for bleeding off pyroelectric charge. For example, in Z-cut substrates the pyroelectrically generated electric fields are generated in a direction perpendicular to the modulator plane. Some prior art devices use a metal oxide or semiconductor layer that is formed on top of the thick buffer layer to bleed off pyroelectric charge through a conductive path to the bottom of the device. Both amorphous and polycrystalline-silicon (poly-Si) semiconductor layers have been used to bleed off pyroelectric charge. A diffusion-suppressing layer is sometimes included to prevent the metal electrodes from diffusing into the semiconductor bleed-off layer.

Other prior art devices use a conductive layer on the bottom of the device that is electrically connected with the ground electrodes to provide a discharge path. In these devices, charge accumulating on the hot electrode can find a path to ground through the driver or biasing electronics.

A problem associated with $LiNbO_3$ modulators is the charge generation and charge redistribution that can occur in the buffer when a bias voltage is applied to an electrical input of a $LiNbO_3$ Mach-Zehnder interferometric modulator. More specifically, the bias voltage, applied to control the operating point of the Mach-Zehnder interferometer, can cause the formation of mobile charges, in the form of either electrons, holes, or ions in the buffer. These mobile charges either counteract the effect of the applied voltage by establishing a positive DC drift, or enhance the applied bias voltage by establishing a negative DC drift. Positive drift is particularly problematic because the voltage required to maintain the bias condition will steadily increase ("run away") causing a control system reset to occur, which will result in loss of data.

There are methods known in the art for reducing DC drift.

Prior art designs in U.S. Pat. Nos. 5,404,412 and 5,680,497 reduce the effect of the buffer layer charging by doping the buffer layer, causing it to be more conductive. The added conductivity in essence shorts out the buffer layer, preventing the buffer layer from charging up. Accordingly, a slowly varying voltage applied to the gold electrodes is able to control the bias point of a Mach-Zehnder Interferometer over time. Alternatively, designs for x-cut lithium niobate may have a separate electrically isolated low frequency bias electrode, optically in series with the RF electrode. This separate bias electrode does not have a buffer layer between the electrode and substrate, eliminating problems associated with the buffer layer, however it does increase the length of the device.

Designs for z-cut lithium niobate with separate bias electrodes are shown in U.S. Pat. No. 5,359,449. Z-cut lithium niobate electrode designs (bias or RF) typically require a buffer layer, as the electrodes must always be positioned over the waveguide. In some prior art lithium niobate designs, bias control is achieved with a separate bias electrode made of an optically transparent conductor, such as Indium Tin Oxide (ITO), placed on top of the waveguide.

Note that typically the entire device is usually placed in a hermetic package to prevent moisture from reaching the electrodes.

U.S. Pat. Nos. 5,895,742 and 6,198,855 B1 discuss designs using polymer buffer layers. The U.S. Pat. No. 6,198,855 B1 describes a z-cut device with a conductive or non-conductive buffer layer, with a bleed layer formed on top of the buffer layer, or directly on the surface. Note however that the bleed layer material is not patterned to form electrodes, nor does it provide a means to externally control the electric potential in the vicinity of the waveguides.

U.S. Pat. Nos. 6,195,191 B1 and 6,282,356 B1 describe means of treating the surface of the substrate to change conductivity or to reduce surface damage to improve bias stability. The use of bleed layers is also described. Note that the entire surface is treated. No attempt to create electrodes with the surface treatment is discussed.

Other prior art includes U.S. Pat. No. 5,214,724, where a semiconductive electrode is placed laterally next to the main signal electrodes. Note that all electrodes are on top of the buffer layer, in contrast to the invention described here, where the bias electrodes reside on the surface of the substrate. U.S. Pat. No. 5,214,724 teaches that a semiconductive electrode can be used for low frequency control of the bias point. Note that the claims also include a bleed layer, called a "primary semiconductive layer," between all the electrodes and the buffer layer.

Japanese patent 1789177 (grant date Sep. 29, 1993) describes a patterned buffer layer with a semiconductive bleed layer over top of the patterned buffer layer and on top of the surface of the substrate, in regions where there is no buffer layer.

In U.S. Pat. No. 6,853,757, a transparent conductive film underneath a highly conductive metal electrode applies a voltage directly to the surface of the substrate. The metal electrode is shifted laterally with respect to the center of the waveguide to minimize optical loss. Note that the transparent conductive film is intended to carry both high and low frequency signals from the highly conductive electrode to the waveguide. As stated in the patent application, "the invention is particularly advantageous since it becomes possible to prevent optical loss and to achieve further high-speed modulation by forming a metal electrode so that the metal electrode may not be superimposed as much as possible on a part formed on an optical waveguide in a transparent electrode."

U.S. Pat. No. 5,455,876 describes a design with highly conductive (preferably gold) electrodes on the surface of the substrate and underneath the buffer, but with a floating electrical potential. The floating electrodes are DC isolated from the electrodes on top of the buffer and have no external DC connection. The floating electrodes are intended to improve high frequency modulation efficiency by capacitively coupling RF from the electrode on top of the buffer. Their proximity to the electrode results in efficient modulation for the fraction of voltage that is coupled. In a journal article by Samuel Hopfer, et. al., entitled "A novel wideband, lithium niobate electrooptic modulator," in the Journal of Lightwave Technology, Vol. 16, No. 1, January 1998, pp. 73-77, the inventor states that the purpose of the floating electrodes is "for the purpose of applying the available RF voltage directly across the titanium indiffused optical waveguides." Note that the floating electrodes do not provide any mitigation of the bias voltage drift due to the buffer charging effect, since they lack the external DC connection.

U.S. Pat. No. 6,310,700 is somewhat similar to U.S. Pat. No. 5,455,876, in that there is a set of large electrodes on top of a buffer layer, and a set of electrodes on the surface of the substrate. Instead of relying on capacitive coupling of the signal voltage from the upper to lower electrodes, conductive legs connect the two sets of electrodes. Note that the bottom set of electrodes are directly interconnected with the upper electrodes at both high and low frequencies. They are intended to carry the voltage from the top electrode to the bottom set of electrodes for all frequencies. The key feature to note is that the modulation is produced by the lower set of electrodes at high and low frequencies. The patent states, "the thickness of the buffer layer 400 should be thick enough such that the electric field 710 generated by the electrical signals propagating in the transmission line 300 does not reach the lithium niobate substrate slowing down the electrical velocity." If the field lines from the transmission line do not reach the substrate, then those field lines play a minimal role in modulation at both high and low frequencies. Furthermore, the patent teaches, "in particular, the conductive legs 350 must be long enough to elevate the transmission line 300 away from the substrate 100 such that the stronger parts of the electric field generated by the electrical signals propagating in the transmission line 300 (hereinafter the "electric field of propagation 710") does not reach the lithium niobate substrate 100 slowing down the electrical velocity. The electric field of propagation 710 (shown in FIG. 3) is generated across the gaps between the electrodes of the transmission line 300, but does not perform the modulation of the optical signals." Hence, the modulation at high and low frequencies is performed by the set of electrodes on the surface of the substrate, referred to as a "loading electrode." The patent also states that "the opposing loading electrodes of the opposing conductive legs generate a capacitance that reduces the electrical velocity on the transmission line to match the optical velocity of the optical signal," hence, the loading electrodes are strongly coupled to the transmission line at high frequency.

SUMMARY OF THE INVENTION

The present invention relates to an electro-optic device wherein high frequency modulation of an optical signal is achieved with a first set of highly conductive RF electrodes arranged as a transmission line on the top of the substrate, and a prescribed operating point is maintained by a second set of low conductivity electrodes in contact with the substrate.

In this way it is possible to operate the device with zero or nearly zero DC voltage between the highly conductive electrodes located on the surface of the device. As a result, metal migration and other effects which can cause electrode corrosion are mitigated, permitting reliable operation of the device in non-hermetic packages which are advantageous because of lower manufacturing and material costs.

According to one aspect of the present invention there is provided an electro-optic device comprising: a substrate having at least one optical waveguide formed therein; an RF electrode structure disposed for generating an RF electric field in the at least one optical waveguide, the RF electrode structure including a first RF electrode disposed on a first side of the substrate, the first RF electrode comprising a first material having a first resistivity; and a bias electrode structure disposed for generating a low frequency or DC electric field in the at least one optical waveguide, the bias electrode structure including a first bias electrode disposed on a second side of the substrate, the first bias electrode comprising a second material having a second resistivity, wherein the first side is opposite the second side, and wherein the second resistivity is substantially higher than the first resistivity.

According to another aspect of the present invention there is provided an optical modulator comprising: an electro-optic substrate having at least one optical waveguide formed therein; an RF electrode structure supported by a first surface of the electro-optic substrate, the RF electrode structure disposed for generating an RF electric field in at least one of the first and second optical waveguides; and a bias electrode structure supported by a second surface of the electro-optic substrate, the bias electrode structure disposed for generating a low frequency or DC electric field in the at least one of the first and second optical waveguides, the first surface opposite the second surface, wherein a thickness of the electro-optic substrate is selected such that the RF electric field generated by the RF electrode structure and the low frequency or DC electric field generated by the bias electrode structure both reach the at least one of the first and second optical waveguides, and wherein the RF electrode structure comprises a material having a higher conductivity than a material used to form the bias electrode structure.

According to another aspect of the present invention there is provided an electro-optic device comprising: a substrate; an RF electrode structure supported by the substrate, the RF electrode structure disposed for receiving an RF signal for generating an RF electric field in at least one optical waveguide supported by the substrate, the RF electrode structure including a signal RF electrode; and a bias electrode structure supported by the substrate, the bias electrode structure disposed for receiving a bias signal for generating a low frequency or DC electric field in the at least one optical waveguide, the bias electrode structure including a signal bias electrode, wherein the signal bias electrode is DC isolated from the signal RF electrode, wherein the signal bias electrode comprises a material having a higher resistivity than a material used to form the signal RF electrode, and wherein the RF electrode structure and the bias electrode structure are arranged such that a line substantially perpendicular to a plane of the substrate passes through both the signal RF electrode and the signal bias electrode.

Another aspect of the present invention relates to the relative layout of the RF and bias electrodes for optimum modulation efficiency.

BRIEF DESCRIPTION OF THE DRAWINGS

The invention will be described in greater detail with reference to the accompanying drawings which represent preferred embodiments thereof, wherein:

FIG. 6b shows a cross-section A-A' in FIG. 6a;

FIG. 6c shows a cross-section B-B' in FIG. 6a;

FIG. 9b is a plan view of the device in FIG. 9a;

FIG. 15b shows a plan view of the embodiment in FIG. 15a;

FIG. 18b is a schematic diagram illustrating the field lines generated when a voltage is applied to the bias electrodes in the device illustrated in FIG. 18a;

DETAILED DESCRIPTION

Figure 1:
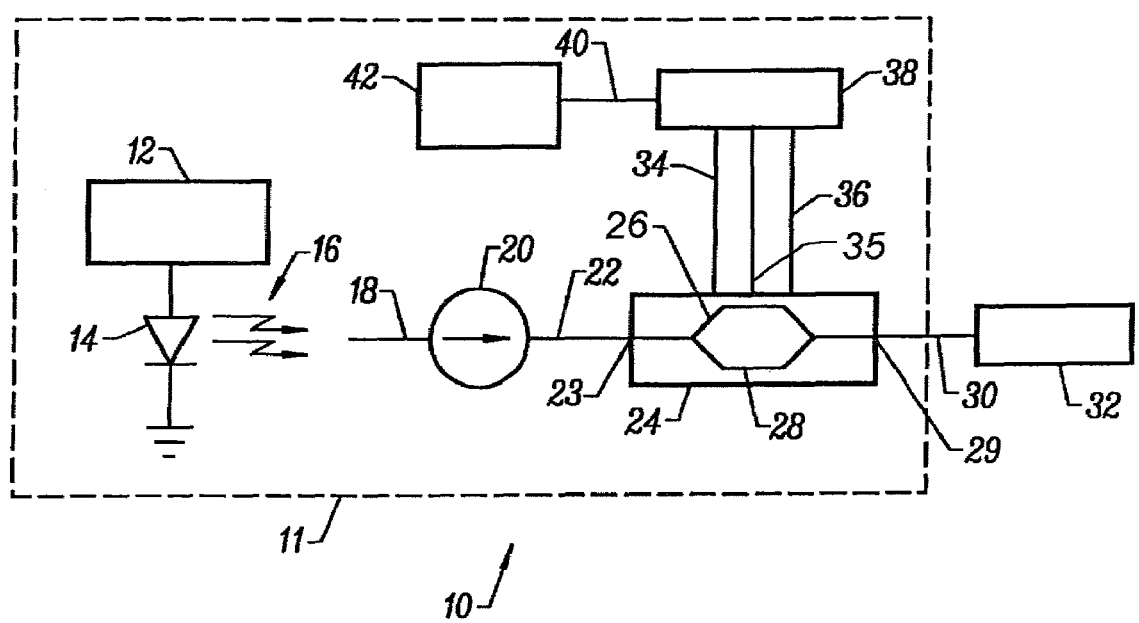
FIG. 1 is a simplified schematic diagram of an embodiment of an optical communication system.

With reference to FIG. 1, an embodiment of a simplified optical communication system 10 is shown, utilizing a modulator 24 of the present invention. The optical communication system 10 comprises a transmitter 11, a receiver 32 and a transmission medium 30, which connects the transmitter 11 to the receiver 32. The transmission medium 30 is typically an optical fiber.

The transmitter 11 includes a laser 14, which operates in accordance with laser control signals received from a laser controller 12. The laser 14, which may operate in continuous wave (CW) mode or pulsed mode, produces optical signals 16 having a prescribed wavelength. In long wavelength communications systems, the laser 14 is typically an InGaAsP/InP semiconductor single-mode laser which generates 1.5 micrometer wavelength optical signals.

A lensed optical fiber 18, or fiber pigtail, receives the optical signals 16. The lensed optical fiber 18 is coupled to the isolator 20, which reduces reflections directed towards the laser 14. In one embodiment, the isolator 20 is combined with a polarizer (not shown) to further reduce reflections to the laser 14. In another embodiment, the lensed optical fiber 18 is coupled directly to the modulator 24, rather than through the isolator 20.

An external modulator 24 receives the optical signals 16 from the laser 14 via an input fiber 22. The modulator 24 includes two waveguides 26 and 28. The controller 38 controls each waveguide 26, 28 independently of the other or with one control signal. The optical signals 16 are received at an input 23 of the modulator 24 and are modulated in each of the waveguides 26 and 28. Modulated optical signals from each of the waveguides 26 and 28 are combined into a modulated optical signal at an output 29 of the modulator 24. The modulator 24 may perform either amplitude modulation or phase modulation or some combination to "chirp" the light of the received optical signals 16. The combined, modulated optical signal is transmitted across the fiber 30 to the receiver 32.

The controller 38 receives digital data signals from a data source 42 via a transmission line 40, and generates modulation control signals in response to the received signals. The modulation control signals are introduced into the modulator 24 via leads 34 and 36. The modulation control signals are indicative of a predetermined modulation of the optical signals 16 and of desired modulation chirp parameters. For example, the modulation control signals are received by the modulator 24, and in response, the relative propagation velocities of each of the waveguides 26 and 28 changes to generate a desired modulation chirp parameter value. A single control signal may interact asymmetrically with waveguides 26 and 28 to produce a fixed amount of chirp.

The controller 38 also introduces a bias signal via lead 35 to the modulator 24 which sets the operating point of the modulator. The bias signal may be either preset or generated in response to changing environmental conditions such as temperature, bias drift or charge accumulation in the vicinity of the electro-optic waveguides.

One common modulator design is the Mach-Zehnder configuration. The operation of Mach-Zehnder modulators is described in detail in U.S. Pat. No. 5,455,876, which is incorporated herein by reference. A Mach-Zehnder modulator uses an interferometric technique in order to amplitude modulate the optical wave. A Mach-Zehnder modulator splits an incoming optical signal into two paths along optical waveguides and utilizes an electromagnetic signal, preferably a radio frequency (RF) signal, to modulate the split optical signals, which are in one or both optical waveguides. The two split optical signals are then combined into a single optical signal. Although the invention is described herein with a Mach-Zehnder modulator, the invention can be used with any type of electro-optical modulator.

Figure 2:
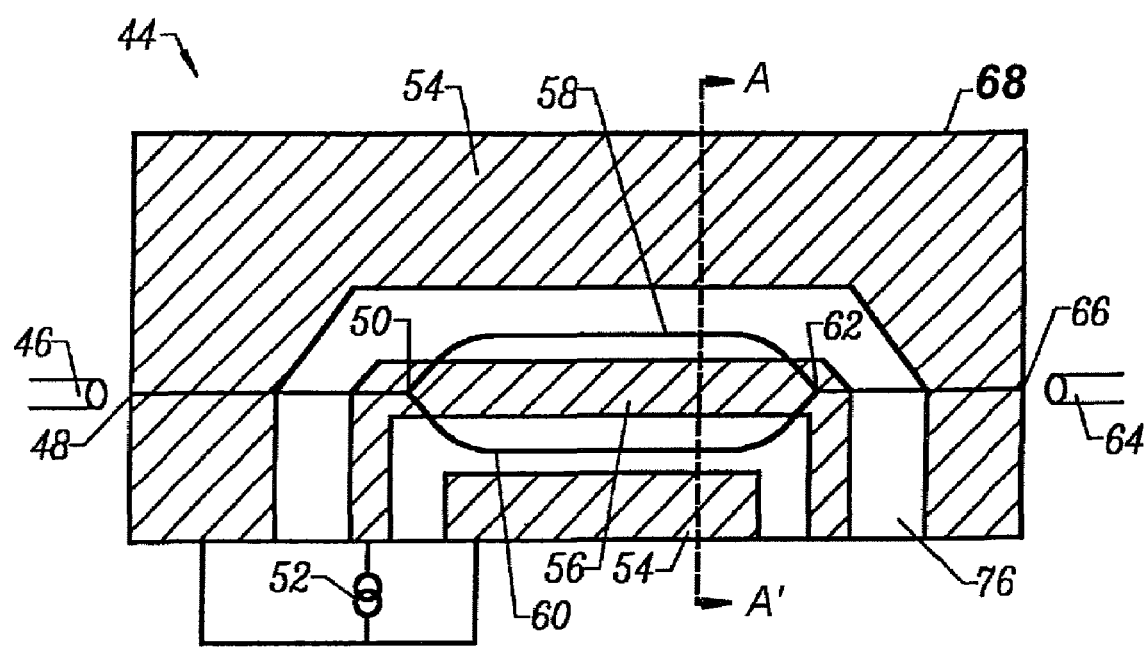
FIG. 2 is a top planar view of a modulator of the optical communication system of FIG. 1.

FIG. 2 illustrates a top planar view of a prior art modulator of the optical communication system of FIG. 1. A fiber optic cable 46 is in optical communication with an optical input 48 of a Mach-Zehnder modulator 44. The fiber optic cable 46 presents an optical signal from a light source or laser (not shown) to the input 48. The optical signal is split into two equal signals by a Y-connection 50. RF electrodes 54 and 56 conduct RF signals supplied by a signal generator 52. While the split optical signals travel down waveguides 58 and 60, the electrical field of the RF signal modulates the split optical signals. The distance in which the RF signals interact with, or modulate, the split optical signals is known as the interaction distance, and is determined primarily by the modulator design.

A second Y-connection 62 combines the two split optical signals into a single, modulated optical signal. A fiber optic cable 64 which is coupled to an optical output 66 of the modulator 44, presents the combined optical signal to subsequent stages (not shown) of an optical communication system.

The modulator 44 includes a substrate 68 which in this embodiment is made of X-cut lithium niobate ($LiNbO_3$) and is approximately 1000 microns ($\mu m$) thick. In another embodiment, the modulator 44 is made of Z-cut $LiNbO_3$. In order to maximize modulation efficiency, the waveguides lie between the electrodes for X-cut, while they are under the electrodes for Z-cut $LiNbO_3$. The length and width of the substrate 68 depend on the modulator design and must be sufficient to support the optical waveguides 58 and 60 and the RF electrodes 54 and 56. Other electro-optic materials can be used for the substrate 68 as well. In one embodiment, the optical waveguides 58 and 60 are positioned entirely within the substrate 68.

The waveguides 58 and 60 may be created by diffusing titanium into the substrate 68. In one embodiment, waveguides 58 and 60 are formed by creating a strip or channel (not shown) in the substrate 68, by depositing a strip, and then raising the temperature of the substrate 68 so that the titanium diffuses into the substrate 68. In one embodiment, waveguides 58 and 60 are approximately seven (7) microns wide and approximately three (3) microns deep.

In one embodiment, the RF power electrodes 54 and 56 are formed from gold, but any conductive metal or metal alloy, such as silver or copper can be used. The RF electrodes 54 and 56 are formed using any of a number of known methods of adhering metal to substrate materials. In one embodiment, gold is deposited using electroplating or sputtering techniques. For example, a fifty (50) to eighty (80) Angstrom sublayer of titanium may be deposited to improve the adhesion of the gold to the substrate 68. A nickel sublayer may also be used, as it reduces galvanic corrosion at the gold-nickel interface in the presence of high humidity.

The RF electrodes 54 and 56 are connected to an RF transmission line which delivers RF power from the signal generator 52. In one embodiment, the RF transmission line comprises a coaxial cable. The center RF electrode 56 is connected to the center conductor of the coaxial cable which is connected to the output of signal generator 52. The shield or outer conductor of the coaxial cable is electrically connected to electrodes 54. For Mach-Zehnder modulators, the thickness and width of the RF electrodes 54 and 56 are determined by the design of the modulator.

Figure 3A:
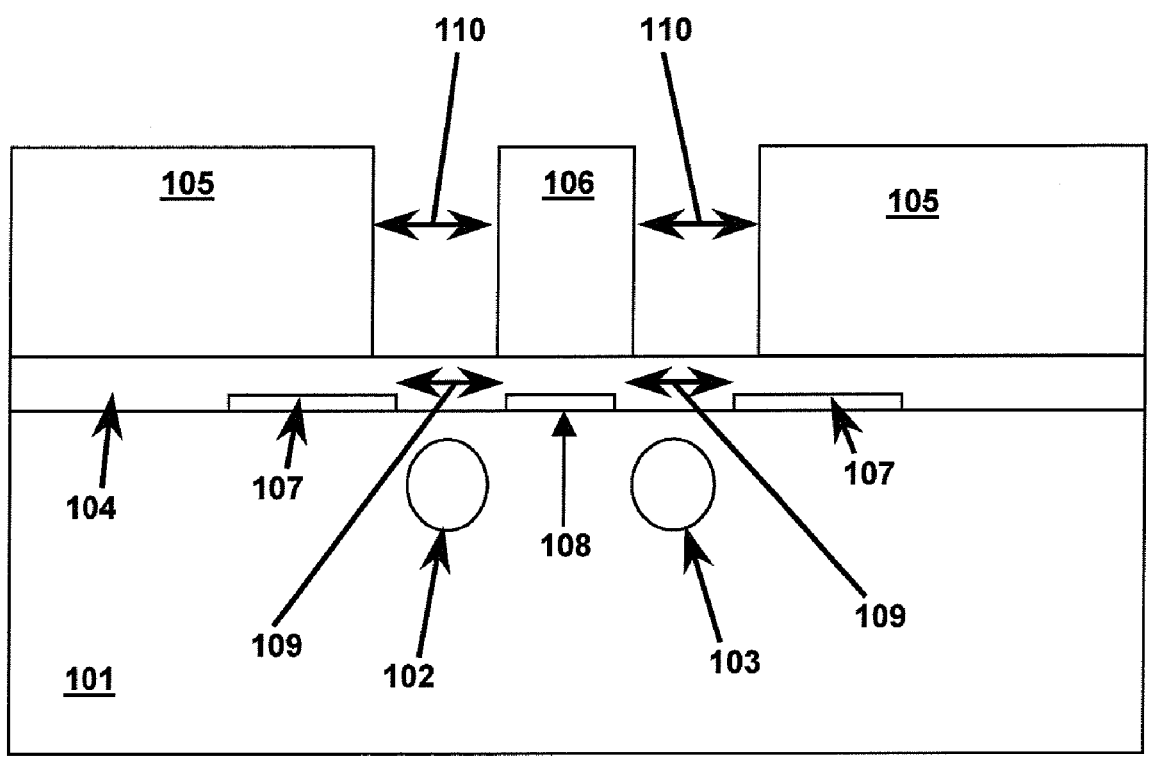
FIG. 3a is a cross-sectional view of the modulator of FIG. 2 taken along line A-A'.

FIG. 3a shows a cross-sectional view taken along line A-A' of an embodiment of the modulator in FIG. 2 according to this disclosure. While the examples described herein are based on X-cut and Z-cut $LiNbO_3$ substrate materials, other electro-optic materials such as Y-cut $LiNbO_3$, all crystal cuts of lithium tantalate and semiconductors such as indium phosphide (InP) and related compounds could be used. The buffer layer 104 resides on the substrate 101 which contains two optical waveguides 102 and 103 constructed as described above. The traveling-wave electrode structure forming a microwave transmission line for carrying the RF signal over the interaction distance of the modulator consists of RF ground electrodes 105 and a RF signal electrode 106. The buffer layer, typically consisting of insulating materials such as silicon dioxide and benzocyclobutene (BCB), serves, amongst others, to match the propagation velocities of the RF and the optical signals and to provide a spacer between the highly conducting RF electrodes and the field propagating in the optical waveguide, thereby reducing losses in the optical signal.

The bias ground electrodes 107 and the bias signal electrode 108 are located on the substrate 101. Suitable materials for the bias electrodes are tantalum silicon nitride, amorphous silicon and other high-resistivity materials. Suitable resistivity values for the bias electrodes lies between that of gold or other conducting metals and that of the substrate. For example, typical resistivity values lie in the range of $10^{18}$ ohm-cm ($\Omega$-cm) @25° C. for buffer layer, ~$1.3\times10^{17}$ ohm-cm ($\Omega$-cm) @25° C. for lithium niobate substrate, ~$10^4$ to $10^6$ ohm-cm ($\Omega$-cm) @25° C. for bias electrodes, and $2.3\times10^{-6}$ ohm-cm ($\Omega$-cm) for the RF (Gold) electrodes. The resistivity of the bias electrode material is preferably in the range from about 1 to $10^8$ ohm-cm ($\Omega$-cm) @25° C., more preferably from about $10^2$ to $10^7$ ohm-cm ($\Omega$-cm) @25° C., and most preferably from about $10^4$ to $10^6$ ohm-cm ($\Omega$-cm) @25° C. The lower the resistivity of the bias electrode, the more coupling that occurs with the RF signal, potentially increasing the net RF loss per unit length of the RF signal. Optical loss due to the proximity of the bias electrode near the waveguide may also increase with decreasing resistivity. Note that the response time of the bias electrode to an applied voltage is reduced as bias electrode resistivity is lowered.

The electric field in each optical waveguide 102, 103 is generated by a combination of the signal on the RF electrodes 105 and 106 and the signal on the bias electrodes 107 and 108. For any given signals applied to the RF electrodes 105, 106 and the bias electrodes 107, 108, the relative strength of the fields they generate is dependent on the relative magnitude of the inter-electrode gaps 110 and 109, respectively.

Figure 3B:
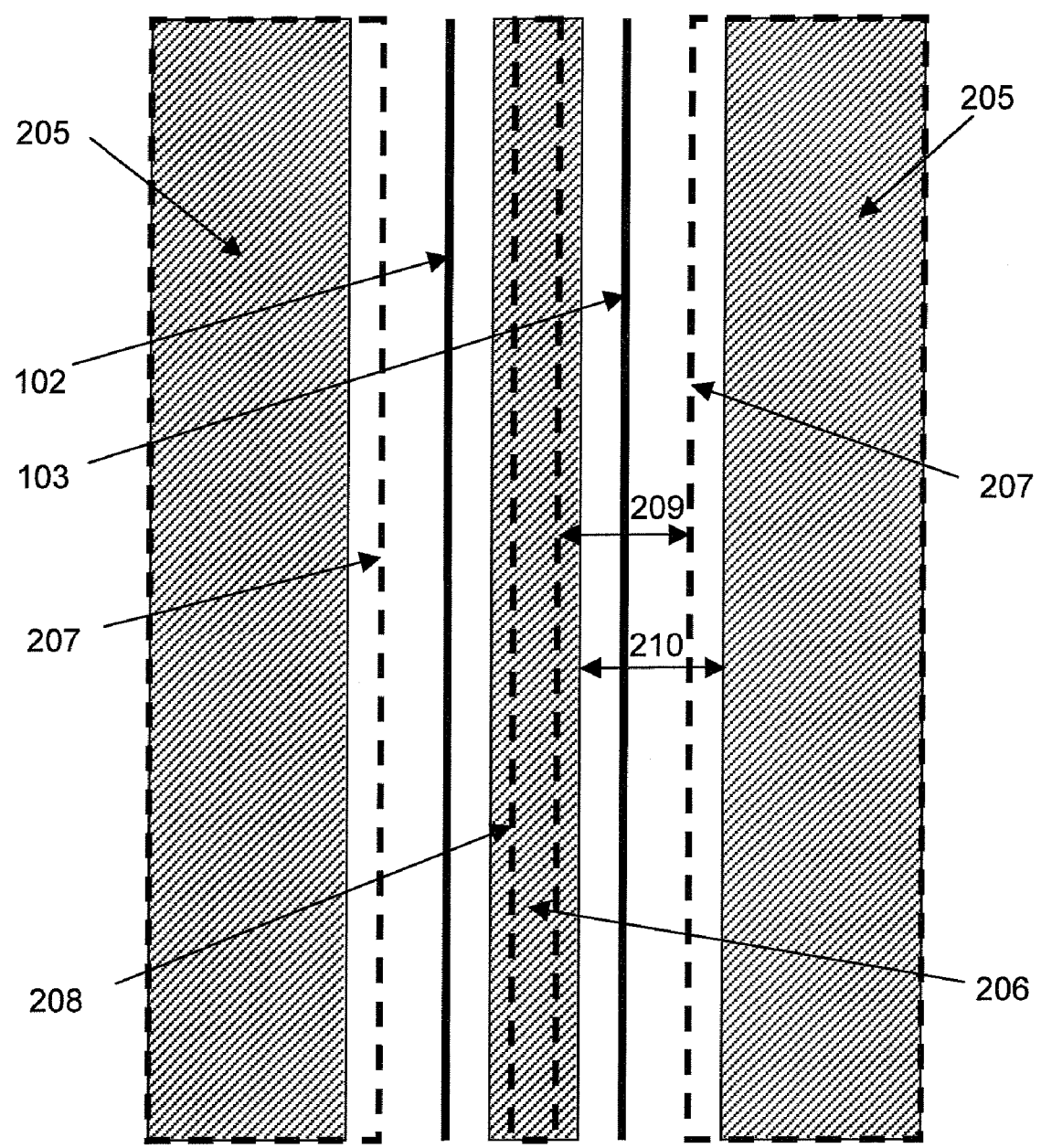
FIG. 3b is a plan view of the electro-optic device indicating the relation between the RF electrodes, the bias electrodes and the optical waveguides.

FIG. 3b is a top view of the device in FIG. 3a illustrating the layout of highly conducting gold RF signal and ground electrodes 206 and 205 respectively separated by the inter-electrode gap 210, the high resistivity signal and ground bias electrodes 208 and 207 respectively separated by the inter-electrode gap 209 and the two optical waveguides 102 and 103.

Figure 3C:
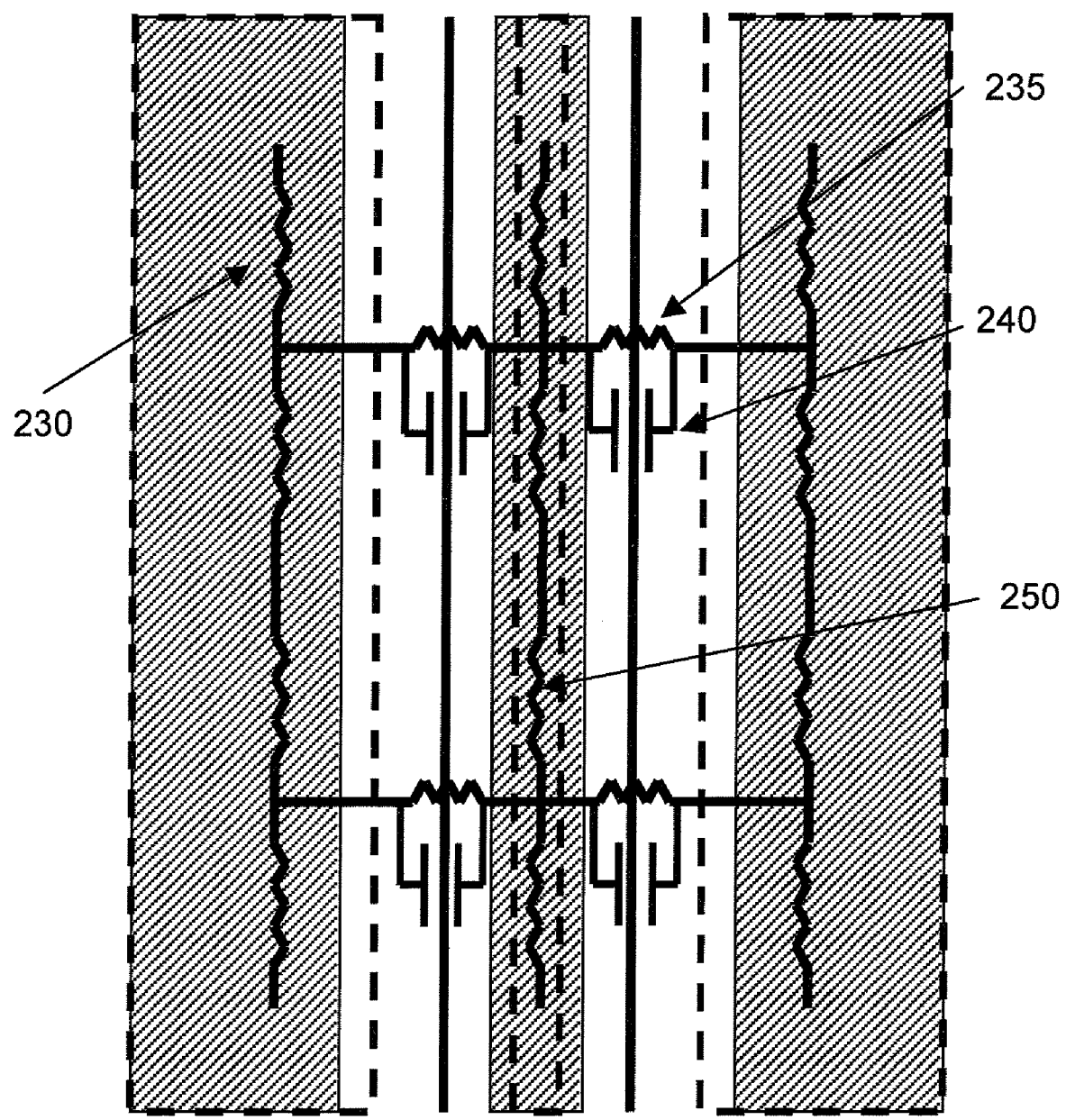
FIG. 3c is a plan view of the electro-optic device illustrating the equivalent electrical model of the electrode configuration.

In FIG. 3c is illustrated the equivalent RC circuit of the bias electrodes, consisting of the lumped elements representing the series resistance of the bias ground electrode 230, shunt resistance of the substrate 235, series resistance of the bias signal electrode 250 and the shunt capacitance 240.

Figure 4A:
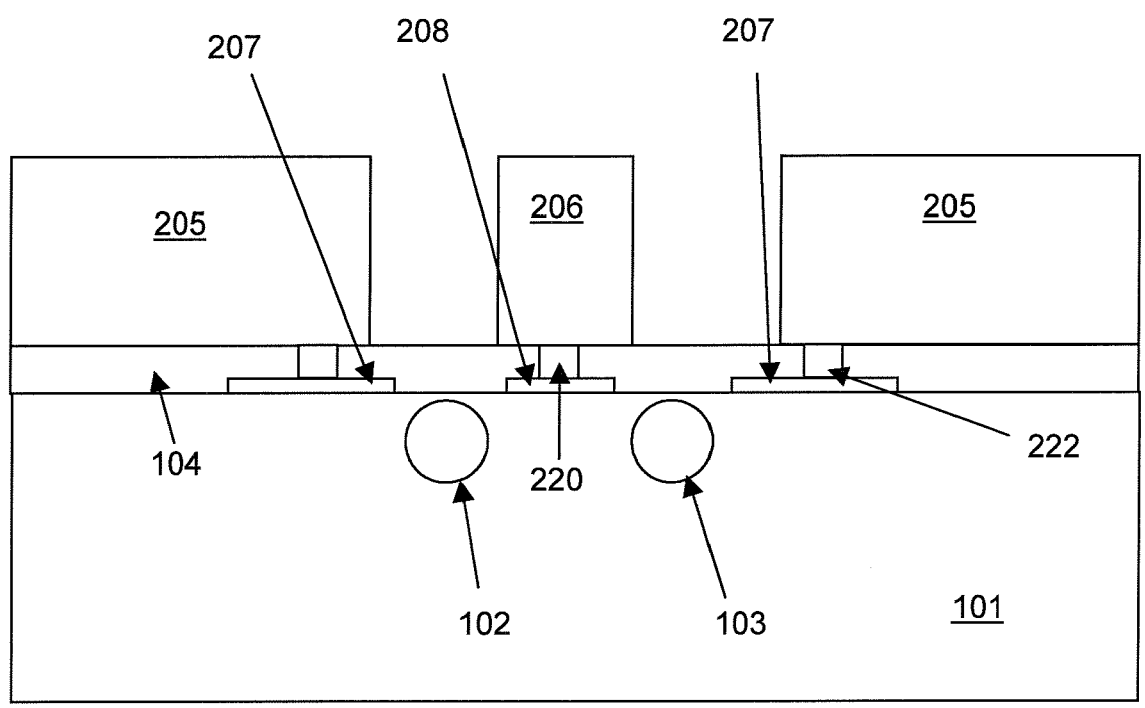
FIG. 4a is a cross-sectional view of the electro-optic device illustrating the location of vias for reducing series resistance effects.

In FIG. 4a showing the cross-section of a device, the bias electrodes 207 and 208 can be periodically connected to highly conducting electrodes with gold vias 222 and 220, e.g. to the RF electrodes 205 and 206. The small number of vias do not affect high frequency performance. This approach reduces the effective series resistance and the response time of the bias electrodes. The vias can be formed by etching the buffer layer. If the etchant attacks the bias electrodes, small thin rectangles of stop etch material, e.g. titanium-tungsten or other metal, can be deposited and patterned where the vias are to be located, prior to depositing and etching the buffer.

Figure 4B:
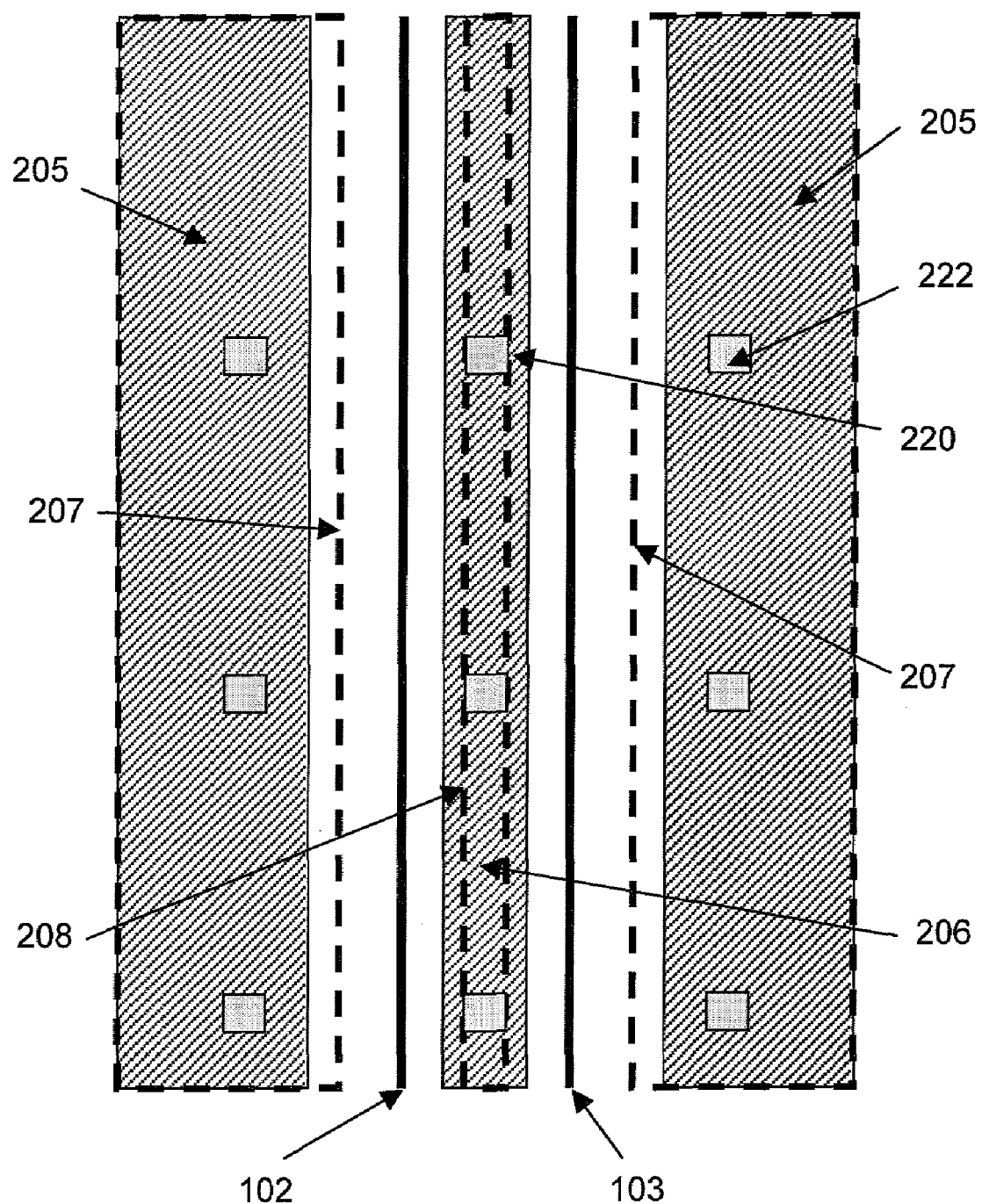
FIG. 4b is a plan view showing via positions.

FIG. 4b is a top view of the device in FIG. 4a illustrating the layout of the high resistivity signal and ground bias electrodes 208 and 207 connected to the highly conducting gold RF signal and ground electrodes 206 and 205 with gold vias 220 and 222 respectively. As the gold vias 220, 222 can be deposited into etched holes in the buffer layer, they can also act to improve the bonding of the gold electrodes to the device surface. This approach reduces the effective series resistance of the shadow electrodes relative to the shunt resistance of the substrate. The response time of the bias electrode needs to be fast enough to prevent bias voltage runaway from the buffer charging effect.

Figure 4C:
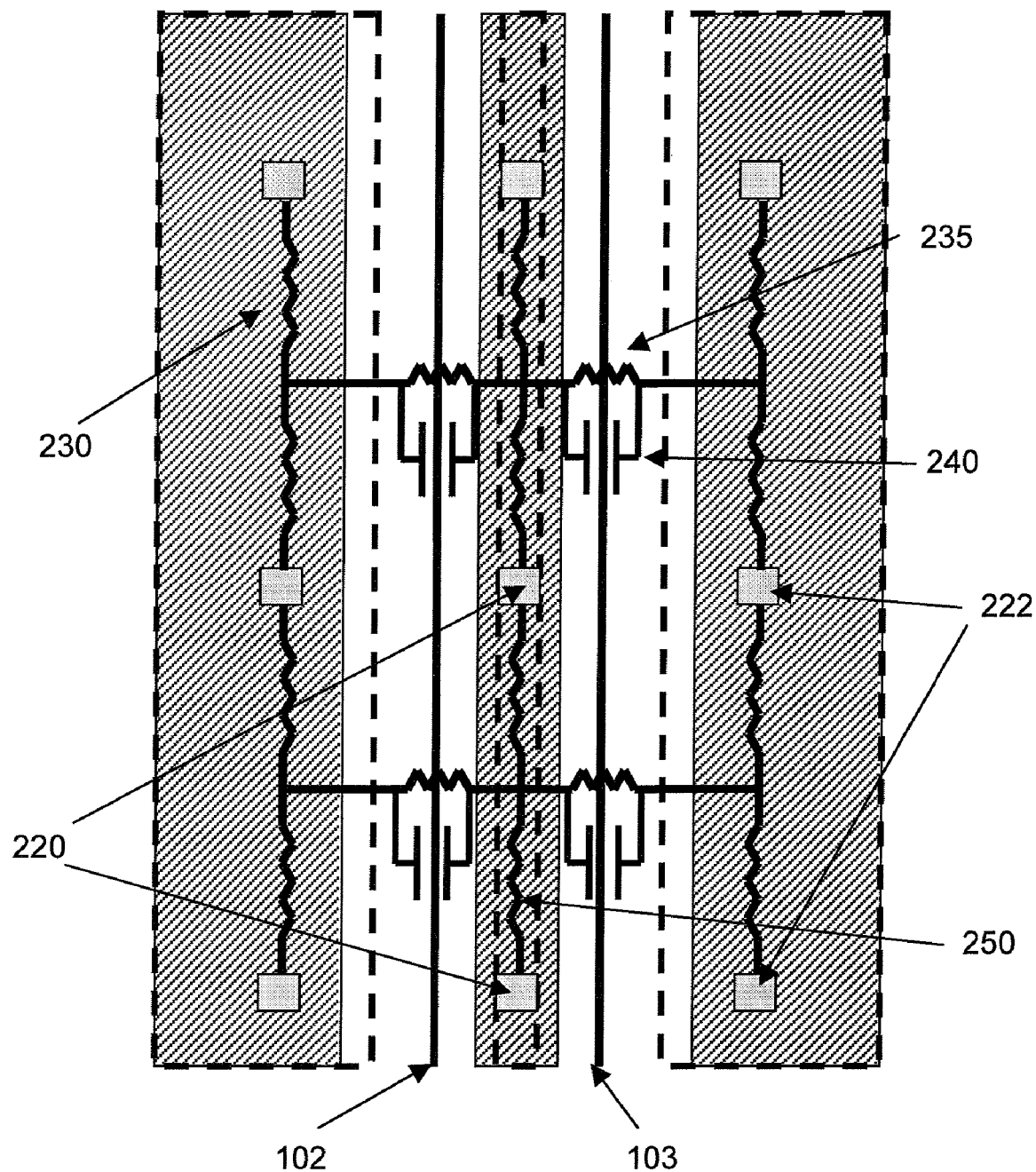
FIG. 4c is a plan view of an electro-optic device illustrating the equivalent electrical model of the electrode configuration with vias.

FIG. 4c illustrates the equivalent RC circuit of the bias electrodes, consisting of the lumped elements representing the series resistance of the bias ground electrode 230, shunt resistance of the substrate 235, series resistance of the bias signal electrode 250, the shunt capacitance 240 and the gold vias 220, 222.

A plurality of N vias reduces the effective series resistance by N. In addition, the shunt capacitance for each section is reduced by N. Shunt resistance increases by the same factor. The time constant is reduced by $N^2$. A time constant of an hour can be reduced to seconds. The loss of low frequency modulation efficiency due to the shunt resistance is also reduced. Typically, the vias are spaced ½ to 1 mm apart along the length of the device.

Figure 4D:
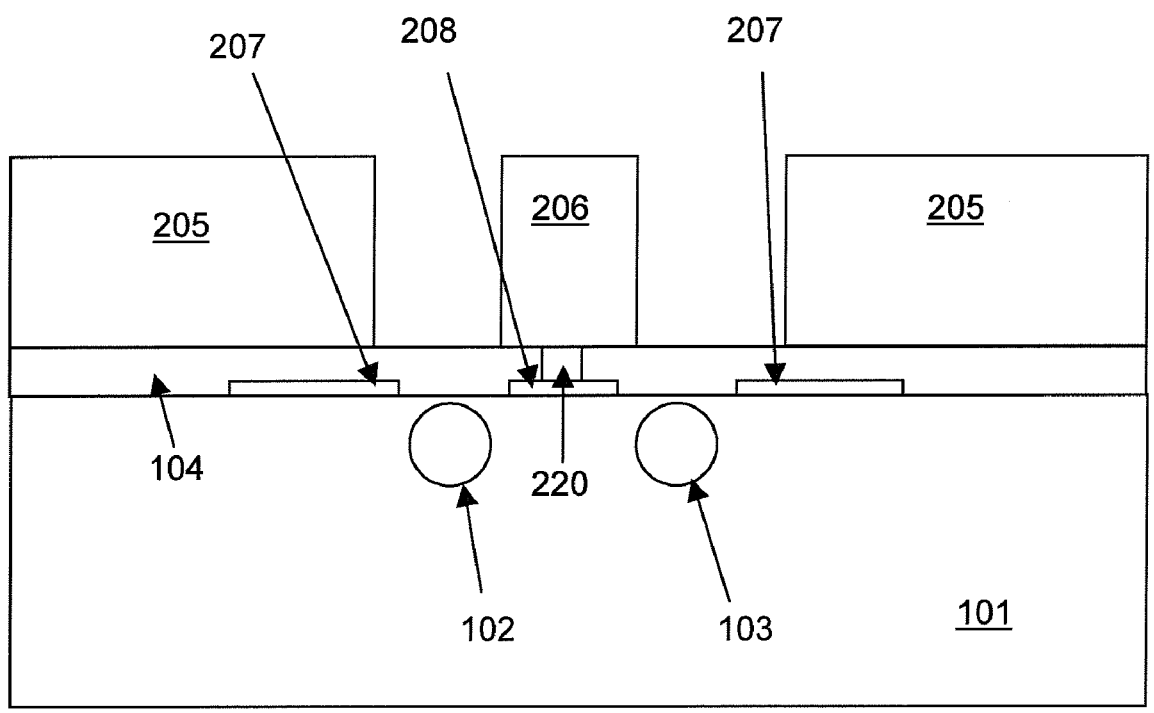
FIG. 4d is a cross-sectional view of an electro-optic device where the bias and RF signal electrodes are connected with vias through the buffer layer.

Another function for the gold vias can be to provide interconnections between the various electrodes in different configurations, depending on the intended application for the electro-optic device. FIG. 4d shows an embodiment in cross-section where the bias 208 and RF 206 signal electrodes are connected together by the gold via 220. In operation the DC potential of RF signal electrode 206, being connected directly to the RF ground electrode 205 through a 50 ohm load impedance is held close to zero. In this case, bias ground electrode 207 is electrically isolated from the RF ground electrodes 205, such that the bias signal is applied to these outer bias electrodes 207. In effect, the function of the bias signal and ground electrodes is interchanged. This topology eliminates the need for bias electrode material crossing the waveguides 102 and 103, which has been found to introduce some optical loss. Since both RF signal and ground electrodes 205, 206 are essentially at DC zero potential, any voltage-induced corrosion on the gold electrodes is eliminated. The width of the bias ground electrodes 207 (on the outside of the waveguides) is minimized to reduce the capacitance between the bias ground electrode 207 and the RF ground electrode 205. Any increase in capacitance for the bias ground electrode may further increase the response time for bias voltages applied to the bias ground electrodes 207, which is undesirable.

Figure 4E:
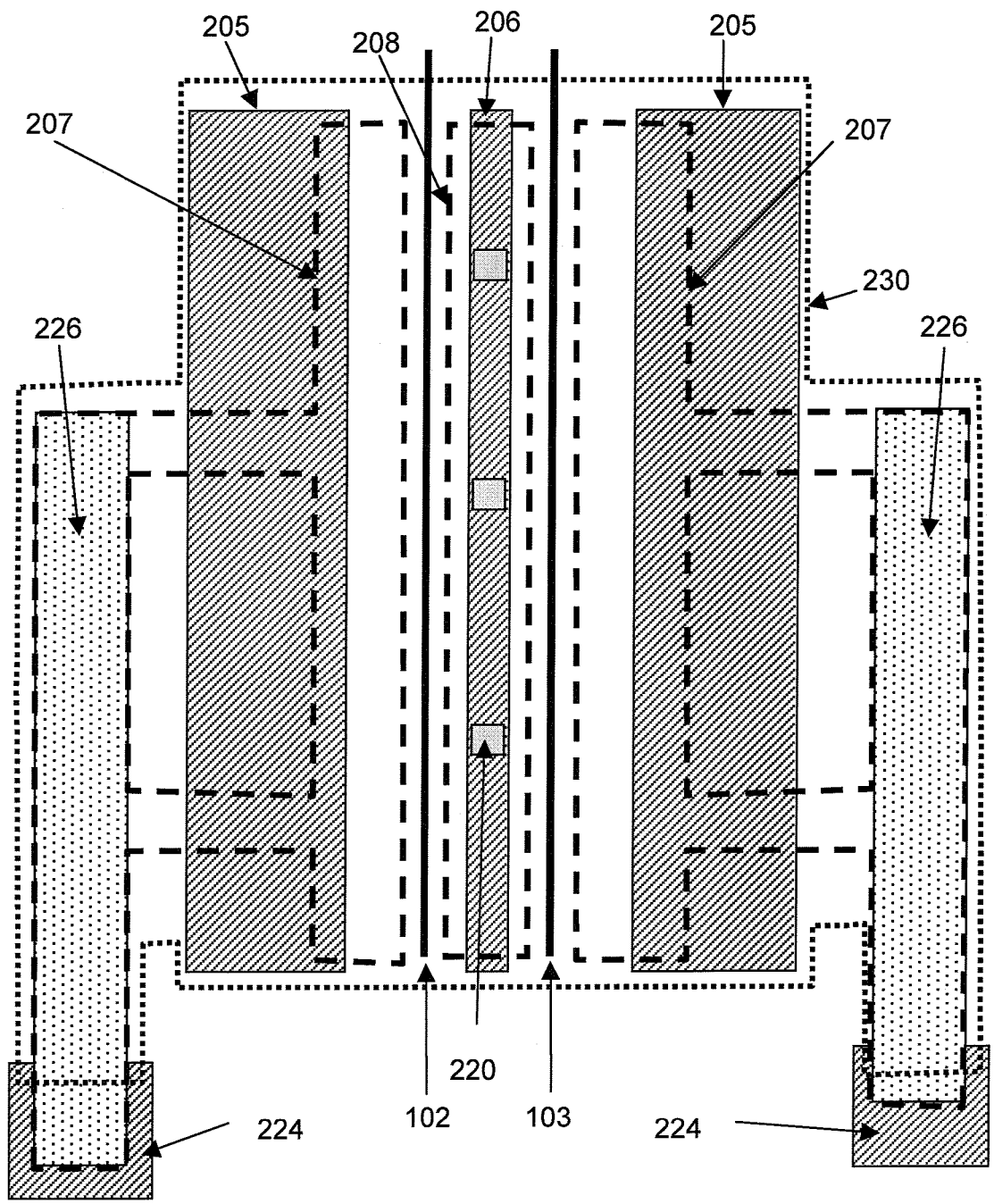
FIG. 4e is a plan view of the electro-optic device in FIG. 4d.

FIG. 4e shows the layout of the device in FIG. 4d, where the gold vias 220 connect the RF 206 and bias 208 signal electrodes. A thin metal conductor 226 is in contact with the bias ground electrode 207 thereby reducing the series resistance to keep the time constant as short as possible. In addition, since the metal conductor is buried, it does not undergo significant voltage-induced corrosion, which requires a path for liquid to form between conductors having different DC potential. As the buried metal conductor 226 is placed away from the RF ground electrode 205, it does not affect the performance of the RF electrodes. Suitable material structures for the buried metal conductor are a thickness of 1000 to 3000 Angstrom of titanium-tungsten, titanium-tungsten with gold on top, chrome, or any other conductive metal. The buffer layer is patterned according to the outline 230 to permit an external connection of the buried metal conductor 226 to an external terminal 224.

Figure 5A:
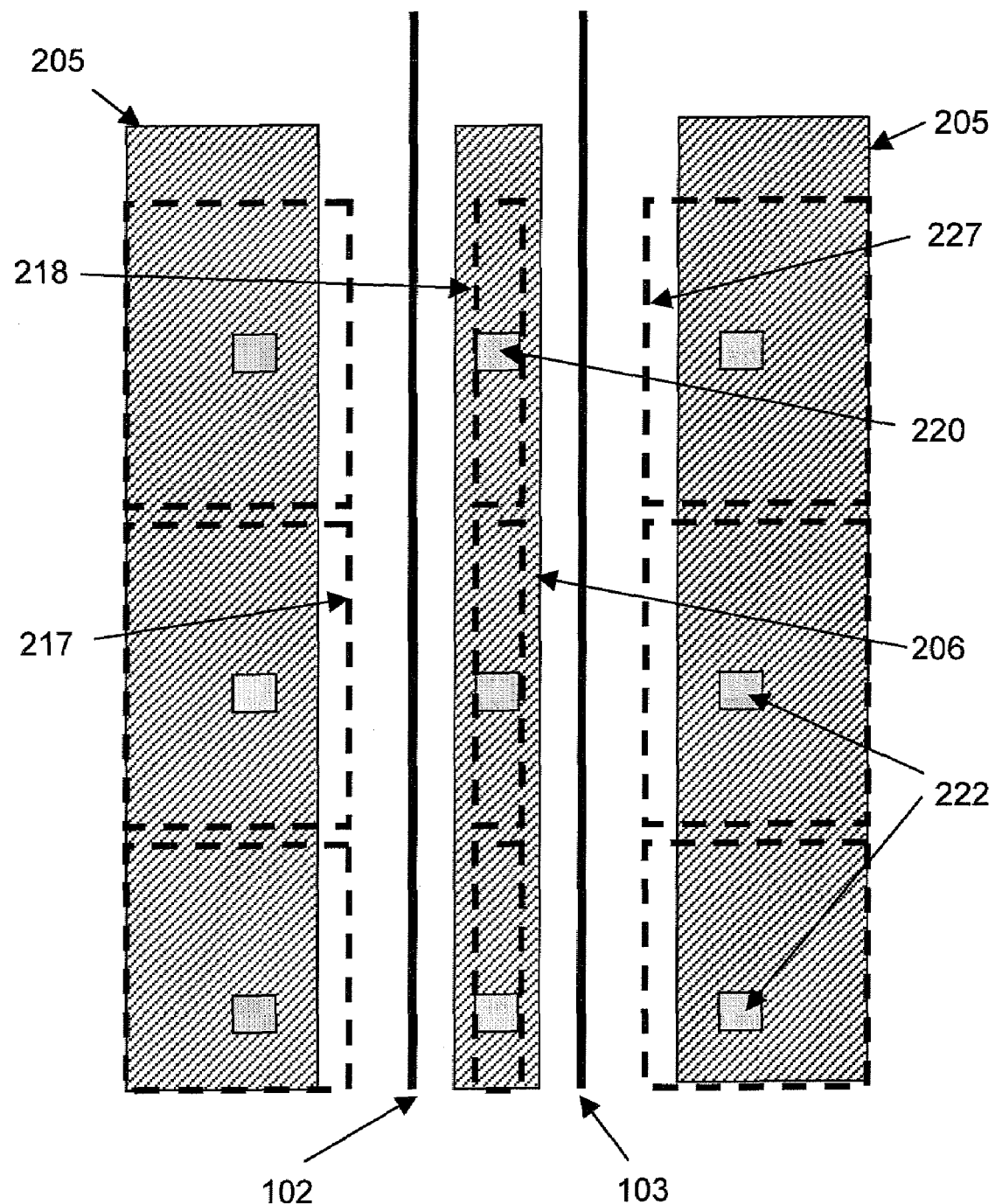
FIG. 5a is a plan view of an electro-optic device showing the electrode layout using vias to interconnect rectangular segments of the bias electrodes.

FIG. 5a shows bias ground and signal electrodes 217 and 218 respectively divided into segments to help suppress any propagation of RF signal along their length. The segments are connected to the RF ground and signal electrodes 205 and 206 by means of gold vias 222 and 220 respectively. Note that the bias electrodes need to carry only low frequency or DC voltages.

Figure 5B:
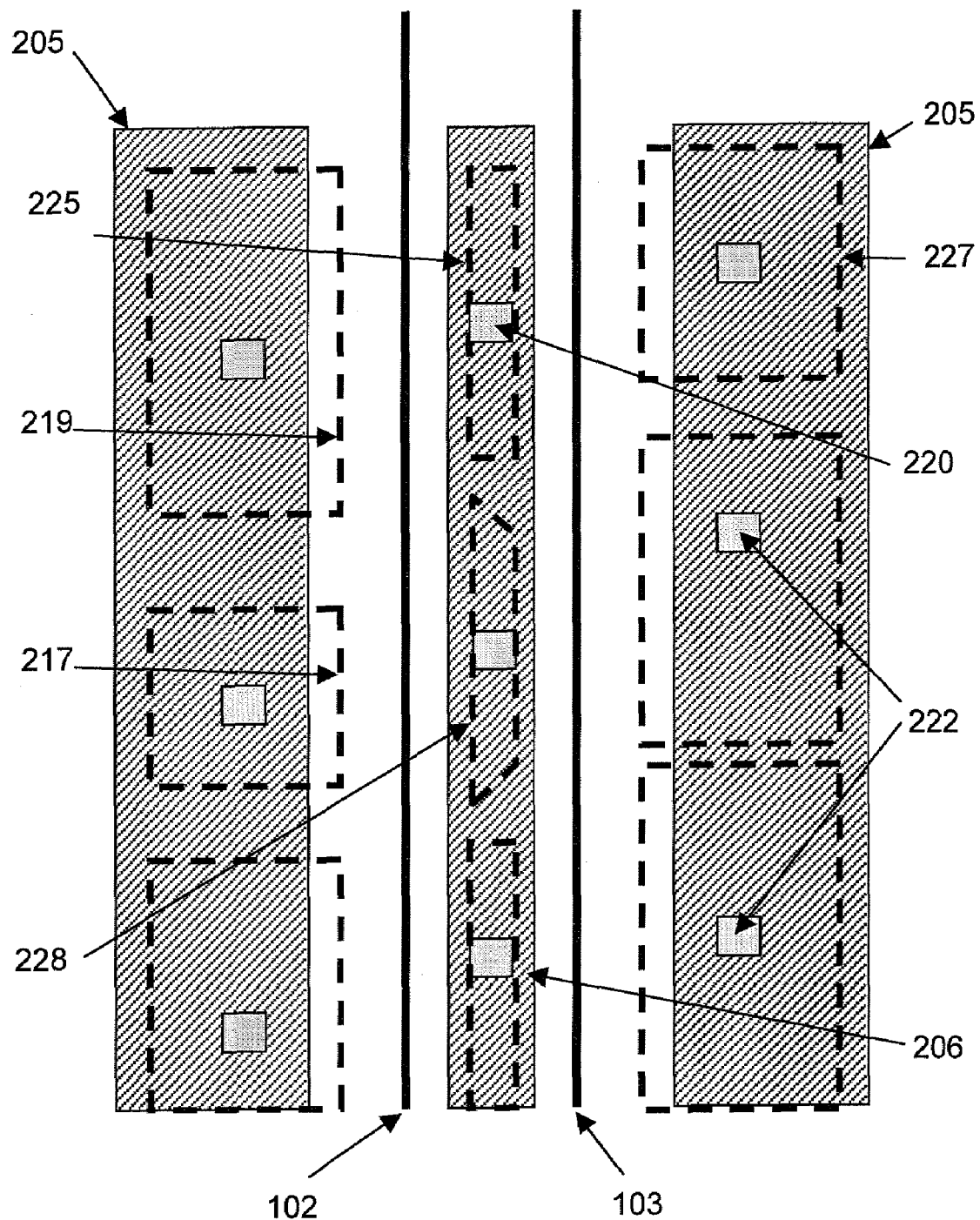
FIG. 5b is a plan view of an electro-optic device showing an electrode layout suitable for matching the modulation efficiency of bias & RF electrodes using bias electrode segments with different shapes, sizes and spacings.

An embodiment with the bias electrode segments with various shapes, sizes and spacings is shown in FIG. 5b. For instance, the bias signal electrode segment can be rectangular (225) or trapezoidal (228) to produce an asymmetric electric field in the waveguides 102, 103. Similarly the bias ground electrode can be rectangular (219) or square (217) depending on the electric field distribution required by the device design. The segments are connected to the RF ground and signal electrodes 205 and 206 by means of gold vias 222 and 220 respectively. The vias can provide additional adhesion of gold electrodes (for instance 205, 206) to the device surface.

Figure 6A:
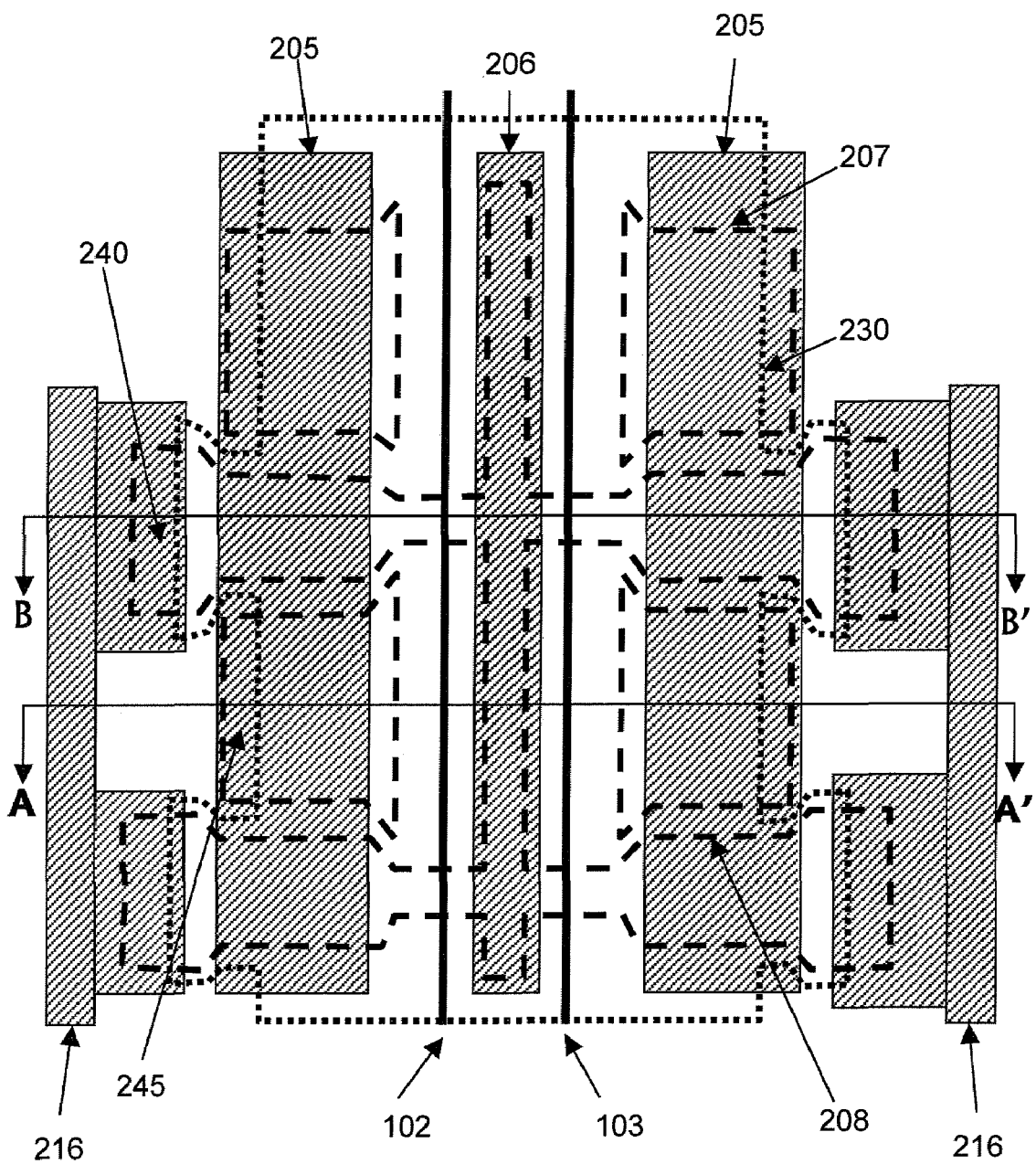
FIG. 6a is a plan view of an electro-optic device embodiment with segmented bias electrodes interconnected to a separate external contact.

In an embodiment such as the one shown in plan in FIG. 6a, the bias signal electrode 208 needs to be electrically separated from the RF signal electrodes 206, while the bias ground electrode segments 207 and RF ground electrode 205 remain connected at areas 245 where the buffer layer has been removed to expose the bias ground electrode. The buffer layer has been patterned accordingly with an outline 230.

The high resistivity bias signal electrode 208 is patterned so that sections of it can be extended between the bias ground electrode segments 207 in order to facilitate making contact with a highly conducting bias electrode 216 at areas 240 where the buffer layer has been removed. The bias signal electrode 208 is shown to cross over both waveguides 102, 103 at every point where it connects to highly conducting bias electrode 216. The number of crossings per waveguide is equal in order to maintain optical power balance and modulator extinction ratio in the waveguides 102, 103, as each crossing introduces a small amount of optical loss in the waveguide. Typically, there is a crossing every ½ to 1 mm of length along the electrode.

Alternatively, half of the crossings could connect only to the highly conducting electrode 216 on the right side of the drawing, whereas the other half of the crossings connect to the highly conducting electrode 216 on the left side of the drawing. In this alternate embodiment, optical power balance is maintained, while optical loss due to the crossings is cut in half.

Figure 6B:
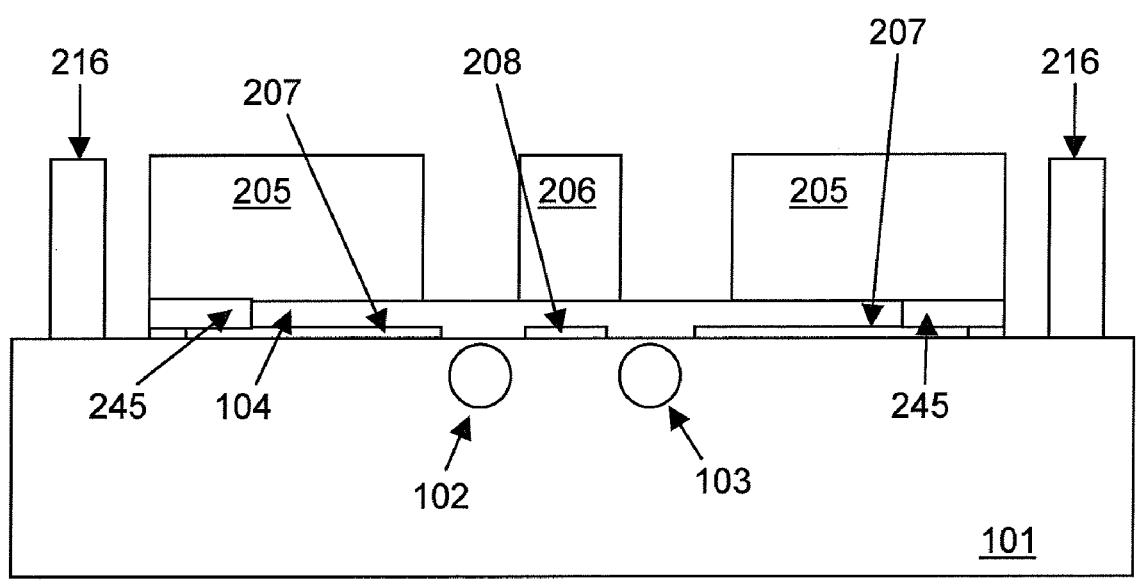

FIG. 6b shows the cross-section of the device in FIG. 6a along the section A-A'. The bias ground electrode segments 207 and RF ground electrode 205 remain connected at areas 245 where the buffer layer 104 has been removed to expose the bias ground electrode segments 207.

Figure 6C:
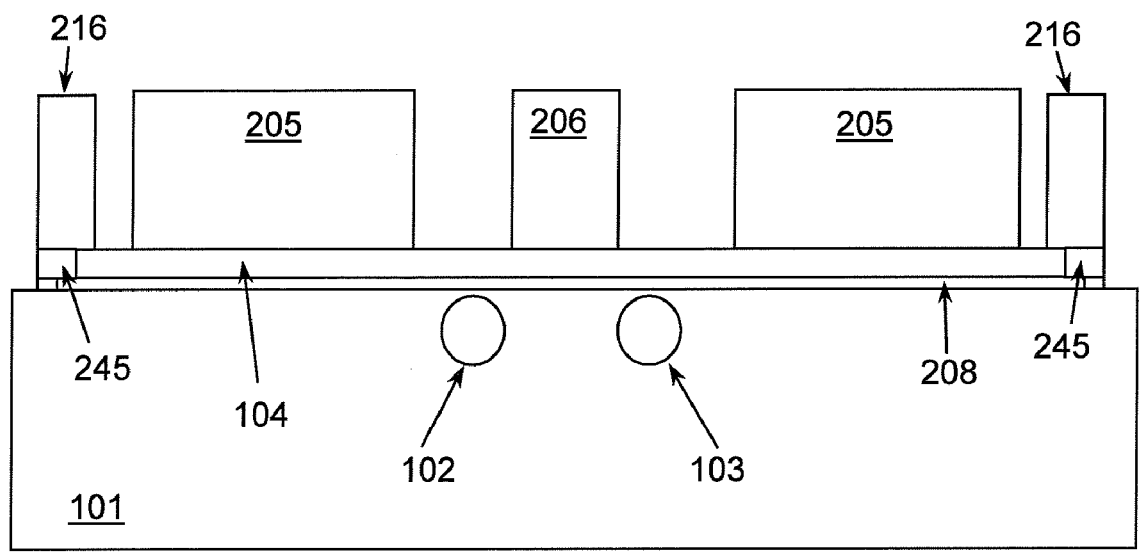

FIG. 6c shows the cross-section of the device in FIG. 6a along the section B-B'. The high resistivity bias signal electrode 208 is extended under the RF signal and ground electrodes 206 and 205 respectively, over the optical waveguides 102 and 103, to make contact with a highly conducting bias electrode 216 at areas 245 where the buffer layer 104 has been removed.

Figure 7A:
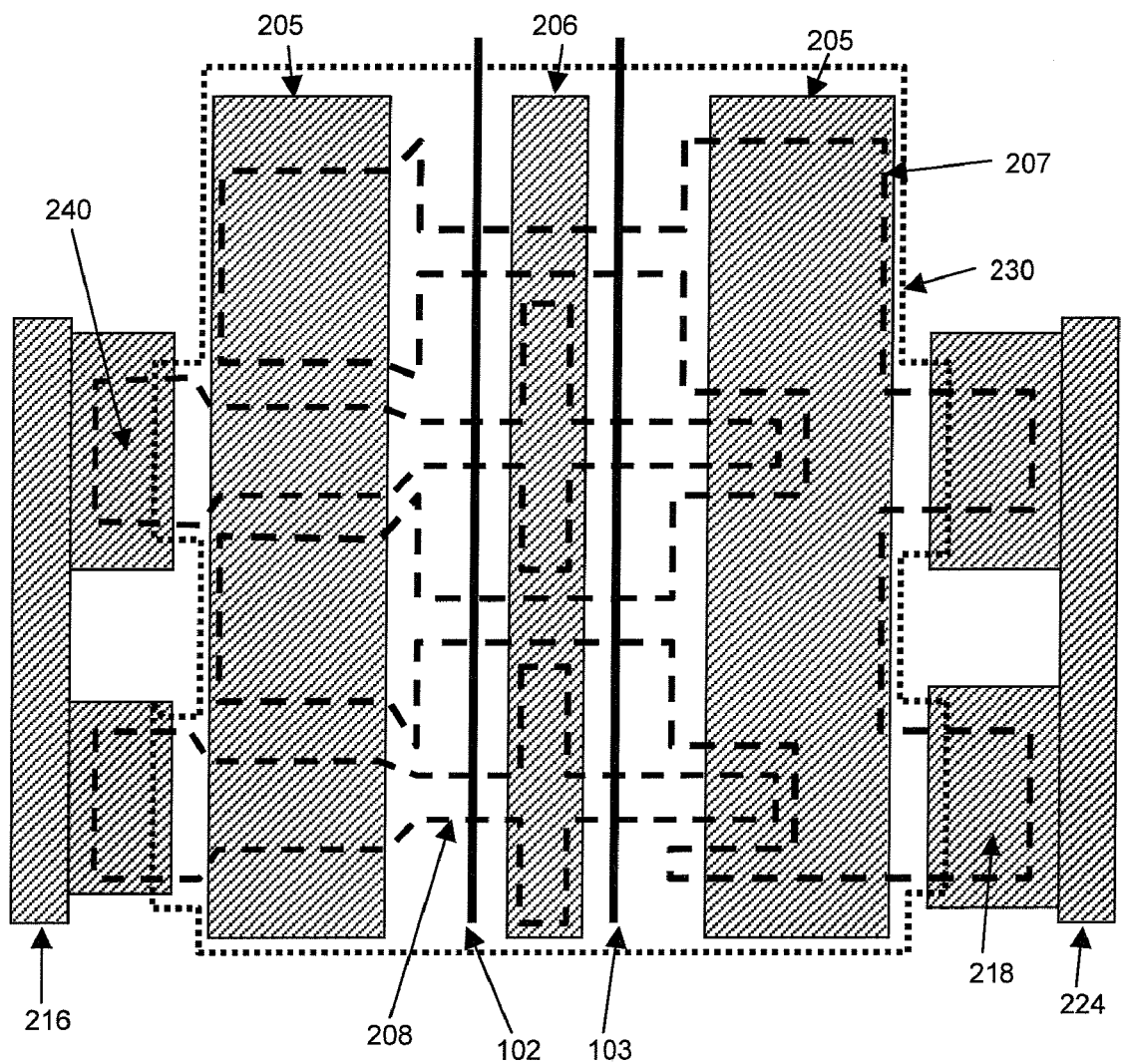
FIG. 7a is a plan view of an electro-optic device showing another embodiment with segmented bias electrodes interconnected to a separate external contact.

In another embodiment such as the one shown in plan in FIG. 7a, both the bias signal and ground electrodes (208 and 207 respectively) need to be electrically separated from the RF signal and ground electrodes (206 and 205 respectively). For this purpose, the high resistivity bias signal and ground electrodes (208 and 207 respectively) are segmented and the buffer layer patterned to an outline 230. The high resistivity bias signal electrode is extended to one side to make contact with the highly conducting gold bias signal electrode 216 at areas 240 where the buffer layer has been removed. The high resistivity bias ground electrode is extended to the other side to make contact with the highly conducting gold bias ground electrode 224 at areas 218 where the buffer layer has also been removed.

Figure 7B:
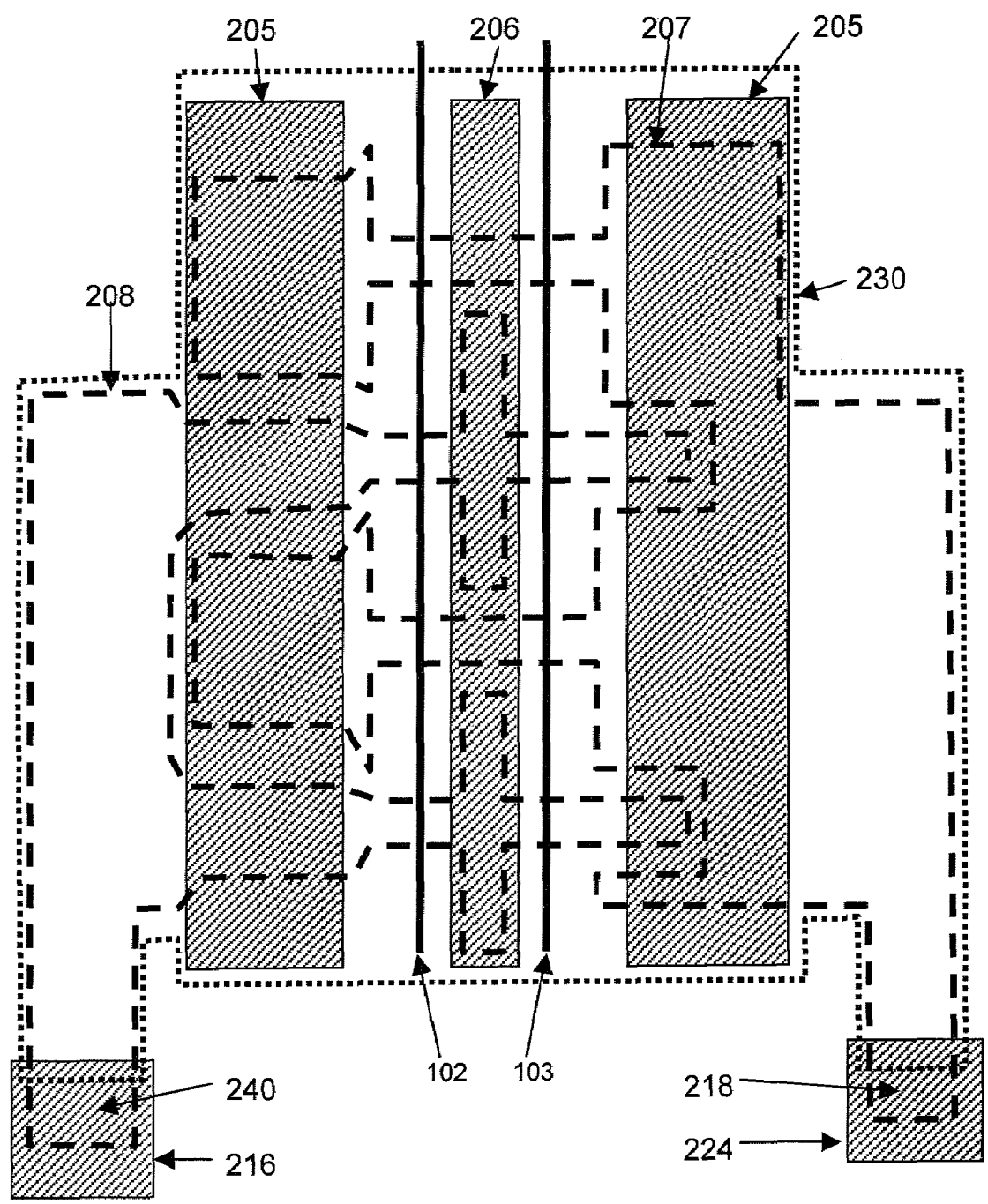
FIG. 7b is a plan view of an alternative electro-optic device embodiment with segmented bias electrodes interconnected to a separate external contact.

An alternative topology to that in FIG. 7a is shown in FIG. 7b. The description is identical, except that the highly conducting gold electrodes 216 and 224 do not run parallel to the RF ground electrodes as in FIG. 7a, but are brought out as contact pads at one point on the device. A second alternative topology is to cover the long traces of bias signal and ground electrode that are outside of the RF ground electrodes with a thin metal layer, thereby reducing the series resistance of those traces. Those long traces would still be covered by buffer layer, preventing or suppressing any corrosion due to humidity.

Figure 8A:
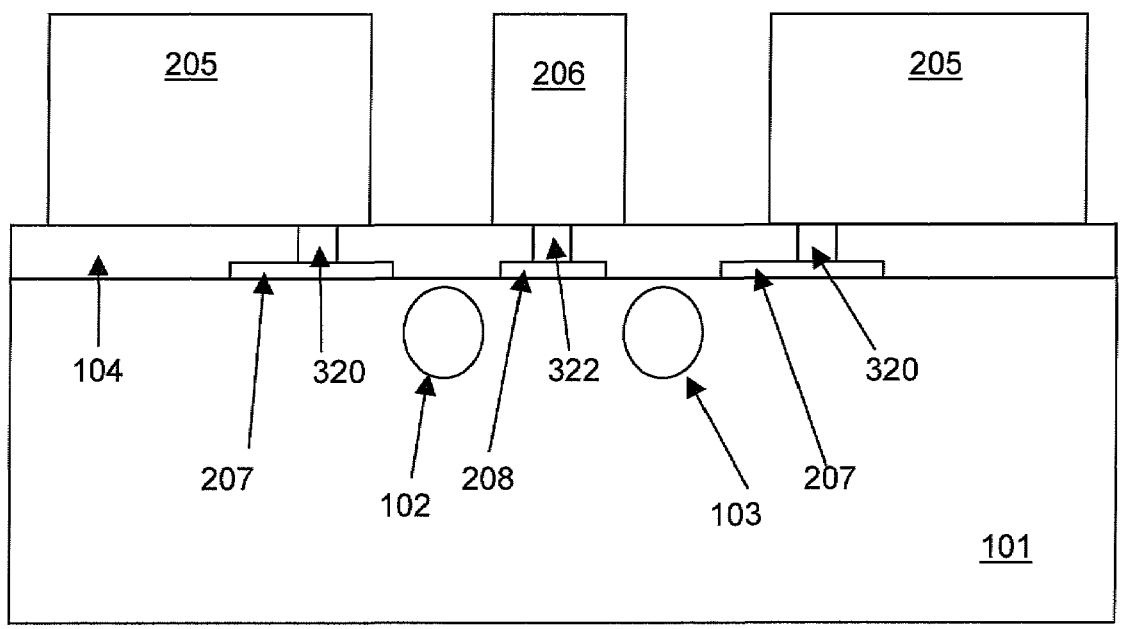
FIG. 8a is a cross-sectional view of an embodiment of an electro-optic device illustrating ion implanted vias for connecting to the bias electrodes.

The gold vias described in FIG. 4 can be fabricated in an alternative way to achieve an electrical contact between the bias and RF electrodes, as shown in FIG. 8. In this embodiment, the conductivity of the buffer layer 104 is increased by ion implanting suitable dopants over its total thickness. Thus the RF ground electrode 205 can now make contact with the high resistivity bias ground electrode 207 through the ion-implanted via 320. Similarly the RF signal electrode 206 can now make contact with the high resistivity bias signal electrode 208 through the ion-implanted via 322.

Figure 8B:
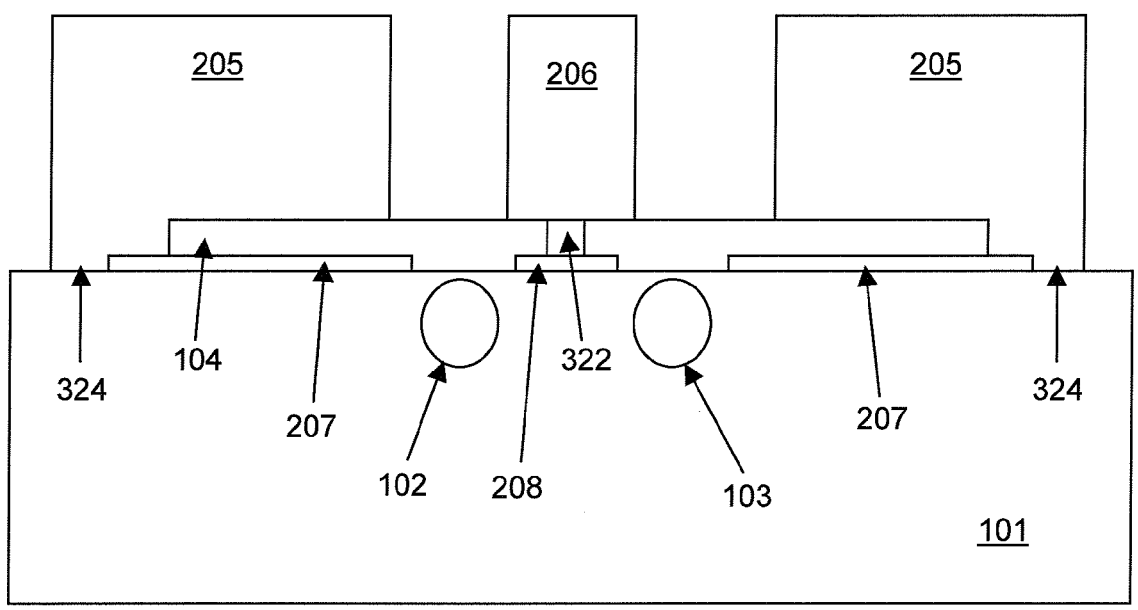
FIG. 8b is an alternative embodiment of FIG. 8a which uses a combination of implanted vias and gold connections at the electrode periphery.

FIG. 8b shows an alternative embodiment where the RF ground electrode 205 makes contact with the high resistivity bias ground electrode at the edge 324 where the buffer layer 104 has been removed.

Figure 9A:
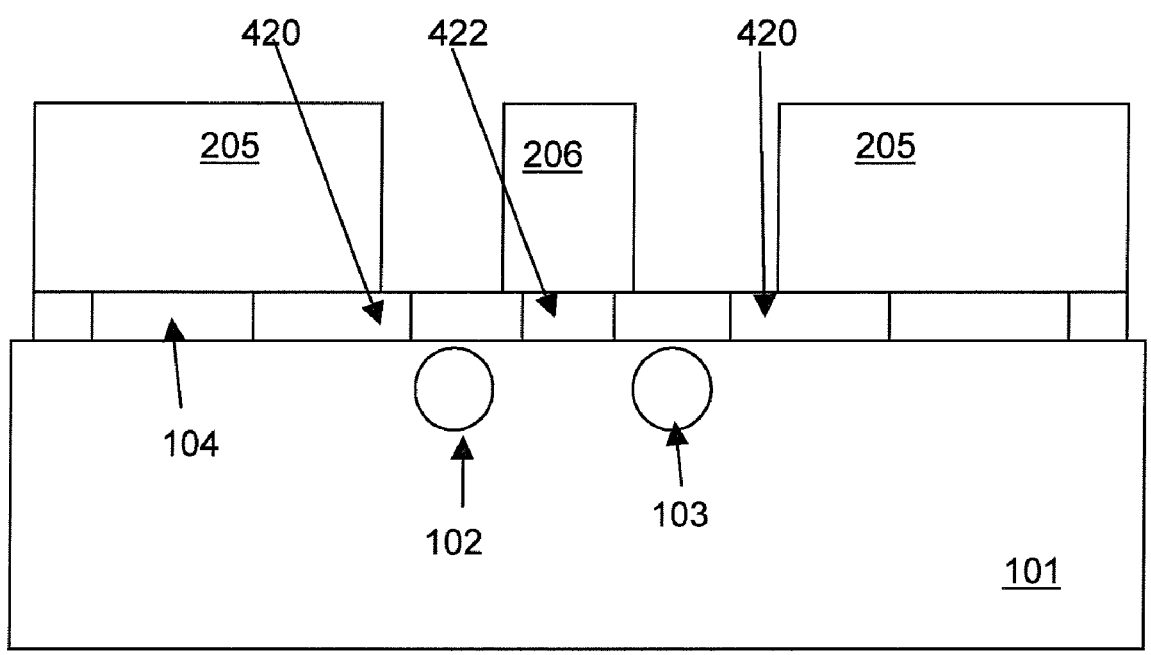
FIG. 9a is a cross-sectional view of another embodiment of an electro-optic device illustrating ion implanted bias electrodes which also form vias.

Furthermore, as shown in FIG. 9a, the lateral extent of the ion implanted conducting vias in the buffer layer 104 need not be confined to a fraction of the high resistivity bias electrode area, but can extend to the limits of the bias signal and ground electrodes respectively. In effect, the via and electrode merge to form a single entity. The RF ground electrode 205 can now make direct contact with the ion-implanted bias ground electrode 420, while the RF signal electrode 206 can now make direct contact with the ion-implanted bias signal electrode 422.

Figure 9B:
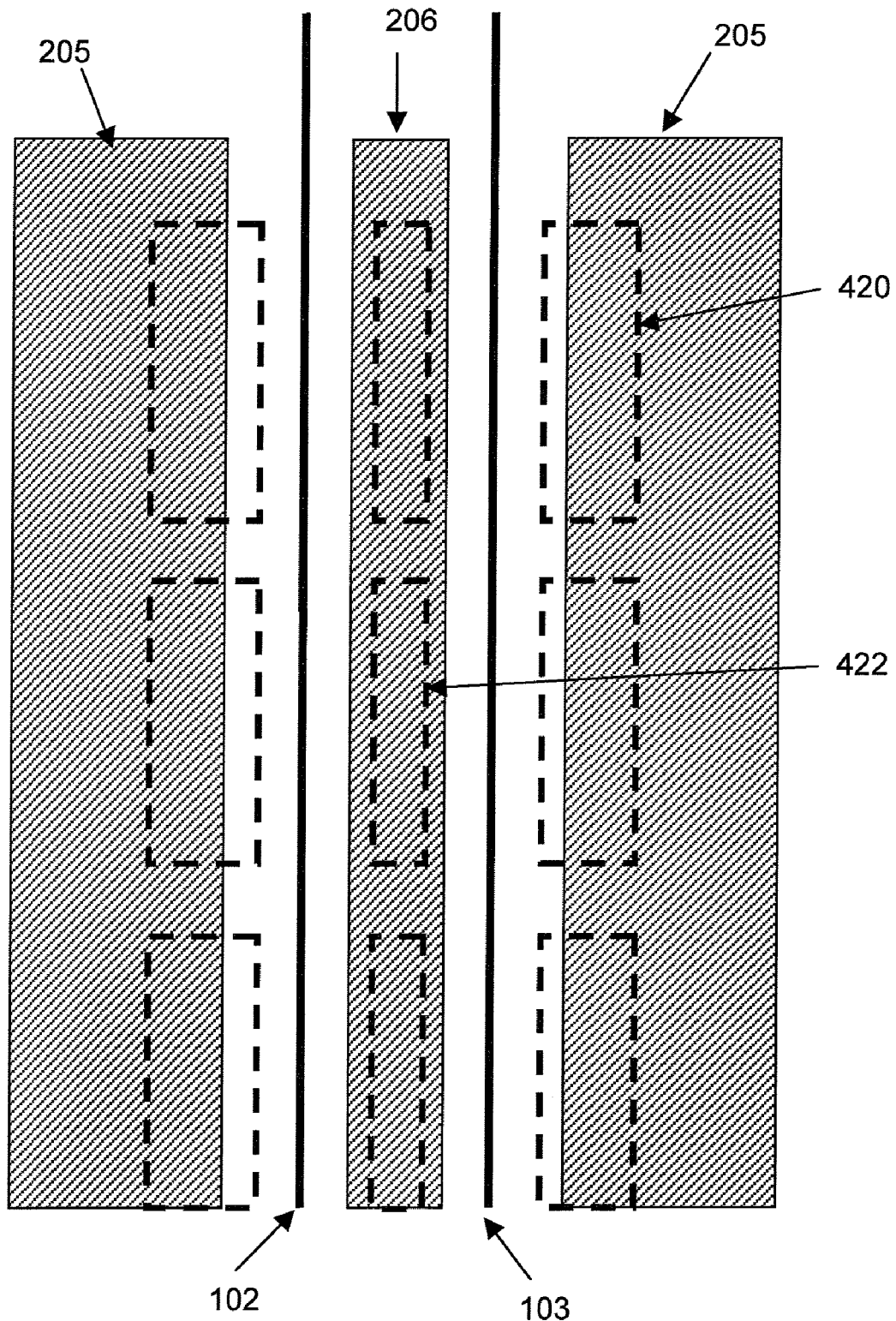

FIG. 9b shows the layout of a device corresponding to the cross-section in FIG. 9a. The ion-implanted segmented bias signal and ground electrodes (422 and 420 respectively) can be segmented as with other fabrication processes to prevent RF signals from propagating within the ion-implanted region.

Figure 10A:
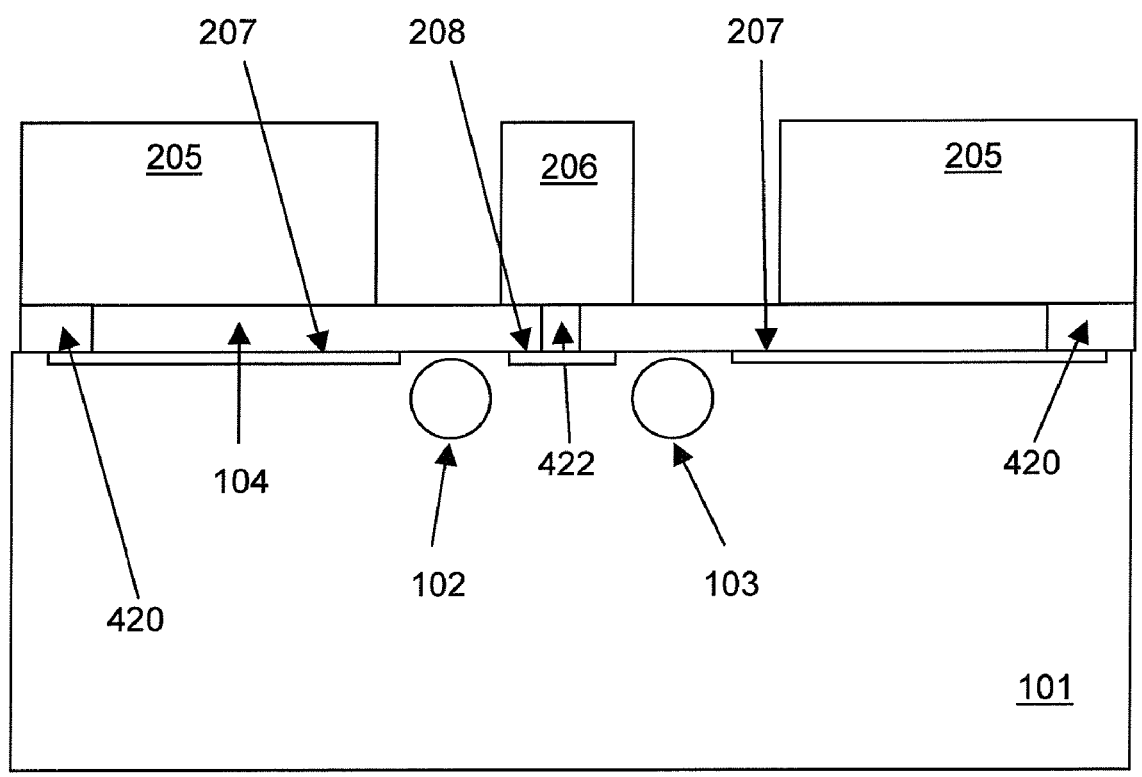
FIG. 10a is a cross-sectional view of an embodiment of an electro-optic device where the bias electrodes are ion implanted into the substrate.

FIG. 10a shows a cross-section of an embodiment where the bias electrodes are formed by etching trenches in the substrate 101, and partially or fully filling the trench with the high resistivity material for the bias electrodes. Conducting vias 422 can connect the buried bias signal electrode 208 with the RF signal electrode 206. Vias 420 can also connect the bias ground electrode 207 to the RF ground electrode 205, where the connection can be made at the periphery of the electrode, as shown. The buried bias electrodes have a higher modulation efficiency than those on the surface, thereby reducing the required bias voltage.

An alternative to etching trenches in the substrate and backfilling with high resistivity material for the bias electrodes is the use of ion implantation into the substrate with a suitable material to increase its electrical conductivity.

Figure 10B:
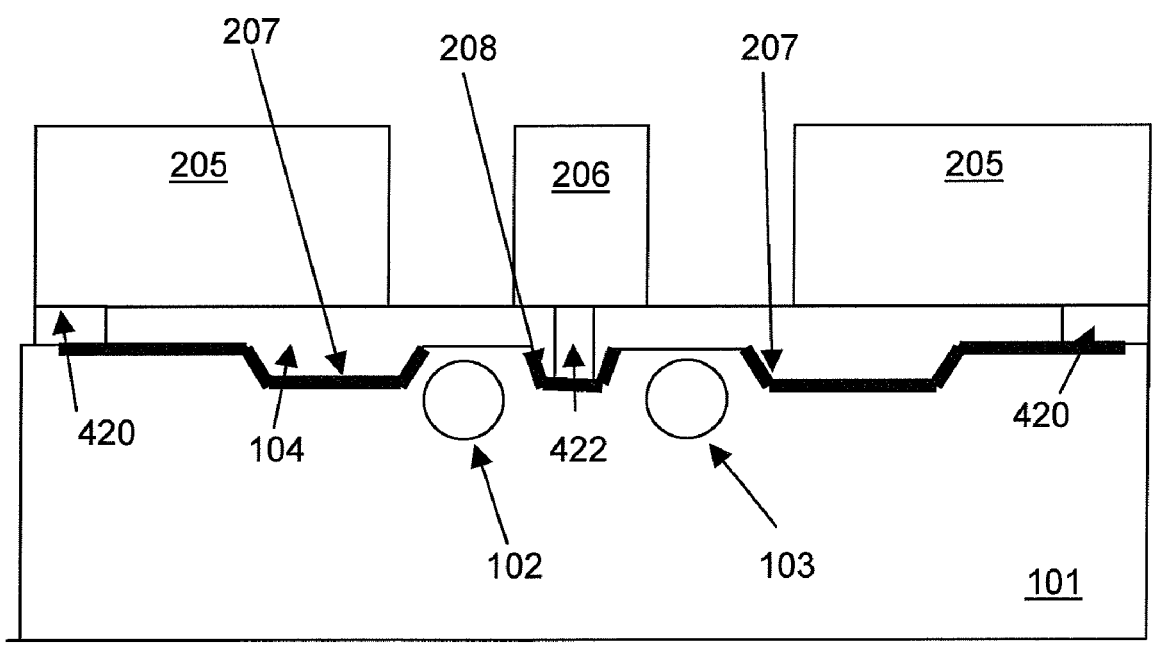
FIG. 10b is a cross-sectional view of another embodiment of an electro-optic device where the bias electrodes are ion implanted into trenches in the substrate.

FIG. 10b illustrates a variation of the device in FIG. 10a. In this embodiment, the trenches in the substrate 101 are deeper, and the bias electrodes 207, 208 conform to the surface of the trenches. The bias electrodes 207, 208 only partially fill the trench, with the buffer material filling the remainder of the space within the trench. The gold via 422 connects the buried bias signal electrode 208 to the RF signal electrode 206. The buried bias electrodes can also be used in other embodiments, where the RF signal electrode is DC isolated from the bias signal electrode.

Figure 11A:
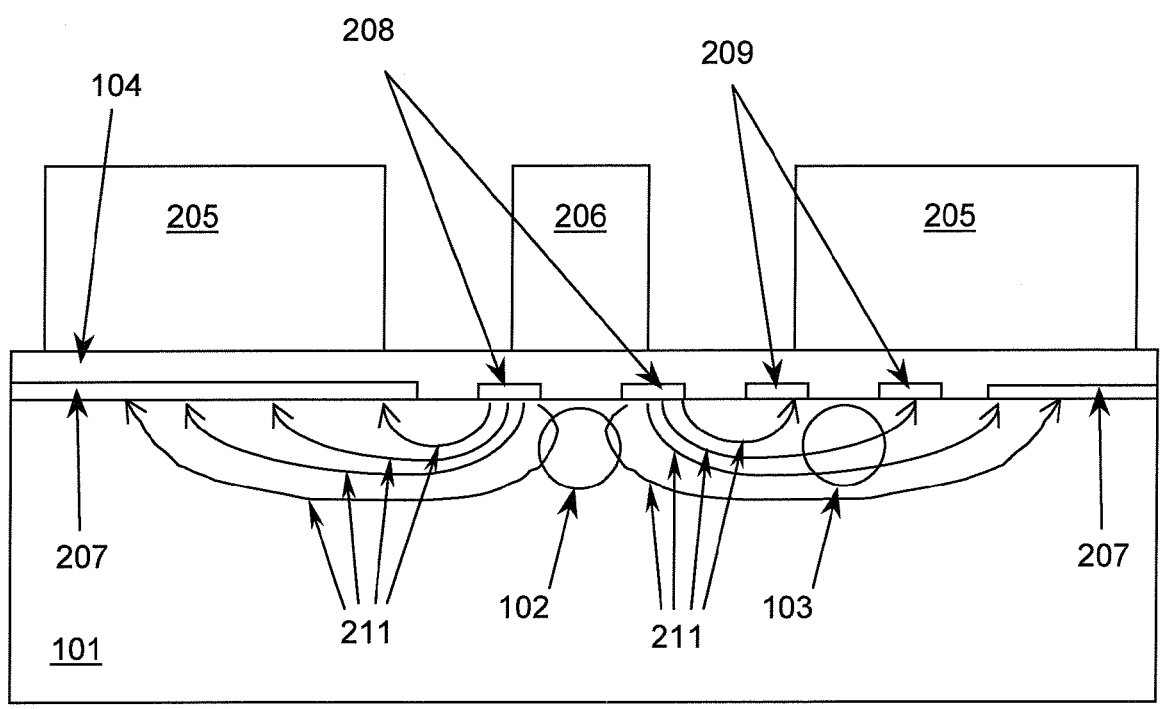
FIG. 11a is a cross-sectional view of an embodiment of a Z-cut electro-optic device showing the electric field generated when a voltage is applied to the split bias signal electrode on the left.

For Z-cut embodiments, of which an example is shown in FIG. 11a, the bias electrodes must be positioned above the optical waveguides 102, 103 to achieve the required electric field configuration. However resistive bias electrode material directly on the waveguide results in optical loss of about 1 to 2 dB/mm of electrode, or 30 to 60 dB for a 30 mm electrode. Because this amount of optical loss in the optical waveguide would be excessive, the bias signal electrodes 208, 209 are split along an axis parallel to the waveguides 102, 103 into two part-electrodes at equal voltage potential. There will be a trade-off between optical loss and bias electrode modulation efficiency (or $V_{pi}$), as the required bias drive voltage will increase as the gap in the split electrode is increased. Optical loss will of course decrease as the gap in the split electrode increases.

When bias voltage is applied to one of the split bias signal electrodes 208 while maintaining the second split electrode 209 at zero potential, the electric field lines 211 result. They are similar to what would be produced by a single electrode of the same width. The separation between the two part-electrodes depends on material parameters and the optical waveguide design, but typically lies in the range 10-14 micron (μm). It should be noted that in the first waveguide 102 the field is approximately vertical, while in the second waveguide 103 the field is approximately horizontal.

For the z-cut lithium niobate embodiments, if the split electrodes adjacent to the two waveguides are DC electrically isolated from the bias ground electrodes, a differential drive circuit can be used to drive the bias electrode. For example, if only one of the split electrodes is isolated and the other split electrode is grounded, and if $V_{pi}$=6V, a bias voltage of anywhere from −6V to +6V is required to set the interferometer bias point. With a differential drive a separate voltage is applied to each of the split electrodes, cutting the voltage in half to −3V to +3V. For example, +3V is applied to one split electrode, while −3V is applied to the other split electrode. Hence, the number of required voltages is doubled, but the range of required voltage is halved. Note that the ground bias electrodes are still required, as they help to focus the applied DC bias field through each waveguide. Removing the bias ground electrodes will decrease modulation efficiency, thereby increasing the $V_{pi}$ of the bias electrode.

Thus it is advantageous to have two signal electrodes in order to enable the RF and bias signals to be applied differentially to each signal electrode, either one at a time or with opposite polarities. In this way the required absolute signal voltage is halved, which can simplify the controller circuitry and power supplies.

Figure 11B:
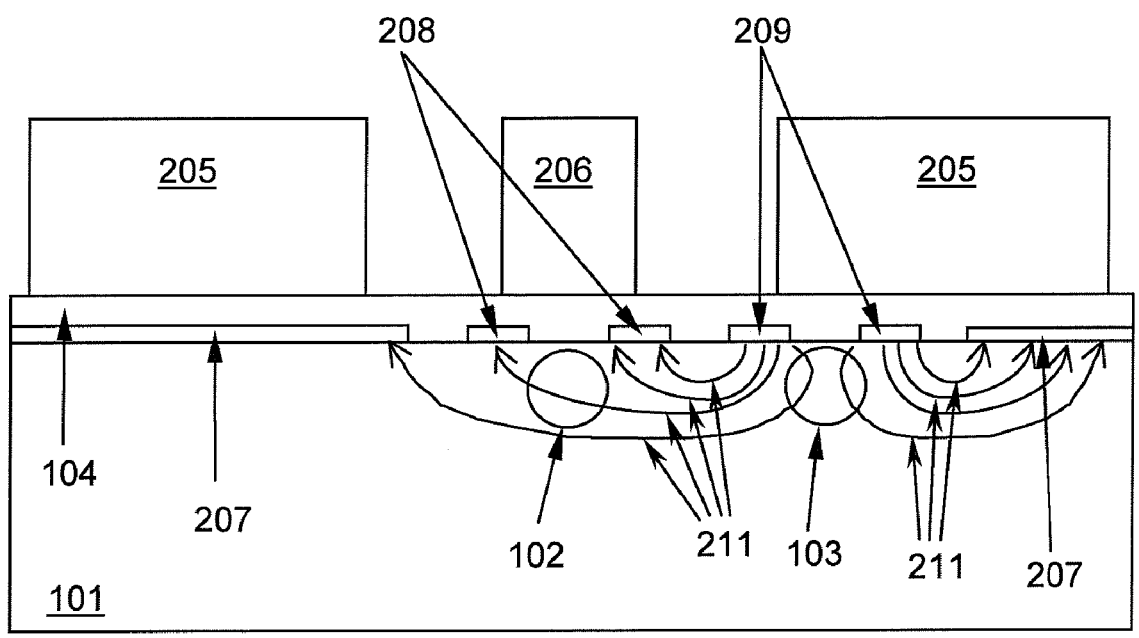
FIG. 11b is a cross-sectional view of an embodiment of a Z-cut electro-optic device showing the electric field generated when a voltage is applied to the split bias signal electrode on the right.

FIG. 11b shows the same device as in 11a with bias voltage applied to the second electrode 209 while maintaining the first electrode 208 at zero potential. The electric field configuration described by field lines 211 has been interchanged.

Figure 11C:
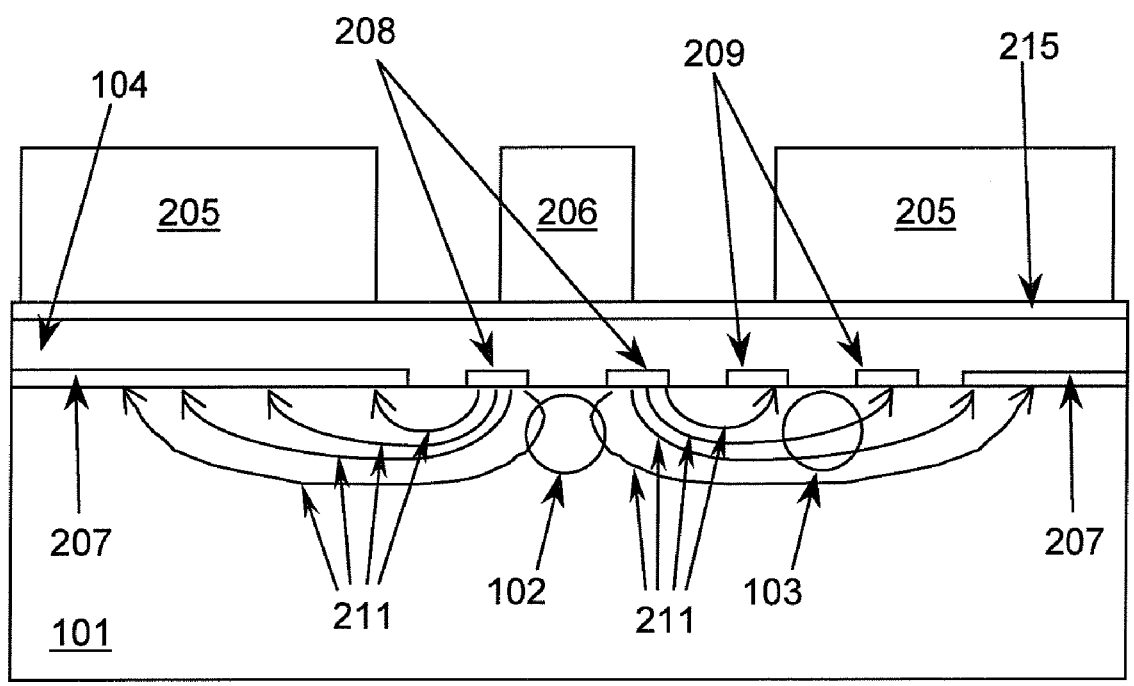
FIG. 11c is similar to the embodiment in FIG. 11a but with a bleed layer located on top of the buffer.
Figure 11D:
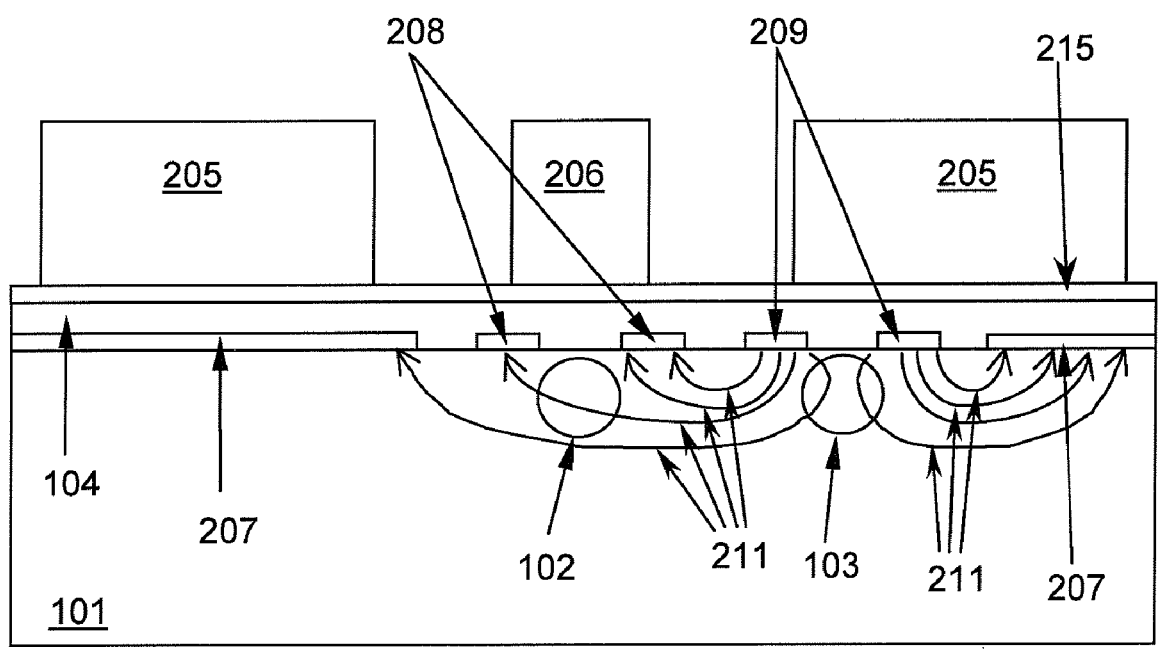
FIG. 11d is similar to the embodiment in FIG. 11b but with a bleed layer located on top of the buffer.

For both of the embodiments described in FIG. 11a and 11b, an additional high resistivity bleed layer 215 shown in FIGS. 11c and 11d respectively can be incorporated in the device structure.

Figure 12A:
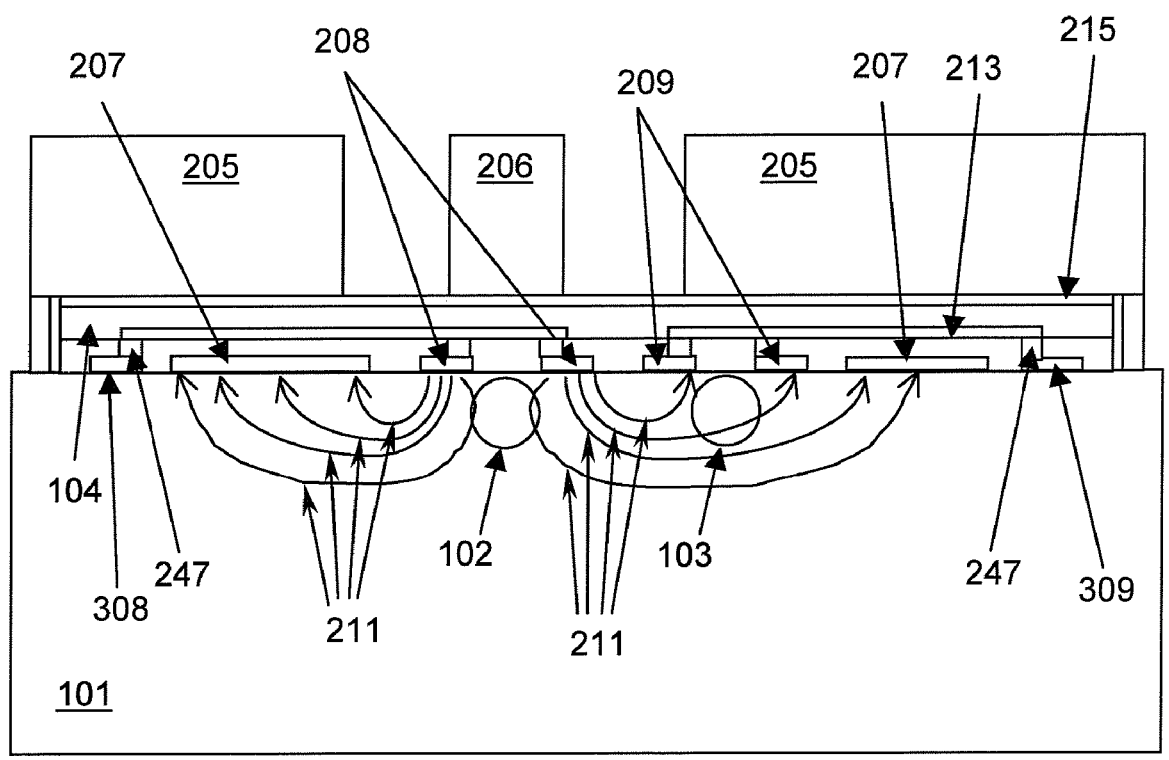
FIG. 12a is similar to the embodiment in FIG. 11c but with an interconnect electrode layer located within the buffer layer.

An embodiment for connecting the bias signals to the bias signals described in FIG. 11 is shown in FIG. 12a. High resistivity vias 247 periodically connect the bias signal electrodes 208, 209 to a high resistivity intermediate layer 213, which is connected to a wider bias signal electrode 308, 309 on the opposite side of the bias ground electrodes 207. The wider signal electrode reduces the series resistance introduced by long lengths of narrow split electrodes 208, 209. The high resistivity bleed layer 215 may encapsulate the buffer layer 104 at the sides for improved reliability in the presence of humidity.

Figure 12B:
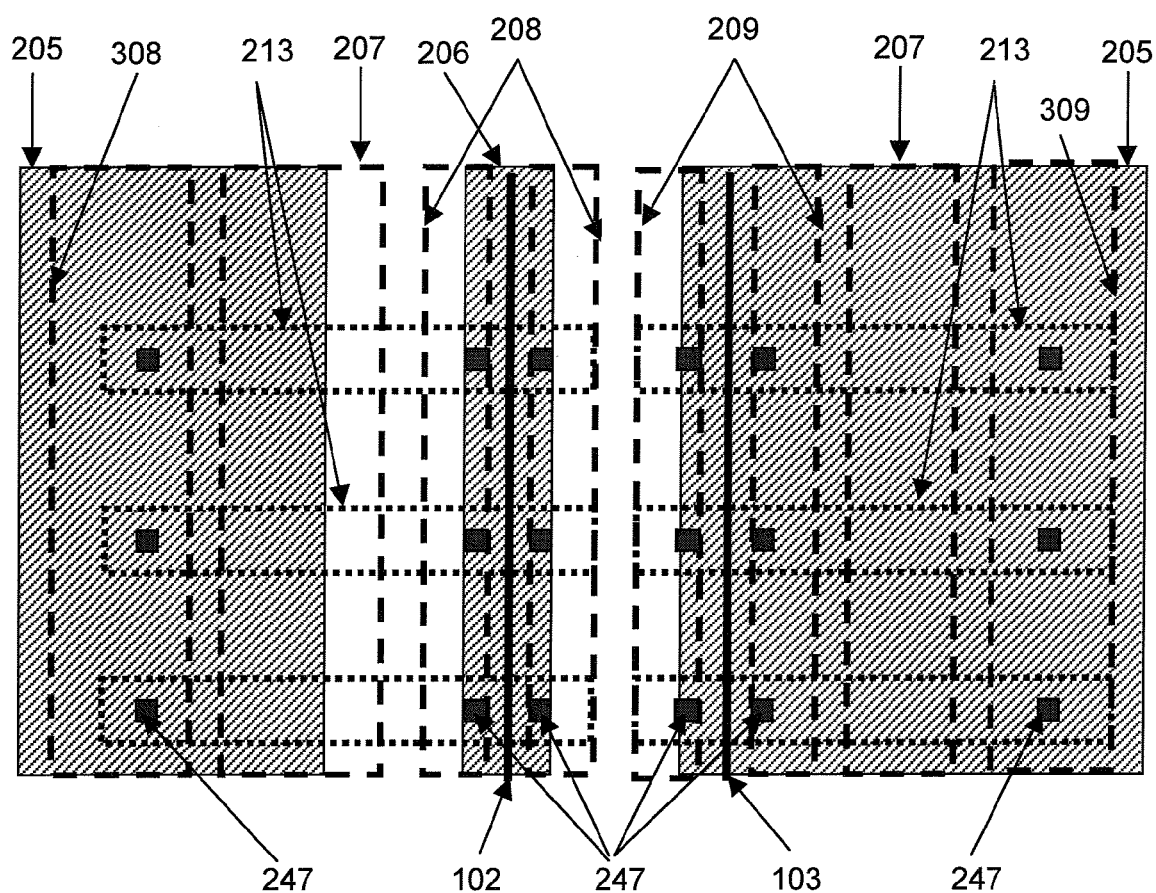
FIG. 12b shows the layout of the interconnecting electrodes in plan view.

The layout of this embodiment is shown in FIG. 12b, where the numbering has the same meaning as in FIG. 12a.

Figure 13A:
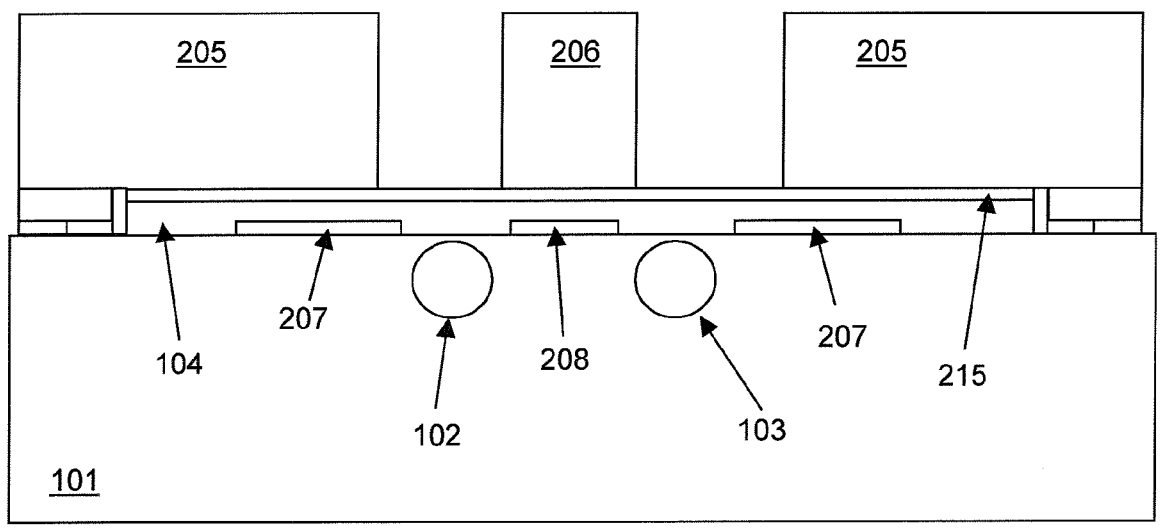
FIG. 13a is similar to the embodiment in FIG. 3a but incorporating an additional high-resistivity encapsulating layer on the surface of the buffer layer.

FIG. 13a shows an embodiment where a high resistive layer 215 is added on top of the buffer 104 to act as a moisture barrier, preventing voltage induced ion migration and corrosion in humid environment, as, for instance, in a non-hermetic package. Long term optical phase is determined by conduction current through substrate. Since buffer layer 104 conductivity is much lower than the substrate 101, conduction currents are unaffected by the high resistive encapsulating layer 215 on top of buffer layer 104. Field lines from high speed signal are unaffected by either high resistive electrodes 207, 208 or high resistive layer 215 on top of the buffer layer 104. DC bias control voltage is applied only to the bias electrodes 207, 208.

Figure 13B:
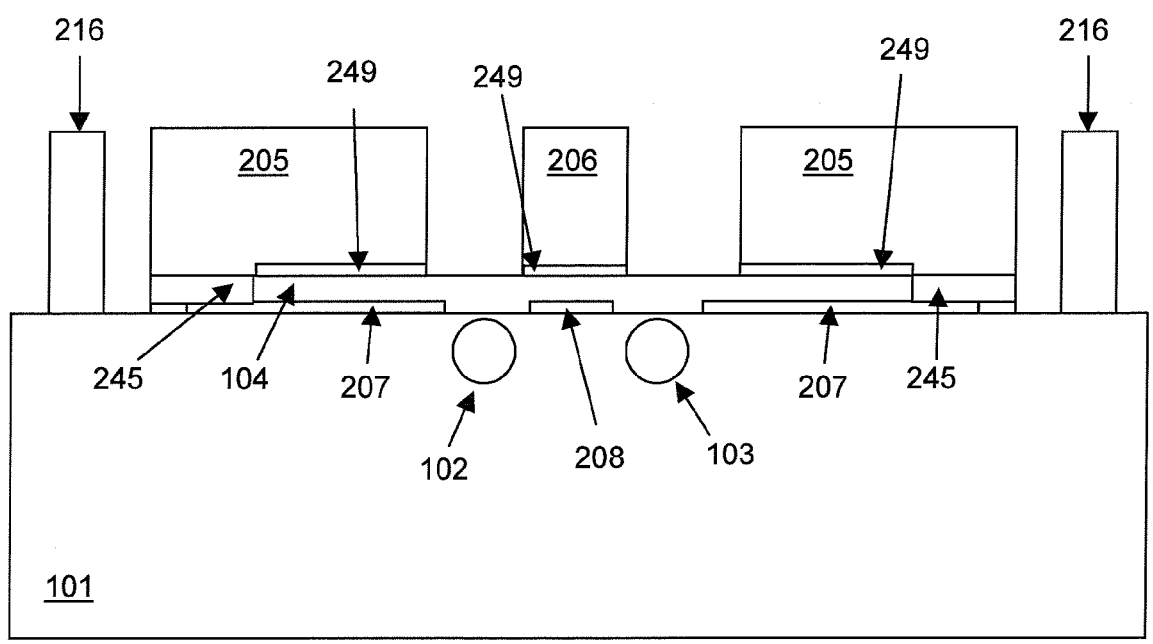
FIG. 13b is similar to the embodiment in FIG. 6b but with interfacing metallisation under the gold RF electrodes to improve electrode adhesion.

FIG. 13b shows a cross-section of a bias signal electrode 208 that is DC isolated from the gold RF signal electrode 206 (similar to FIG. 6a). The adhesion layer 249 underneath the gold RF ground and signal electrodes 205 and 206 is made of a thin layer of nickel. The gold-nickel RF electrode may suffer less from galvanic corrosion due to a smaller difference between the work functions of the two metals. In addition, the DC bias voltages appear only across the bias electrodes, eliminating voltage-enhanced corrosion of the gold electrodes. Hence, both corrosion mechanisms are eliminated, enabling low cost non-hermetic packaging of the modulator.

Figure 14A:
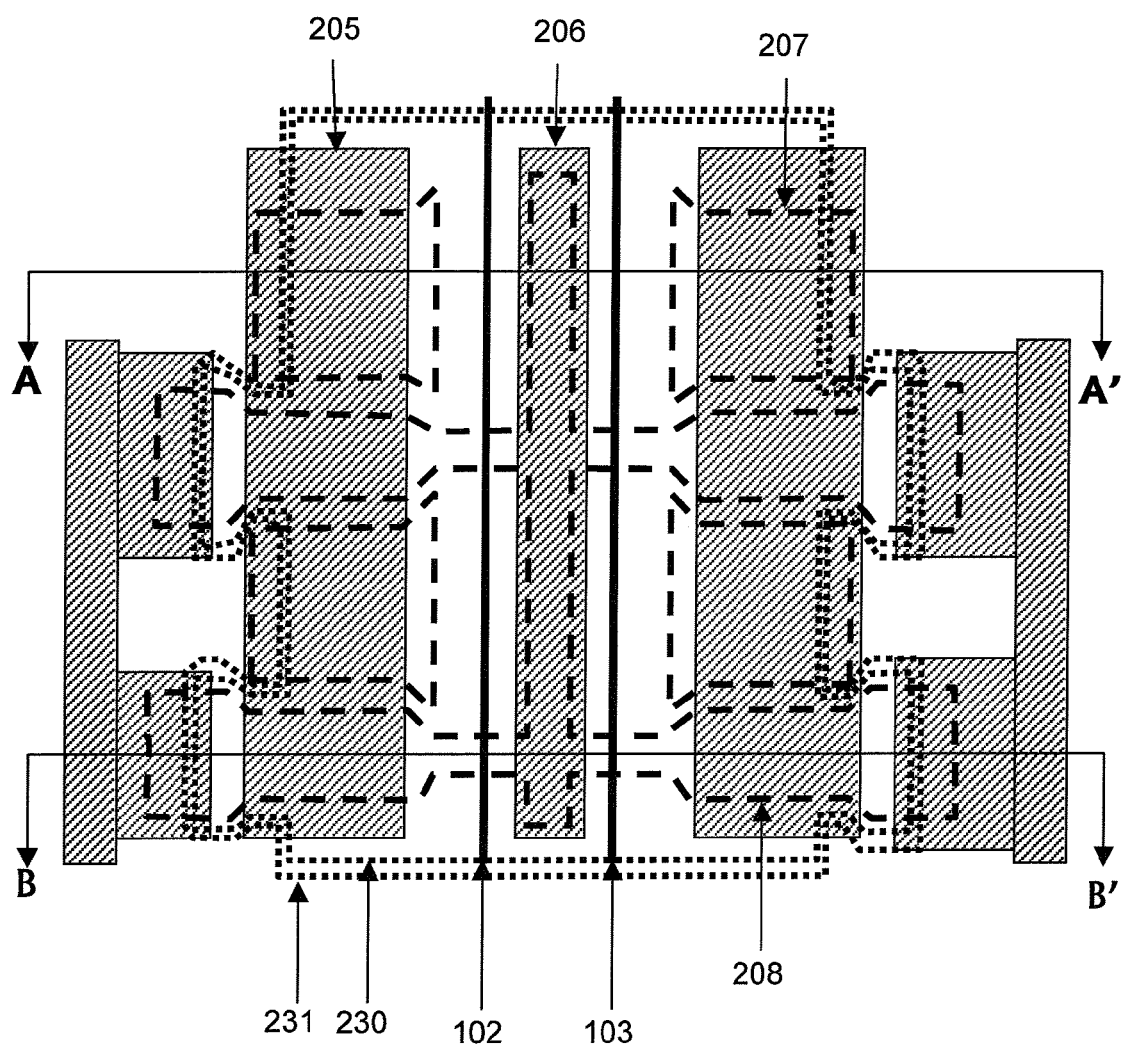
FIG. 14a show the layout of an embodiment of an electro-optic device incorporating a high-resistivity encapsulating layer on the surface of the buffer layer.

FIG. 14a is the layout of an embodiment with an encapsulating layer on top of the buffer layer for greater immunity to the effects of a humid environment. The encapsulating layer with outline 231 could be made of the bias electrode material or some other. No voltage potential is carried by the encapsulating layer.

Figure 14B:
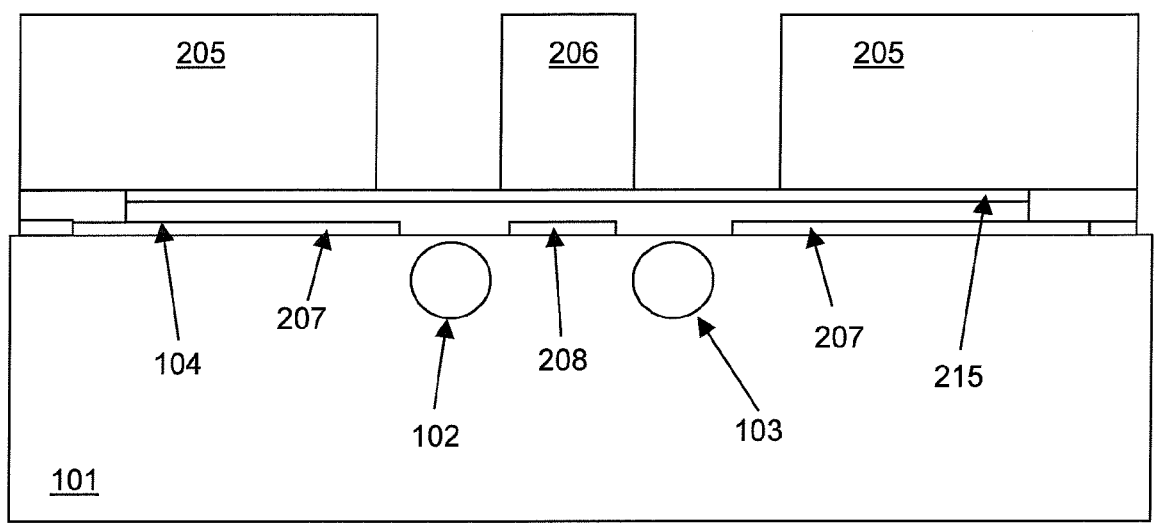
FIG. 14b is a cross-sectional view of the embodiment in FIG. 14a along A-A'.

FIG. 14b shows the cross-section along the section A-A' of the device in FIG. 14a with an encapsulating layer 215 on top of the buffer layer 104.

Figure 14C:
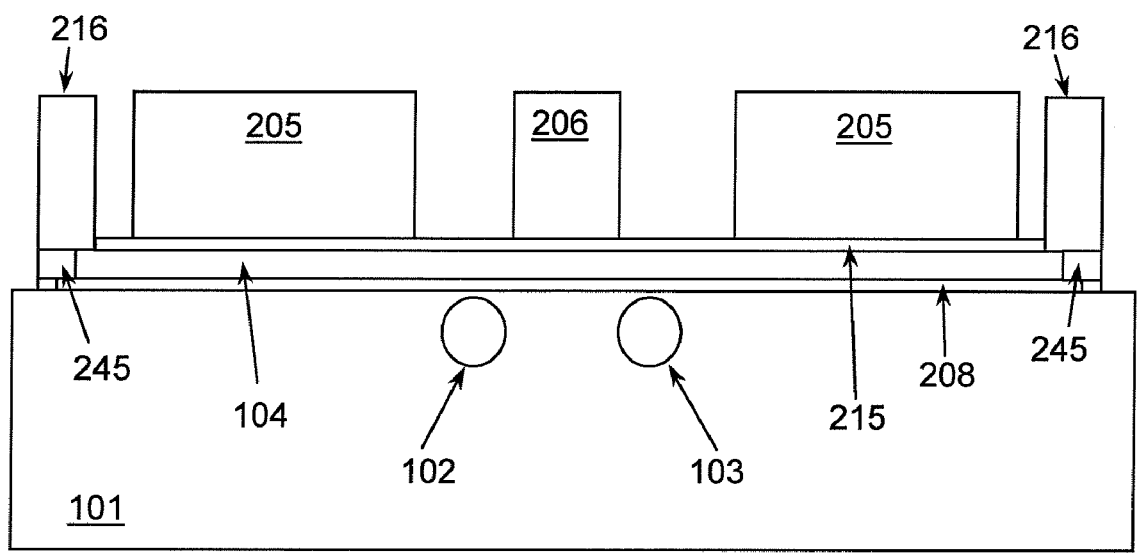
FIG. 14c is a cross-sectional view of the embodiment in FIG. 14a along B-B'.

FIG. 14c shows the cross-section along the section B-B' of the device in FIG. 14a. The encapsulating layer 215 on top of the buffer layer 104 covers the bias signal electrode 208 as it crosses the waveguides 102, 103 to connect to the external terminals 216 at the edges 245.

Figure 15A:
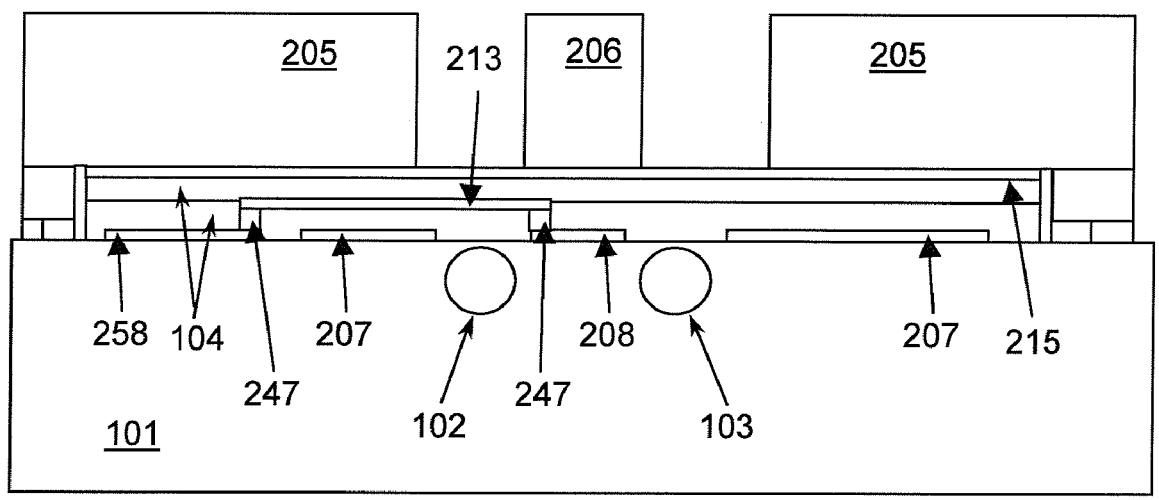
FIG. 15a shows an embodiment similar to that in FIG. 12a which uses interconnecting bridges to connect to the bias signal electrode.

In FIG. 15a, high resistivity vias 247 and an intermediate high resistivity layer 213 vias allow for multilayer interconnection. For example, they can connect the narrow bias signal electrode 208 to a wider bias electrode 258 on the substrate 101 surface, in order to reduce the series resistance of the narrow bias signal electrode. The bias electrodes are DC isolated from the gold RF electrodes. The electrodes 205 may encapsulate the high resistivity layer 215 and buffer layer 104 at the ends, for improved reliability in the presence of humidity.

Figure 15B:
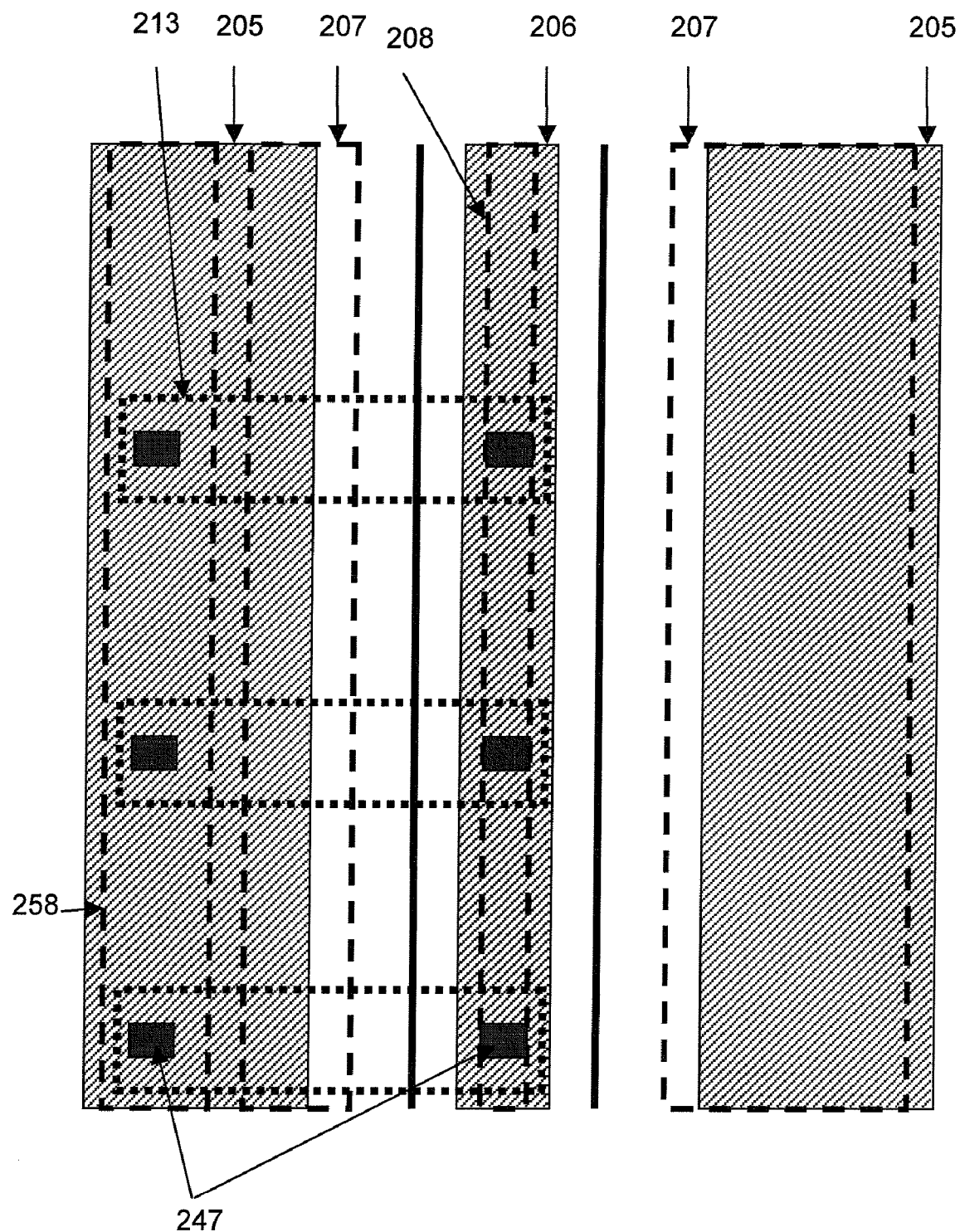

This embodiment is shown in plan in FIG. 15b, where the intermediate layer bridges 213 are shown interconnecting the narrow bias signal electrode 208 to a wider bias electrode 258 through vias 247. Resistivity of all bias electrode layers is high enough to prevent any additional signal strength loss for RF signals traveling in the RF electrodes. However, their resistivity is low enough that their time constant is short enough to prevent bias voltage run-away due to buffer layer charging.

Figure 16A:
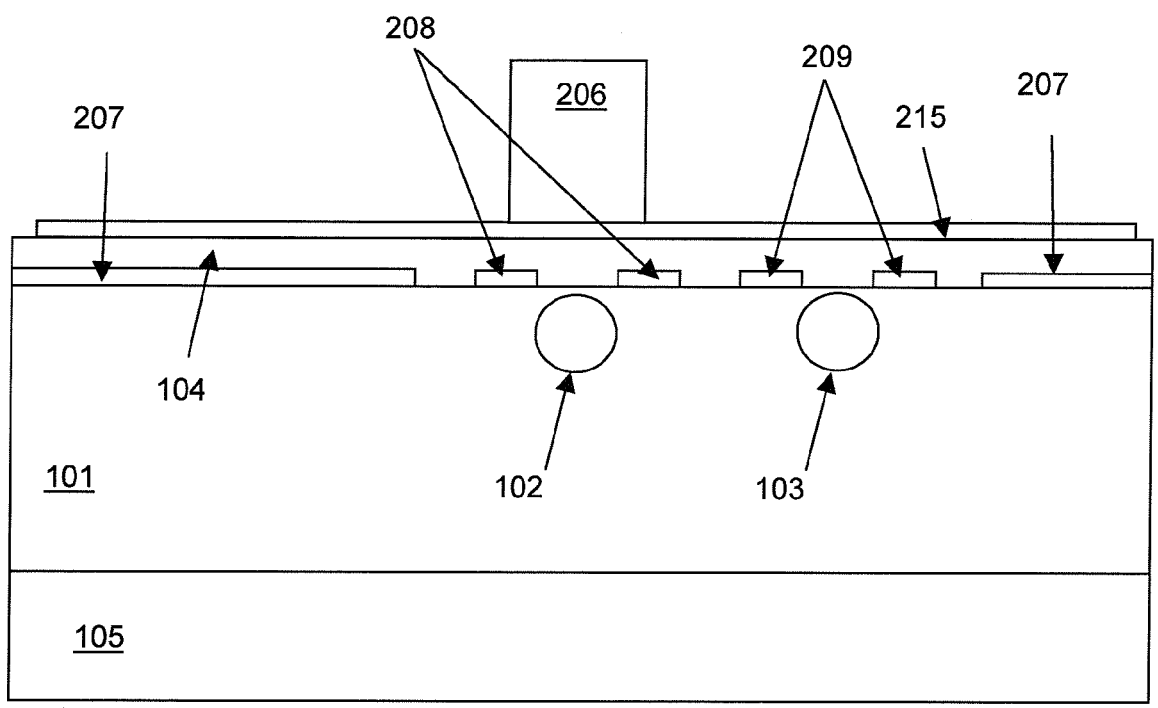
FIG. 16a is a cross-sectional view of a Z-cut embodiment of an electro-optic device where the RF ground electrode is located on the bottom of the substrate.

With the additional design flexibility provided by this invention, several configurations become available for constructing the microwave transmission line used for applying the RF signal to the optical waveguide over typical interaction lengths of 20 mm to 70 mm. FIG. 16a shows the cross-section of an embodiment on Z-cut LiNbO$_3$ in which the substrate 101 has been thinned so that a microstrip line is formed by the RF signal electrode 206 operating in conjunction with a RF ground electrode 105 located on the bottom of the substrate 101.

Figure 16B:
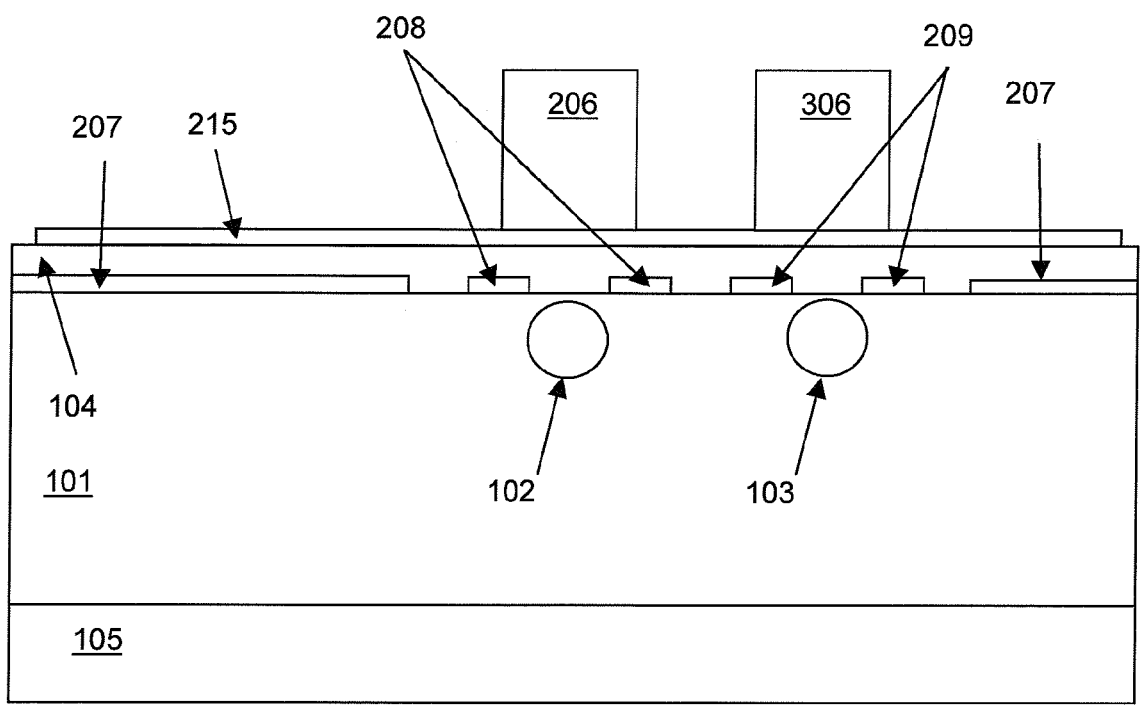
FIG. 16b shows a similar embodiment to that in FIG. 16a but with two RF signal electrodes to enable differential RF drive.
Figure 16C:
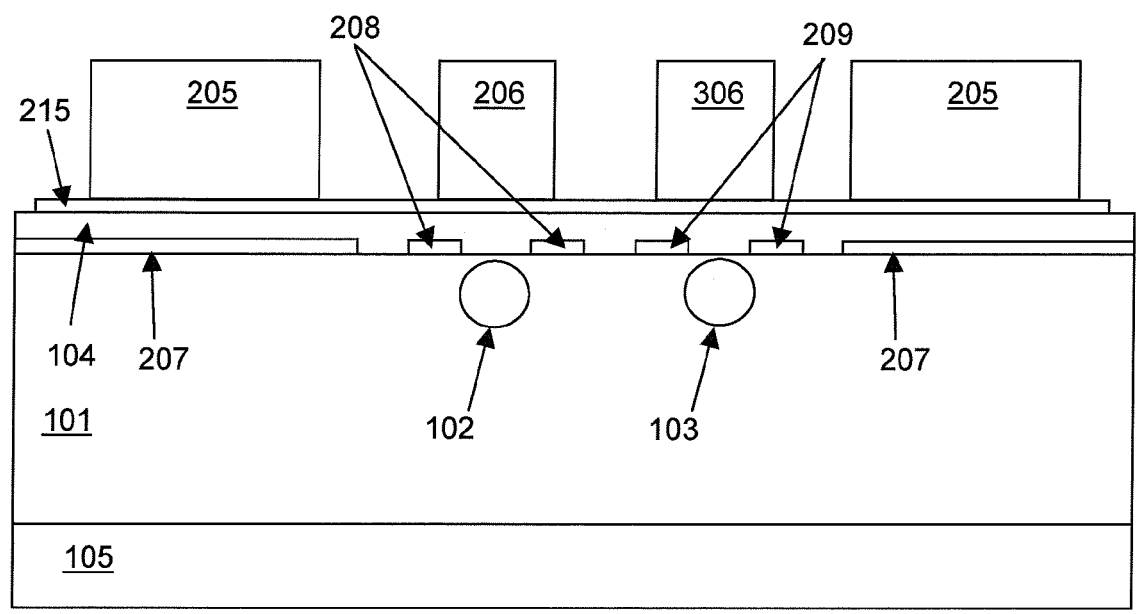
FIG. 16c shows a similar embodiment to that in FIG. 16b but with added coplanar RF ground electrodes.

For differential RF operation, an additional RF electrode 306 can be introduced, as shown in FIG. 16b. In FIG. 16c, a further variation of this embodiment is achieved by the addition of coplanar RF ground electrodes 205.

Figure 16D:
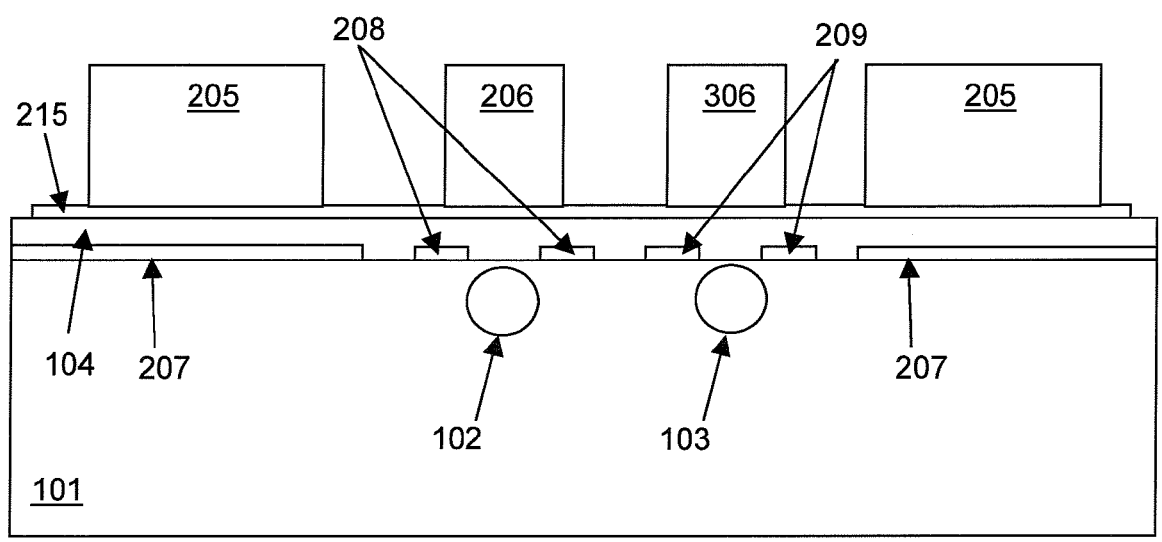
FIG. 16d shows a similar embodiment to that in FIG. 16b but without the RF ground electrode is located on the bottom of the substrate.
Figure 16E:
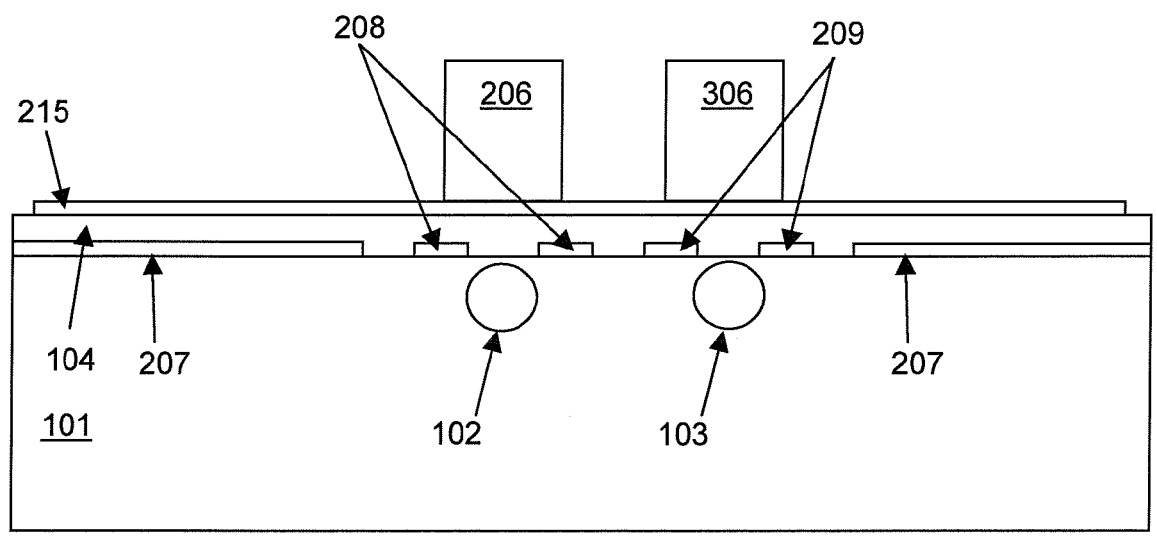
FIG. 16e shows a similar embodiment to that in FIG. 16d but without any gold RF ground electrodes.

FIG. 16d depicts another embodiment derived from that in FIG. 16c by not including the RF ground electrode on the bottom of the substrate 101, such that the RF signal is propagated along the microwave transmission line comprising RF electrodes 205, 206 and 306. In this case, the substrate thickness does not have to be thinned down. Differential operation of the device in FIG. 16d can obviate the need for RF ground electrodes, as illustrated in FIG. 16e.

Figure 17A:
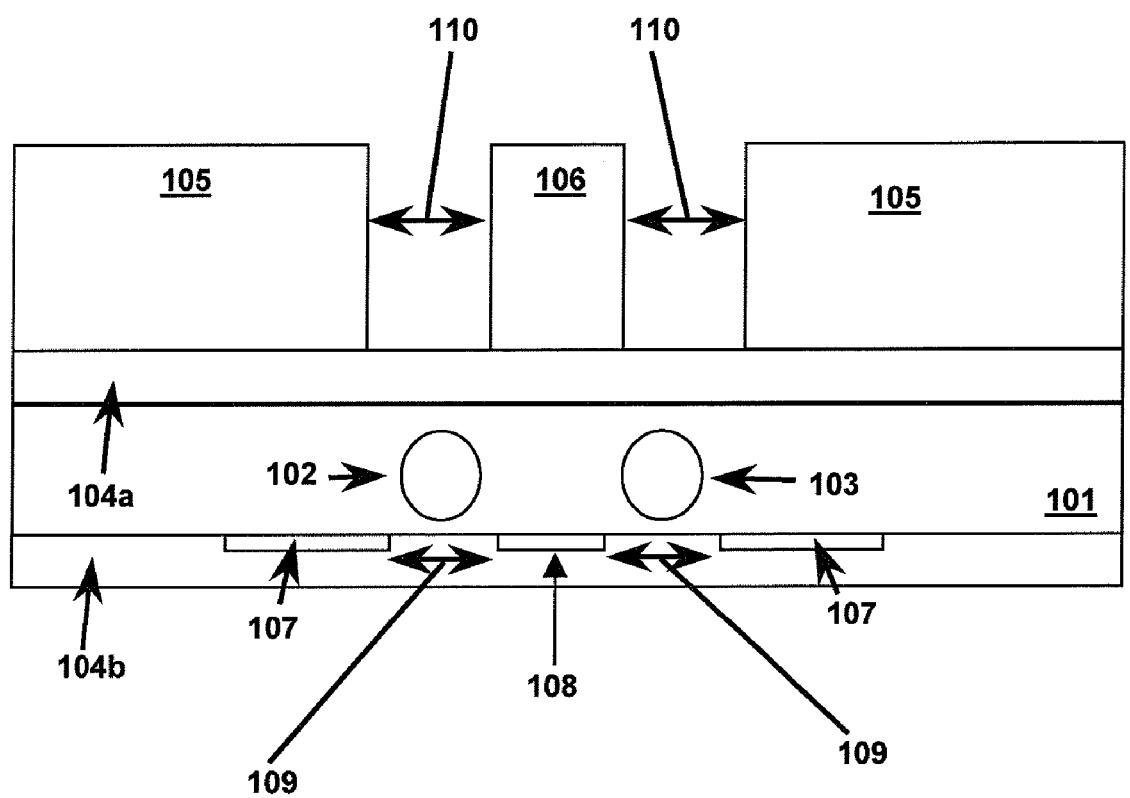
FIG. 17a is a cross-sectional view of the modulator of FIG. 2 taken along line A-A'.

FIG. 17a is the same as FIG. 3a, except the substrate 101 has been made thin, and the bias electrodes 107 and 108 are formed on the bottom of the substrate. The field from the bias electrodes is able to reach the waveguide due to the small thickness of the substrate. There is a buffer layer 104a between the RF electrodes and substrate. In addition, there is a second buffer layer 104b covering the bias electrodes, acting as a protective coating. This embodiment is relevant for x-cut lithium niobate.

Figure 17B:
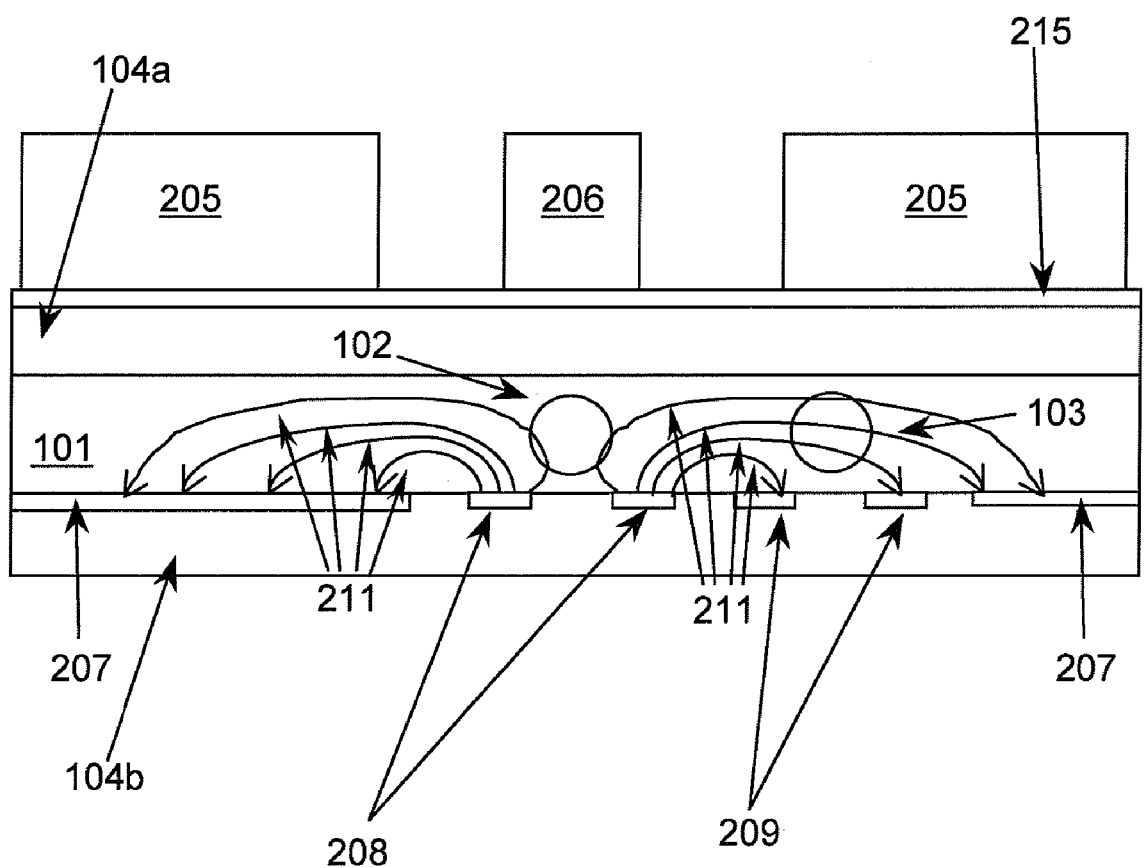
FIG. 17b is a further cross-sectional view of an embodiment of a Z-cut electro-optic device.

FIG. 17b shows an embodiment similar to FIG. 11c, however, as in FIG. 17a, the substrate 101 is made thin, and the bias electrodes 207, 208, and 209 are formed on the bottom of the substrate. The field lines 211 from the bias electrode reach the waveguide due to the small thickness of the substrate. There is a buffer layer 104a between the RF electrodes and substrate. In addition, there is a second buffer layer 104b covering the bias electrodes, acting as a protective coating.

FIGS. 17a and 17b permit the use of one material for the buffer layer 104a, while a second, more protective material 104b is used to cover the bias electrodes. The dielectric constant and other properties of material used for 104b need not be the same as that used for 104a, allowing more design flexibility.

In each of the above-described embodiments, the low frequency or DC bias voltage is applied to a bias electrode that overlaps with, but is distinct from, an overlying RF electrode. In other words, the bias electrode, which may be disposed above or below the substrate, is positioned at least partially below the RF electrode. Accordingly, these bias electrodes have been also termed shadow electrodes.

Advantageously, these multi-layer designs allow the electric field lines generated by the bias electrode and the RF electrodes to be substantially parallel (e.g., within each waveguide). Further advantageously, these multi-layer designs allow the bias electrodes to be positioned near and/or in direct contact with the electro-optic substrate, thus improving efficiency and reducing DC drift, whereas the RF electrodes can be positioned on top of a buffer layer, thus allowing velocity matching. Notably, these multi-layer designs significantly reduce the require length of the electro-optical device relative to devices wherein the bias electrodes are optically in series with the RF electrodes.

Another advantage provided in many of these embodiments is increased humidity tolerance. As is well known in the art, the presence of high magnitude electric fields and high humidity often results in corrosion of electro-optic devices. For example, when a metal adhesion layer (e.g., Ti, Ti/W, Cr, etc) is used to promote adhesion between an RF electrode (e.g., gold) and an electro-optic substrate (e.g., $LiNbO_3$) or buffer layer or bleed layer, any moisture in direct contact with the multi-layer structure will serve as an electrolyte that induces galvanic corrosion. Galvanic corrosion, which results from the difference in electrochemical potentials of dissimilar metals, can create a conductive deposit between the surface RF electrodes, which causes current leakage, short circuit, or peeling of the RF electrodes. Various schemes have been proposed to obviate galvanic corrosion, and thus reduce the need for a hermetic package. For example, in U.S. Pat. No. 6,867,134 the adhesion layer is eliminated, whereas in U.S. Pat. Appl. No. 20030062551 the adhesion layer is encapsulated. Alternatively, and as discussed above, the adhesion layer can be made of a thin metal, such as nickel, which has a work function similar to gold. While these methods do suppress galvanic corrosion, electro-migration corrosion can still occur. Electro-migration corrosion occurs when a large DC voltage is applied across closely-spaced electrodes (e.g., gold RF electrodes) in the presence of water or a high humidity level. Similar to galvanic corrosion, electro-migration corrosion negatively impacts the performance and reduces the service life of electro-optic devices. As a result, electro-optic devices are often coated as shown in U.S. Pat. No. 6,560,377 and/or sealed in hermetic packages.

In the above-described embodiments of the instant invention, humidity tolerance is increased in various ways. For example in some embodiments, the large DC voltage is applied to bias electrodes that are disposed beneath a buffer layer, whereas in other embodiments the large DC voltage is applied to bias electrodes that are disposed below the substrate. Since these buried bias electrodes are protected from humidity, electro-migration corrosion of the buried bias electrodes is reduced. Moreover, if the buried bias electrodes are DC isolated from the RF electrodes, then electro-migration corrosion of the RF electrodes is also minimized. Furthermore, if the adhesion layer is eliminated, encapsulated, and/or formed of a material with a work function similar to that used to form the RF electrode, then both galvanic and electro-migration corrosion mechanisms are eliminated, enabling low cost non-hermetic packaging of the electro-optic device.

In addition, humidity tolerance is also provided by fabricating the bias electrodes from a high resistivity material (e.g., a material having an electrical resistivity substantially higher than that of the RF electrodes, but substantially lower than the substrate). Notably, these high resistivity bias electrodes have been found to be significantly more robust than prior art high-conductivity bias electrodes (e.g., fabricated from gold).

Figure 18A:
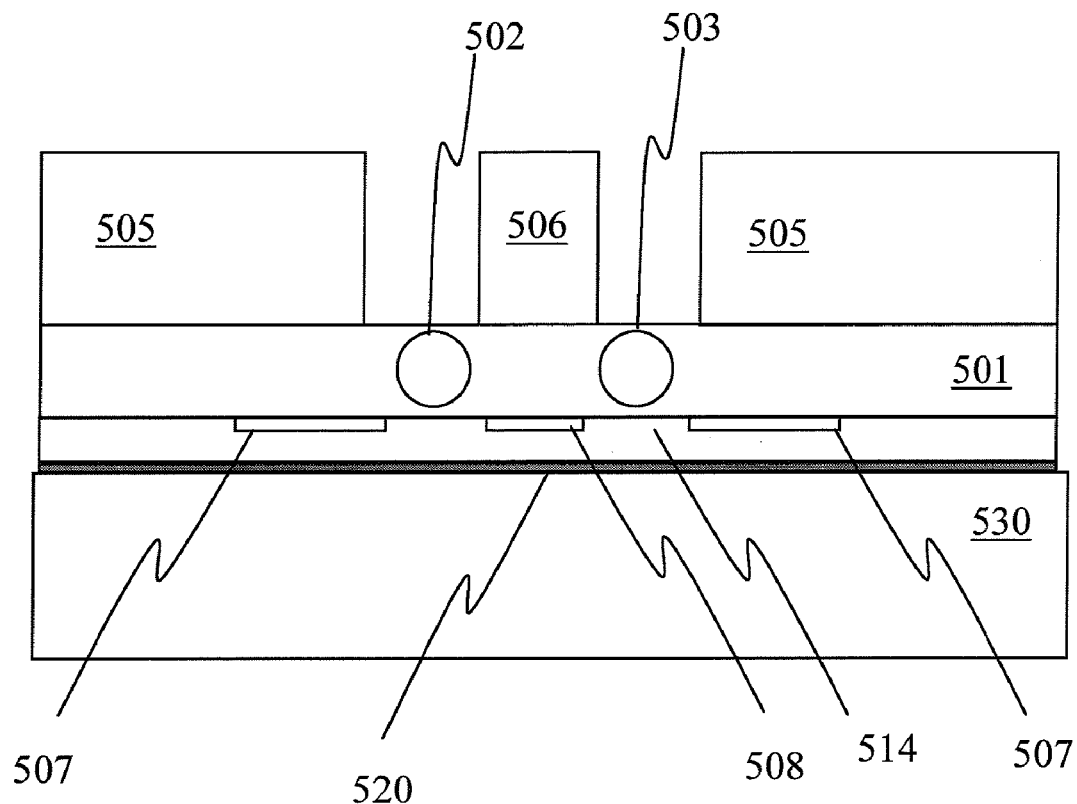
FIG. 18a is a cross-sectional view of an electro-optic device having a thin substrate in accordance with one embodiment of the instant invention.

Referring to FIG. 18a, there is shown a cross sectional view of another embodiment of a humidity tolerant electro-optic device. Similar to the device shown in FIG. 17a, this electro-optic device includes a thin electro-optic substrate 501, first 502 and second 503 optical waveguides, ground RF electrodes 505, a signal RF electrode 506, bias ground electrodes 507, a bias signal electrode 508, and a buffer layer 514. The electro-optic device also includes a supporting substrate 530, which is coupled to the buffer layer 514 with an adhesive layer 520.

In this embodiment, the substrate material is X-cut lithium niobate ($LiNbO_3$). According to other embodiments, the substrate 501 is formed from materials such as Y-cut $LiNbO_3$, all crystal cuts of lithium tantalate ($LiTaO_3$), semiconductors such as gallium arsenide (GaAs) and indium phosphide (InP), etc. While the width and length of the substrate 501 will vary with the design of the device, the thickness of the substrate 501 should be small enough to allow both the high frequency electric fields from the RF electrodes 505/506 and the low frequency or DC fields from the bias electrodes 507/508 to reach the optical waveguides 502/503. At the same time, the thickness of the substrate 501 should also be large enough to support the optical waveguides 502/503 and/or the RF electrodes 505/506. For example, in this embodiment the thickness of the X-cut $LiNbO_3$ substrate is preferably below 20 µm, more preferably below 15 µm, and most preferably below 10 µm.

The first 502 and second 503 optical waveguides are embedded in, or otherwise supported by, the substrate 501. The optical waveguides 502/503 are typically fabricated using one of various well-known methods, such as titanium diffusion or proton exchange. For example, according to one embodiment the waveguides 502/503 are formed by patterning titanium in or on a $LiNbO_3$ substrate, followed by subjecting the substrate to increased temperatures to allow the titanium to diffuse therein. The pattern used to form the waveguides 502/503 is dependent on the electro-optic device. For example, if the device is a Mach-Zehnder modulator, then the pattern may be similar to that illustrated in FIG. 2. Alternatively, the pattern is compatible with other devices such as a tunable directional coupler. Notably, the optical waveguides 502/503 are typically about 7 µm wide and about 3 µm deep.

The ground RF electrodes 505 and the signal RF electrode 506 are disposed on the upper side of the substrate 501. More specifically, the ground RF electrodes 505 and the signal RF electrode 506 are supported by an upper surface of the substrate 501. The RF electrodes 505/506 are part of an RF electrode structure used to apply a high-frequency RF voltage across the waveguides. For example, according to one embodiment, the RF electrode structure forms a traveling-wave electrode structure used to propagate a microwave signal that generates an electric field one or both of the optical waveguides. The RF electrodes 505/506 are typically formed from a material that exhibits high electrical conductivity such as gold (Au), copper (Cu), silver (Ag), or platinum (Pt). In general, Au is the most common RF electrode material. Since Au does not readily adhere to $LiNbO_3$ substrates, an adhesion layer may be used to promote adhesion. Conventional adhesion layers include thin film layers of chromium (Cr), titanium (Ti), titanium-tungsten (Ti/W), etc. Optionally, the adhesion layer is formed from nickel (Ni), which has a work function similar to that of Au. As discussed above, a matched work function assures that little if any voltage potential arises across the two metals, thus reducing galvanic corrosion. Alternatively, the adhesion layer is encapsulated as described in U.S. Pat. Appl. No. 20030062551, or eliminated as described in U.S. Pat. No. 6,867,134 by activating the surface.

The RF electrodes 505/506 are typically fabricated using one of various well-known methods, including electroplating and sputtering.

The bias ground electrodes 507 and the bias signal electrode 508 are disposed on the lower side of the substrate 501. More specifically, the bias ground electrodes 507 and the bias signal electrode 508 are supported by the lower surface of the substrate 501. The bias electrodes 507/508 are part of the bias electrode structure used to apply a low-frequency or DC voltage across the optical waveguides. For example, according to one embodiment, the bias electrodes generate an electric field in one or both of the optical waveguides, thus setting the operating point of the electro-optical device. The bias electrodes 507/508 typically are formed from high-resistivity materials such as tantalum silicon nitride (TaSiN), amorphous silicon (Si), indium oxide ($In_2O_3$), etc., to improve humidity tolerance. Note that the chemical composition of TaSiN may be complex, and that the ratio is not typically 1:1:1 as suggested by the abbreviated chemical name (e.g., it is more accurately represented by $Ta_xSi_yN_z$). Suitable resistivity values for the bias electrode material lie between that of the RF electrode material and that of the substrate. For example, tantalum silicon nitride typically has a resistivity in the range of about $\sim 10^4$ to $10^6$ $\Omega$-cm @25° C., which is between $2.3 \times 10^{-6}$ $\Omega$-cm @25° C. (Au) and $\sim 1.3 \times 10^{17}$ $\Omega$-cm @25° C. ($LiNbO_3$). Preferably, the resistivity of the bias electrode material is in the range from about 1 to $10^8$ ohm-cm ($\Omega$-cm) @25° C., more preferably from about $10^2$ to $10^7$ ohm-cm ($\Omega$-cm) @25° C., and most preferably from about $10^4$ to $10^6$ ohm-cm ($\Omega$-cm) @25° C. The lower the resistivity of the bias electrode, the more coupling that occurs with the RF signal, potentially increasing the net RF loss per unit length of the RF signal. Optical loss due to the proximity of the bias electrode near the waveguide may also increase with decreasing resistivity. Note that the response time of the bias electrode to an applied voltage is reduced as bias electrode resistivity is lowered. According to one embodiment, the bias electrodes are DC isolated from the RF electrodes to further improve humidity tolerance. One well-known method of providing DC isolation is to use a bias-tee to couple the signal bias electrode 508 and the RF signal electrode 506. Of course, various other bias control circuits are also envisioned. For example, in one circuit, the slowly varying DC components of the bias signal are passed onto the bias electrodes via a low-pass filter, whereas rapidly varying AC components of the bias signal are applied to the RF electrodes via a high-pass filter. This arrangement boosts the high end frequency response to the incoming bias signal, accommodating dither signals or other tones in the MHz frequency range, that are often summed in with the slowly varying bias voltage.

The buffer layer 514 is optionally provided to protect and/or insulate the bias electrodes 507/508. For example, the buffer layer may improve electrical isolation between the bias electrodes 507/508, which otherwise might be compromised by the adhesive layer 520. Accordingly, the buffer layer is typically formed from a non-conductive material such as $SiO_2$, benzocyclobutene (BCB), etc. Notably, the resistivity of conventional $SiO_2$ buffer layers is about $10^{18}$ $\Omega$-cm @25° C. The buffer layer 514 is typically deposited on the lower surface of the substrate such that it substantially covers the bias electrode structure. The buffer layer 514 may be planarized throughout the wafer (e.g., as shown) or patterned with the bias electrode structure.

The supporting substrate 530 is provided to increase the mechanical strength of the device. The supporting substrate is optional, depending on the thickness of the electro-optic substrate 501 and/or the thickness of the buffer layer(s) (e.g., 514). The supporting substrate 530 is typically fabricated from a low-dielectric constant (i.e., low epsilon) material such as alumina, printed circuit board materials, etc.

Figure 18B:
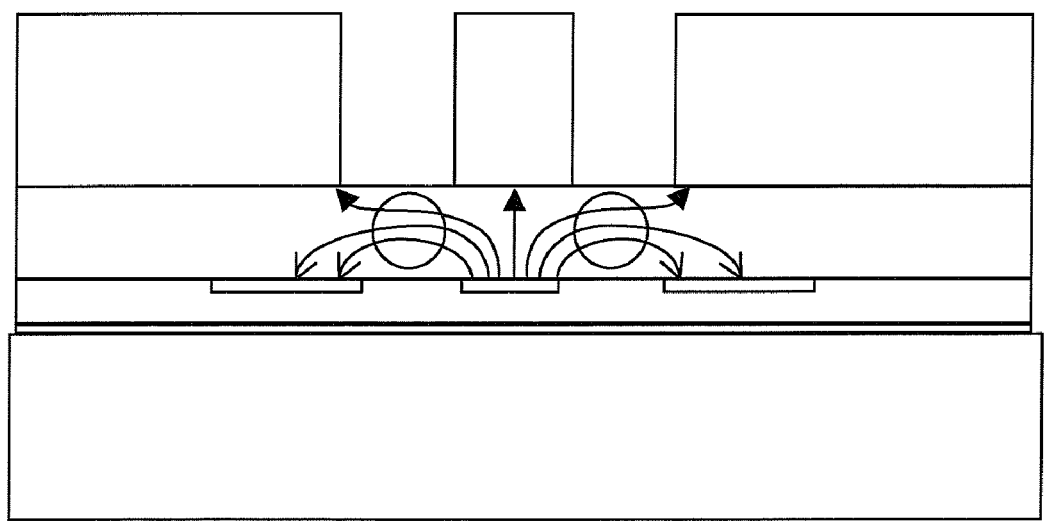

In operation, an RF data signal from a signal generator (not shown) is transmitted through an RF transmission line (e.g., a co-axial cable, not shown) to the signal RF electrode 506. The RF electrodes 505/506 carry the microwave over the interaction distance of the electro-optic device, generating RF electric fields in the optical waveguides 502/503. At the same time, a bias voltage (e.g., a low frequency or DC voltage) is applied (e.g., via a bias control circuit) to the bias electrode 508. The bias voltage generates a DC or low-frequency electric field in the optical waveguides 502/503, the electric field lines of which are illustrated in FIG. 18*b*. Notably, the RF electrodes 505/506 also function as bias ground electrodes in this embodiment. The electric fields generated by both the RF voltage and the bias voltage are used to modulate the optical signals transmitted through the optical waveguides using the electro-optic property of the substrate. More specifically, the electric fields modulate the light propagating in the optical waveguides relative to a predetermined and adjustable bias point about which the swing of the modulated signal is accomplished. The modulation causes the relative velocity of light propagating in the first 502 and second 503 waveguides to change, thus introducing a phase shift. When the electro-optic device is a Mach-Zehnder interferometer, this phase shift produces constructive and/or destructive interference where the two waveguides combine. This interference produces an amplitude modulated optical signal, wherein the modulation corresponds to the original RF data signal.

Advantageously, the electro-optic device illustrated in FIG. 18*a* has the multi-layer electrode structure discussed above, wherein an RF electrode extends over at least part of a bias electrode (e.g., they overlap on a predetermined region of the electro-optic substrate). As a result, the bias electrodes can be positioned close to the electro-optic substrate, but away from the RF electrodes, while still providing a relatively compact device (i.e., compared to electro-optical devices wherein the bias electrodes are in series with the RF electrodes). Moreover, the multi-layer electrode structure allows electric field lines generated by the bias electrode and the RF electrodes to be substantially parallel.

Further advantageously, the electro-optic device illustrated in FIG. 18*a* does not include the upper buffer layer 104*a* illustrated in FIG. 17*a*. As discussed above, buffer layers 104/104*a* are provided for velocity matching (e.g., between the microwave and the optical wave), to increase the characteristic impedance of the RF transmission line, and/or to maintain electrical isolation between the RF and bias electrodes. In the embodiment illustrated in FIG. 18*a*, the thin substrate 501 accomplishes these functions. For example, as is well-known in the art, thin substrates (e.g., 10 μm) can be used instead of buffer layers to provide velocity matching between the microwave and the optical signal and/or to increase the characteristic impedance to greater than about 40 Ohms. Conveniently, reducing the thickness of the substrate also improves the modulation efficiency of the RF electrode 505/506. Thin electro-optic substrates are discussed in further detail in U.S. Pat. Nos. 6,400,494, 6,674,565 and 6,819,851.

Further advantageously, the electro-optic device illustrated in FIG. 18*a* typically includes bias electrodes fabricated from a high resistivity material. As a result, the electro-optic device exhibits improved humidity tolerance. In addition, fabricating the RF electrodes from a high conductivity material and the bias electrodes from a relatively low conductivity, substantially prevents coupling between the bias electrodes and the RF electrodes, across the electro-optic substrate. Notably this is attributed to the fact that the high resistivity materials are typically dielectric and/or transparent at RF frequencies, and conductive at DC or low frequencies.

Figure 19:
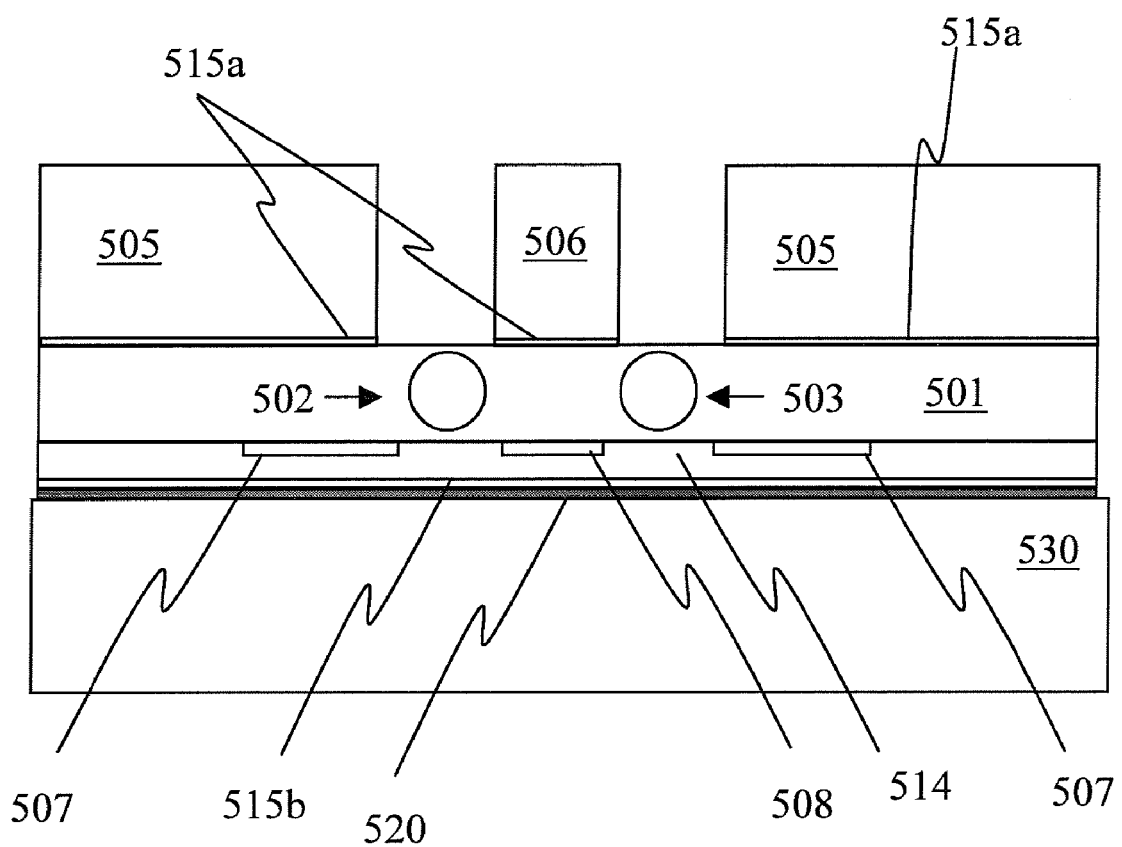
FIG. 19 is a cross-sectional view of an electro-optic device having a thin substrate in accordance with another embodiment of the instant invention.

Referring to FIG. 19, there is shown a cross sectional view of another embodiment of a humidity tolerant electro-optic device. The electro-optic device is similar to that shown in FIG. 18a, but also includes an upper moisture barrier 515a and a lower moisture barrier 515b. The moisture barriers 515a/515b are provided to increase the humidity tolerance of the device. According to one embodiment, the moisture barriers are formed from high resistivity materials such as tantalum silicon nitride ($Ta_xSi_yN_z$), amorphous silicon (Si), etc. These high resistivity moisture barriers may be fabricated from the same materials used to form the high resistivity bias electrodes, or a different material. If the moisture barriers are formed from a high resistivity material, such as $Ta_xSi_yN_z$, it is preferred that the upper moisture barrier 515a be designed to not to cover the optical waveguides (e.g., as shown). As a result, optical loss that would be introduced by the small amount of conductivity of the high resistivity material is minimized. According to another embodiment, the upper moisture barrier 515a is designed to extend over the optical waveguides, but is formed from a material, such as titanium dioxide, alumina, and/or silicon dioxide, that is transparent at optical frequencies.

Advantageously, the moisture barrier material can be selected to promote adhesion of the RF electrodes directly thereto (i.e., in the absence of an adhesion layer or activated surface). For example, if $Ta_xSi_yN_z$ is used to form the moisture barrier, the adhesion layer (e.g., Ti/W) may be eliminated, thus further improving humidity tolerance. Alternatively, an adhesion layer such as Ti/W or Ni is used to promote adhesion of the RF electrodes to the moisture barrier layer, but is encapsulated. Further alternatively, the moisture barrier layer may be activated to promote adhesion of the RF electrodes.

Figure 20:
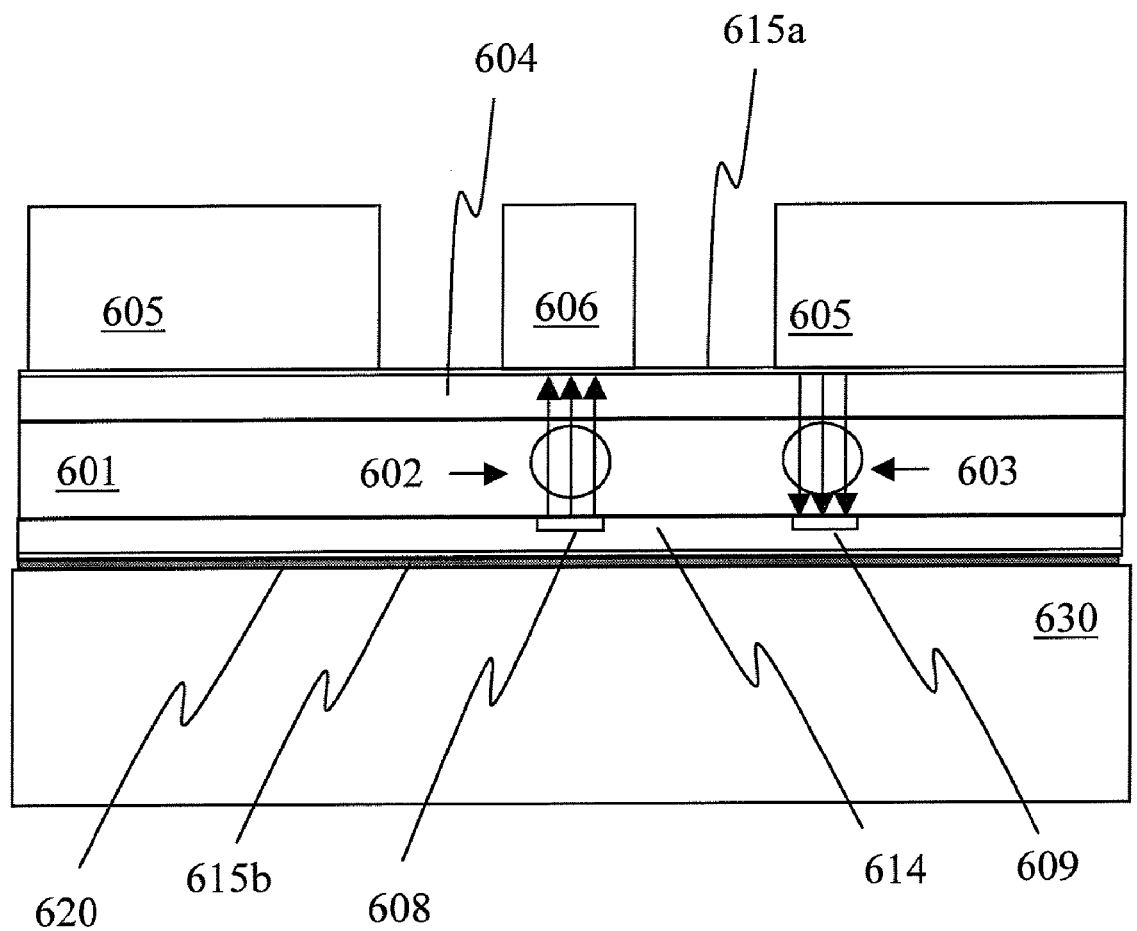
FIG. 20 is a cross-sectional view of an electro-optic device having a thin substrate in accordance with yet another embodiment of the instant invention.

Referring to FIG. 20, there is shown a cross sectional view of another embodiment of a humidity tolerant electro-optic device. Similar to the device shown in FIG. 17b, this electro-optic device includes a thin electro-optic substrate 601, first 602 and second 603 optical waveguides, a first buffer layer 604, ground RF electrodes 605, a signal RF electrode 606, a second buffer layer 614, and a bleed layer 615a. The electro-optic device 600 also includes a first bias signal electrode 608, a second bias signal electrode 609, a second bleed layer 615b, and a supporting substrate 630, which is coupled to the second bleed layer 615b with an adhesive 620.

In this embodiment, the substrate material is shown as Z-cut lithium niobate ($LiNbO_3$). According to other embodiments, the substrate 601 is formed from materials such as InP, etc. While the width and length of the substrate 601 will vary with the design of the device, the thickness of the substrate 601 should be small enough to allow both the high frequency electric fields from the RF electrodes 605/606 and the low frequency or DC fields from the bias electrodes 608/609 to reach the optical waveguides 602/603, and large enough to prevent the bias signal electrodes 608/609 from introducing optical loss. In this embodiment, it is preferred that the thickness of the Z-cut $LiNbO_3$ substrate is below 50 μm, more preferably below 30 μm, and most preferably below 20 μm.

The first 602 and second 603 optical waveguides are embedded within, or otherwise supported by, the substrate 601. The optical waveguides 602/603 are typically fabricated using one of various well-known methods, such as titanium diffusion or proton exchange. For example, according to one embodiment the waveguides 602/603 are formed by patterning titanium in or on a $LiNbO_3$ substrate, followed by subjecting the substrate to increased temperatures to allow the titanium to diffuse therein. The pattern used to form the waveguides 602/603 is dependent on the electro-optic device. For example, if the device is a Mach-Zehnder modulator, then the pattern may be similar to that illustrated in FIG. 2. Alternatively, the pattern is compatible with another device such as a tunable directional coupler. Notably, the optical waveguides 602/603 are typically about 7 μm wide and about 3 μm deep.

The ground RF electrodes 605 and the signal RF electrode 606 are disposed on the upper side of the substrate 601. More specifically, the ground RF electrodes 605 and the signal RF electrode 606, which are supported by an upper surface of the substrate 601, are disposed on the bleed layer 615a, which is disposed on the buffer layer 604. The RF electrodes 605/606 are part of an RF electrode structure used to apply a high-frequency RF voltage across the waveguides. For example, according to one embodiment, the RF electrode structure forms a traveling-wave electrode structure used to propagate a microwave signal that generates an RF electric field in one or both of the optical waveguides. The RF electrodes 605/606 are typically formed from a material that exhibits high electrical conductivity such as gold (Au), copper (Cu), silver (Ag), or platinum (Pt). In general, Au is the most common RF electrode material. Optionally, an adhesion layer is used to promote adhesion of the RF electrodes to the bleed layer. Conventional adhesion layers include thin film layers of chromium (Cr), titanium (Ti), titanium-tungsten (Ti/W), etc. Alternatively, the adhesion layer is formed from nickel (Ni), which has a work function similar to that of Au, to reduce galvanic corrosion. Further alternatively, the adhesion layer is encapsulated as described in U.S. Pat. Appl. No. 20030062551, or eliminated as described in U.S. Pat. No. 6,867,134 by activating the surface. The RF electrodes 605/606 are typically fabricated using one of various well-known methods, including electroplating and sputtering.

The bias signal electrodes 608/609 are disposed on the lower side of the substrate 601. More specifically, the bias signal electrodes 608/609 are supported by a lower surface of the substrate 601. The bias electrodes 608/609 are part of the bias electrode structure used to apply a low-frequency or DC voltage across the optical waveguides 602/603. For example, according to one embodiment, the bias electrodes generate an electric field in one or both of the optical waveguides, thus setting the operating point of the electro-optical device. In this embodiment, the bleed layer 615a and the RF electrodes 605/606 function as the bias ground electrodes. The bias electrodes 608/609 typically are formed from high-resistivity materials such as tantalum silicon nitride ($Ta_xSi_yN_z$), amorphous silicon (Si), indium oxide ($In_2O_3$), etc., to improve humidity tolerance. Suitable resistivity values for the bias electrode material lie between that of the RF electrode material and that of the substrate. For example, tantalum silicon nitride typically has a resistivity in the range of about ~$10^4$ to $10^6$ Ω-cm @25° C., which is between $2.3 \times 10^{-6}$ Ω-cm @25° C. (Au) and ~$1.3 \times 10^{17}$ Ω-cm @25° C. ($LiNbO_3$). Preferably, the resistivity of the bias electrode material is in the range from about 1 to $10^8$ ohm-cm (Ω-cm) @25° C., more preferably from about $10^2$ to $10^7$ ohm-cm (Ω-cm) @25° C., and most preferably from about $10^4$ to $10^6$ ohm-cm (Ω-cm) @25° C. The lower the resistivity of the bias electrode, the more coupling that occurs with the RF signal, potentially increasing the net RF loss per unit length of the RF signal. Optical loss due to the proximity of the bias electrode near the waveguide may also increase with decreasing resistivity. Note that the response time of the bias electrode to an applied voltage is reduced as bias electrode resistivity is lowered. According to one embodiment, the bias electrodes are DC isolated from the RF electrodes to further improve humidity tolerance. One well-known method of providing DC isolation is to use a bias-tee to couple the signal bias electrode 609 and the RF signal electrode 606. Bias electrode 609 is coupled instead of bias electrode 608, due to the polarity inversion caused by the inverted direction of applied electric field. Of course, various other bias control circuits are also envisioned. For example, in one circuit, the slowly varying DC components of the bias signal are passed onto the bias electrodes via a low-pass filter, whereas rapidly varying AC components of the bias signal are applied to the RF electrodes via a high-pass filter. This arrangement boosts the high end frequency response to the incoming bias signal, accommodating dither signals or other tones in the MHz frequency range, that are often summed in with the slowly varying bias voltage.

The lower buffer layer 614 is optionally provided to protect and/or insulate the bias electrodes 608/609. For example, the buffer layer may improve electrical isolation between the bias electrodes 608/609, which otherwise might be compromised by the adhesive layer 620. Accordingly, the buffer layer is typically formed from a non-conductive material such as $SiO_2$, benzocyclobutene (BCB), etc. Notably, the resistivity of conventional $SiO_2$ buffer layers is about $10^{18}$ Ω-cm @25° C. The buffer layer 614 is typically deposited on the lower surface of the substrate such that it substantially covers the bias electrode structure. The buffer layer 614 may be planarized throughout the wafer (e.g., as shown) or patterned with the bias electrode structure.

Since the substrate is fabricated from Z-cut $LiNbO_3$, the RF electrodes 605/606 are typically positioned over the waveguides 603/602 to obtain the required electric field configuration. As a result, the upper buffer layer 604 is typically required to minimize the absorption of the light by the RF electrodes 605/606. Suitable materials for this buffer layer include doped and undoped silicon dioxide, benzocyclobutene (BCB), etc. The buffer layer 604 may be planarized throughout the wafer (e.g., as shown) or patterned with the RF electrode structure.

The top 615a and bottom 615b bleed layers are used to bleed off pyroelectric charge generally associated with Z-cut $LiNbO_3$ substrates. More specifically, the bleed layers 615a/b serve to dissipate surface charges caused by the pyroelectric property of Z-cut $LiNbO_3$. The bleed layers 615a/615b are typically formed from an electrically conductive film. Preferably, the conductive film is sufficiently resistant to prevent shorting out the RF electrodes. Suitable highly resistive materials include semiconductors such as tantalum silicon nitride ($Ta_xSi_yN_z$), amorphous or polycrystalline silicon (Si), silicon titanium oxynitride (SiTiON), etc. In general, the resistivity of the bleed layer will be in the range between about $10^4$ to $10^8$ Ω-cm. Conveniently, when the bleed layer is formed from materials such as $Ta_xSi_yN_z$, the high resistive bleed layer also serves as a moisture barrier that prevents voltage induced ion migration near the bias electrodes, thus improving humidity tolerance of the electro-optic device. In addition, when the bleed layer is formed from a material such as $Ta_xSi_yN_z$, the RF electrodes can be deposited directly on the bleed layer (i.e., in the absence of an adhesive layer or activated surface), thus simplifying the manufacturing process and further improving humidity tolerance.

The supporting substrate 630 is provided to increase the mechanical strength of the device. The supporting substrate is optional, depending on the thickness of the electro-optic substrate 601 and/or the thickness of the buffer layers (e.g., 604/614). The supporting substrate 630 is typically fabricated from a low-dielectric constant (i.e., low epsilon) material such as ceramic, glass, etc. Optionally, the supporting substrate includes solder glass, epoxy, and/or air portions to lower the microwave index of the signal propagating in the RF electrode.

In operation, an RF data signal from a signal generator (not shown) is transmitted through an RF transmission line (e.g., a co-axial cable, not shown) to the signal RF electrode 606. The RF electrodes 605/606 carry the microwave over the interaction distance of the electro-optic device generating RF electric fields in the optical waveguides 602/603. At the same time, a bias voltage (e.g., a low frequency or DC voltage) is applied (e.g., via a bias control circuit) to one of the bias electrodes 608 or 609, or two complementary (push-pull) voltages are applied to bias electrodes 608 and 609. The applied bias voltages generate a DC or low-frequency electric field in the optical waveguides 602/603. Notably, the RF electrodes 605/606 also function as bias ground electrodes in this embodiment. The electric fields generated by both the RF voltage and the bias voltage are used to modulate the optical signals transmitted through the optical waveguides using the electro-optic property of the substrate. More specifically, the electric field modulates light propagating in the optical waveguides relative to a predetermined and adjustable bias point about which the swing of the modulated signal is accomplished. The electric fields causes the relative velocity of light propagating in the first 602 and second 603 waveguides to change, thus introducing a phase shift. When the electro-optic device is a Mach-Zehnder interferometer, this phase shift produces constructive and/or destructive interference where the two waveguides combine. This interference produces an amplitude modulated optical signal, wherein the modulation corresponds to the original RF data signal.

Advantageously, the electro-optic device illustrated in FIG. 20 has the multi-layer electrode structure discussed above, wherein an RF electrode extends over at least part of a bias electrode (e.g., they overlap on a predetermined region of the electro-optic substrate). As a result, the bias electrodes can be positioned close to the electro-optic substrate, but away from the RF electrodes, while still providing a relatively compact device (i.e., compared to electro-optical devices wherein the bias electrodes are in series with the RF electrodes). Moreover, the multi-layer electrode structure allows electric field lines generated by the bias electrode and the RF electrodes to be substantially parallel.

Further advantageously, the electro-optic device illustrated in FIG. 20 typically includes bias electrodes fabricated from a high resistivity material. As a result, the electro-optic device exhibits improved humidity tolerance. In addition, fabricating the RF electrodes from a high conductivity material and the bias electrodes from a relatively low conductivity, substantially prevents coupling between the bias electrodes and the RF electrodes, across the electro-optic substrate. Notably this is attributed to the fact that the high resistivity materials are typically dielectric and/or transparent at RF frequencies, and conductive at DC or low frequencies.

Further advantageously, the electro-optic device illustrated in FIG. 20 does not require split bias electrodes because the thickness of the substrate is selected to be sufficiently large to minimize optical loss introduced by the bias signal electrodes disposed on the lower surface of the substrate. Notably, the waveguides are closer to the top surface of the substrate than the lower surface of the substrate in this embodiment.

Figure 21:
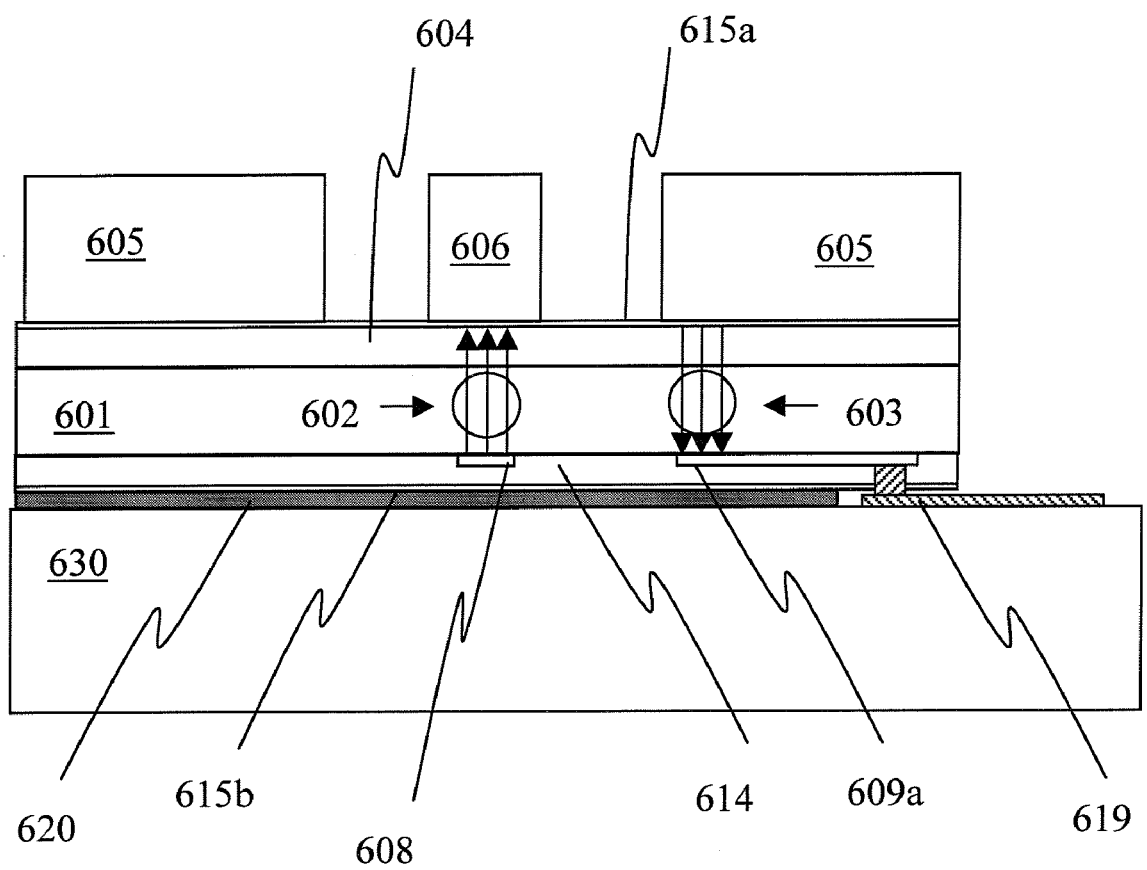
FIG. 21 is a cross-sectional view of an electro-optic device having a thin substrate in accordance with yet another embodiment of the instant invention.

Referring to FIG. 21, there is shown a cross sectional view of another embodiment of a humidity tolerant electro-optic device. The electro-optic device is similar to that shown in FIG. 20, except that the supporting substrate 630 is longer than the electro-optic substrate 601, and that the bias electrode 609a, which is analogous to bias electrode 609, is designed to facilitate connection to a humidity tolerant metal 619, such as Cr or NiCr, deposited and patterned on top of the supporting substrate 630. The bias electrode only needs to extend to the side of substrate 630 in regions where connection to the humidity tolerant metal 619 is needed. Advantageously, positioning the humidity tolerant metal 619 on top of the supporting substrate 630 in regions that will be far away from the RF electrodes 605/606 prevents any coupling to the RF signal. In addition, providing a supporting substrate 630 that is wider than the electro-optic substrate 601 advantageously allows for wire bonding to the humidity tolerant metal layer 619 on top of it.

The thin substrate embodiments discussed with respect to FIGS. 17a/b, 18a/b, 19, 20 and 21 may be fabricated using one of various methods. For example, one method of fabricating the structure in FIG. 21 is to start with a thick z-cut lithium niobate electro-optic substrate (e.g., 1000 μm), and fabricate Ti-diffused waveguides 602/603 therein. The top of the substrate is temporarily bonded to another support substrate (not shown), to allow for lapping and/or polishing of the bottom of the substrate to a predetermined thickness. Once the substrate is thinned, the bias electrode material is deposited and patterned on the bottom of the thin substrate 601 to form the bias electrode structure 608/609a. The buffer 614 and bleed 615b layers are deposited and patterned with vias, to allow for electrical connection of the metal conductor 619 to the bias electrode 609a. Similarly, buffer 614 and bleed 615b layers are patterned with vias to allow connection between bias electrode 608 and another metal conductor (not shown). The humidity tolerant metal 619 is deposited and patterned on top of the supporting 630 in regions that will be far away from the RF electrode, to avoid any coupling to the RF signal. The electro-optic substrate 601, with bias electrodes facing down, is mounted on top of the supporting substrate 630 using an adhesive. In general, the adhesive is not applied to locations where the metal traces on the supporting substrate 601 contact to the bias electrode vias. A soft intermediate metal or conductor such as indium is applied to the via locations, or the via is filled with a metal by other means, to establish connection between the metal traces on the substrate 601 and the bias electrode traces. Once the electro-optic substrate 601 is adhered to the low epsilon substrate 630, the temporary support substrate (not shown) on top of the electro-optic substrate 601 is removed. The buffer layer 604 and bleed layer 615a are deposited on top of the substrate 601. RF electrodes 605/606 are then patterned and electroplated, per conventional fabrication procedures known to one skilled in the art.

Another method of fabricating the structure in FIG. 21 is to start with a thick z-cut lithium niobate electro-optic substrate, and fabricate Ti-diffused waveguides 602/603 therein. The bias electrodes 608/609a are fabricated adjacent the waveguides 602/603, using a split bias electrode design similar to bias electrodes 208/209 shown in FIG. 17b. The buffer 614 and bleed 615b layers are then deposited and patterned on top of the bias electrodes 608/609a with vias, to allow for electrical connection to the bias electrodes 608/609a. The humidity tolerant metal 619 and a second trace (not shown), are deposited and patterned on top of the supporting substrate 630 such that they are far away from the RF electrodes in the final device (i.e., to avoid any coupling to the RF signal). The thick electro-optic substrate, with bias electrodes facing down, is mounted on top of the supporting substrate 630 using an adhesive 620. The adhesive 620 is not applied to locations where the metal traces on the substrate 630 contact to the bias electrode vias. A soft intermediate metal or conductor such as indium is applied to the via locations, or the via is filled with a metal by other means, to establish connection between the metal traces on the supporting substrate 630 and the bias electrode traces 608/609a. Once the thick electro-optic substrate is adhered to the supporting substrate, the electro-optic layer is thinned by lapping and/or polishing. The conductive buffer layer 604 and bleed layer 615a are deposited on top of the substrate 601. RF electrodes 605/606 are then patterned and electroplated, per conventional fabrication procedures known to one skilled in the art.

Figure 22:
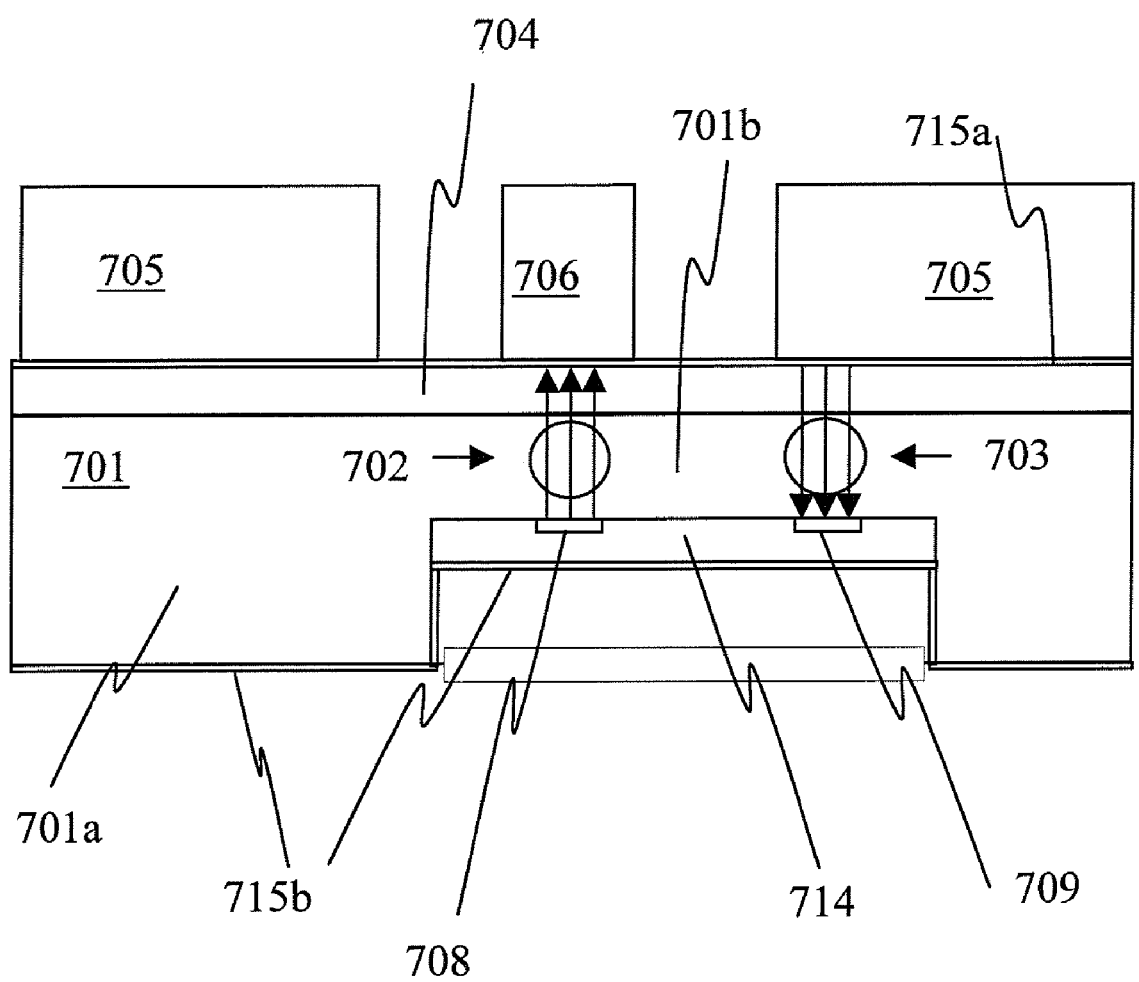
FIG. 22 is a cross-sectional view of an electro-optic device having a thin substrate in accordance with yet another embodiment of the instant invention including a cavity.

Referring to FIG. 22, there is shown a cross sectional view of another embodiment of a humidity tolerant electro-optic device wherein the electro-optic substrate is thin only in the region near the waveguides. The electro-optic device includes an electro-optic substrate 701, first 702 and second 703 optical waveguides, a first buffer layer 704, ground RF electrodes 705, a signal RF electrode 706, a first bleed layer 715a, a second buffer layer 714, a second bleed layer 715b, a first bias signal electrode 708, and a second bias signal electrode 709.

The first optical waveguide 702, the second optical waveguide 703, the first buffer layer 704, the ground RF electrodes 705, the signal RF electrode 706, and the first bleed layer 715a, are analogous to the first optical waveguide 602, the second optical waveguide 603, the first buffer layer 604, the ground RF electrodes 605, the signal RF electrode 606, and the first bleed layer 615a, discussed with respect to FIG. 20, respectively.

The electro-optic substrate 701 includes a thick region 701a and a thin region 701b. In this embodiment, the substrate material is shown as Z-cut lithium niobate (LiNbO$_3$). According to other embodiments, the substrate 701 is formed from materials such as InP, etc. While the width and length of the substrate 701 will vary with the design of the device, the thickness of the thin region 701b should be small enough to allow both the high frequency electric fields from the RF electrodes 705/706 and the low frequency or DC fields from the bias electrodes 708/709 to reach the optical waveguides 702/703. In general, it is preferred that the thickness of the thin region 701b be below 50 μm, more preferably below 30 μm, and most preferably below 20 μm. In contrast, the thickness of the thick region 701a is typically large enough to provide mechanical support, thus reducing the need for an additional supporting substrate. For example, the thickness of the thicker region 701a will typically be in the range of about 200 to 1000 μm. In one embodiment, the substrate 701 is thinned in region 701b by laser ablation. In another embodiment, the substrate is thinned by creating grooves in the back side with a dicing saw. In either instance, the resulting cavity in the electro-optic material may be filled with air, or may be filled with a low epsilon material to further improve mechanical strength.

The bias signal electrodes 708/709 are disposed on the lower side of the substrate 701. More specifically, the bias signal electrodes are supported by a lower surface of the thin region 701b, in the cavity, below the RF electrodes. The bias electrodes 708/709 are part of the bias electrode structure used to apply a low-frequency or DC voltage across the optical waveguides 702/703. For example, according to one embodiment, the bias electrodes generate an electric field in one or both of the optical waveguides, thus setting the operating point of the electro-optical device. In this embodiment, the bleed layer 715a and the RF electrodes 705/706 function as the bias ground electrodes. The bias electrodes 708/709 typically are formed from high-resistivity materials such as tantalum silicon nitride (Ta$_x$Si$_y$N$_z$), amorphous silicon (Si), indium oxide (In$_2$O$_3$), etc., to improve humidity tolerance.

Suitable resistivity values for the bias electrode material lie between that of the RF electrode material and that of the substrate. For example, tantalum silicon nitride typically has a resistivity in the range of about ~$10^4$ to $10^6$ Ω-cm @25° C., which is between 2.3×$10^6$ Ω-cm @25° C. (Au) and ~1.3×$10^{17}$ Ω-cm @25° C. (LiNbO$_3$). Preferably, the resistivity of the bias electrode material is in the range from about 1 to $10^8$ ohm-cm (Ω-cm) @25° C., more preferably from about $10^2$ to $10^7$ ohm-cm (Ω-cm) @25° C., and most preferably from about $10^4$ to $10^6$ ohm-cm (Ω-cm) @25° C. The lower the resistivity of the bias electrode, the more coupling that occurs with the RF signal, potentially increasing the net RF loss per unit length of the RF signal. Optical loss due to the proximity of the bias electrode near the waveguide may also increase with decreasing resistivity. Note that the response time of the bias electrode to an applied voltage is reduced as bias electrode resistivity is lowered.

The upper buffer layer 704 is provided to minimize the absorption of the light by the RF electrodes 705/706. The upper buffer layer thickness depends upon the thickness of the thin section of the electro-optic substrate 701*b*. Suitable materials for the upper buffer layer 704 include doped and undoped silicon dioxide, benzocyclobutene (BCB), etc. The buffer layer 704 may be planarized throughout the wafer (e.g., as shown) or patterned with the RF electrode structure.

The lower buffer layer 714 is optionally provided to protect and/or insulate the bias electrodes 708/709. Accordingly, the buffer layer is typically formed from a non-conductive material such as SiO$_2$, benzocyclobutene (BCB), etc. Notably, the resistivity of conventional doped SiO$_2$ buffer layers is about $10^{17}$ to $10^{19}$ Ω-cm @25° C. Undoped SiO$_2$ buffer layers may have higher resistivity. The buffer layer 714 is typically deposited on the lower surface of the substrate, in the cavity of the electro-optic substrate, such that it substantially covers the lower bias electrode structure. The buffer layer 714 may be planarized throughout the cavity (e.g., as shown) or patterned.

The bottom 715*b* bleed layer is optionally used to bleed off pyroelectric charge and/or function as a moisture barrier. The bleed layer 715*b* is typically formed from an electrically conductive film. Some examples of suitable highly resistive materials include semiconductors such as tantalum silicon nitride (Ta$_x$Si$_y$N$_z$), amorphous or polycrystalline silicon (Si), silicon titanium oxynitride (SiTiON), etc. In general, the resistivity of the bleed layer will be in the range between about $10^4$ to $10^8$ Ω-cm.

According to one embodiment, the cavity and bias electrodes run substantially underneath the RF electrodes for the interaction length of the optical device (e.g., for the length of the parallel interferometric arms if the optical device is a Mach-Zehnder interferometer), and are then routed to the side of the substrate to allow for easier connection to conductors in the package or housing that provide the bias voltages. For example, in one embodiment a spring loaded conductor, or some other conductor, supported within the device housing makes contact with the bias electrodes near the perimeter of the substrate. The operation of the optical device illustrated in FIG. 22 is similar to the operation of the optical device described with regard to FIG. 20.

Advantageously, the electro-optic device illustrated in FIG. 22 has the multi-layer electrode structure discussed above, wherein an RF electrode extends over at least part of a bias electrode (e.g., they overlap on a predetermined region of the electro-optic substrate). As a result, the bias electrodes can be positioned close to the waveguides without interfering with signal propagating in the RF electrodes, resulting in a relatively compact device (i.e., compared to electro-optical devices wherein the bias electrodes are in series with the RF electrodes).

Further advantageously, the electro-optic device illustrated in FIG. 22 typically includes bias electrodes fabricated from a high resistivity material. As a result, the electro-optic device exhibits improved humidity tolerance. In addition, fabricating the RF electrodes from a high conductivity material and the bias electrodes from a relatively low conductivity, substantially prevents coupling between the bias electrodes and the RF electrodes, across the electro-optic substrate. Notably this is attributed to the fact that the high resistivity materials are typically dielectric and/or transparent at RF frequencies, and conductive at DC or low frequencies.

Further advantageously, the thin region 701*b* provides for velocity and impedance matching, thus reducing the required thickness of the upper buffer layer 704, while the thicker portion 701*a* provides mechanical support.

Figure 23:
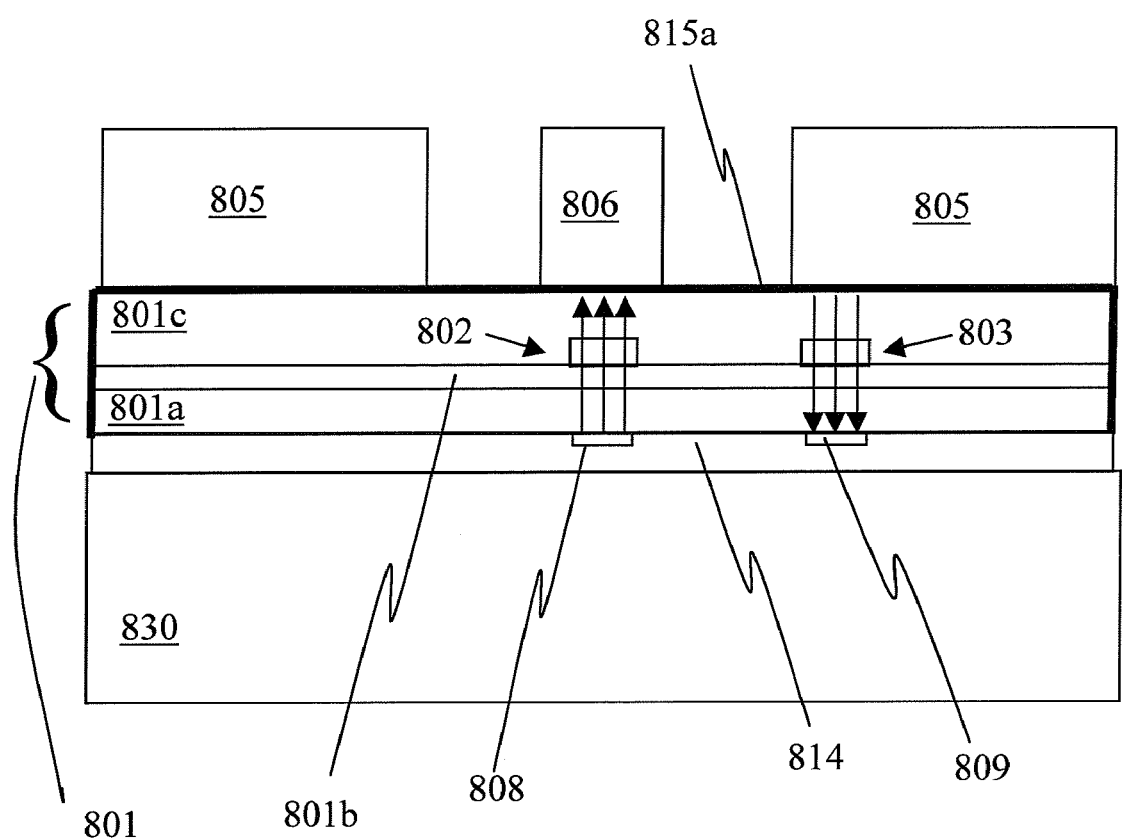
FIG. 23 is a cross-sectional view of an electro-optic device having a thin substrate in accordance with yet another embodiment of the instant invention.

Referring to FIG. 23, there is shown a cross sectional view of another embodiment of a humidity tolerant electro-optic device. The electro-optic device includes a thin substrate 801, first 802 and second 803 optical waveguides, ground RF electrodes 805, a signal RF electrode 806, a buffer layer 814, a first bias signal electrode 808, a second bias signal electrode 809, an optional barrier layer 815*a* that prevents moisture and/or oxygen and/or other elements from the atmosphere from reaching the waveguides, and a supporting substrate 830. The optional barrier layer 815*a* may cover the sides of the substrate 801 as well as the top.

The substrate 801 includes a lower cladding polymer layer 801*a*, an electro-optic polymer layer 801*b* that is etched to form ridges 802 and 803 that form the first 802 and second 803 optical waveguides, and an upper polymer cladding layer 801*c*. While the width and length of the substrate 801 will vary with the design of the device, the thickness of the substrate 801 should be small enough to allow both the high frequency electric fields from the RF electrodes 805/806 and the low frequency or DC fields from the bias electrodes 808/809 to reach the optical waveguides 802/803, and large enough to prevent the bias signal electrodes 808/809 and/or RF electrodes 805/806 from introducing optical loss. In this embodiment, it is preferred that the thickness of the substrate is below 50 μm, more preferably below 30 μm, and most preferably below 20 μm.

The ground RF electrodes 805 and the signal RF electrode 806 are disposed on an upper side of the substrate 801. More specifically, the ground RF electrodes 805 and the signal RF electrode 806 are supported by an upper surface of the substrate 801. The RF electrodes 805/806 are part of an RF electrode structure used to apply a high-frequency RF voltage across the waveguides. For example, according to one embodiment, the RF electrode structure forms a traveling-wave electrode structure used to propagate a microwave signal that generates an RF electric field in one or both of the optical waveguides. The RF electrodes 805/806 are typically formed from a material that exhibits high electrical conductivity such as gold (Au), copper (Cu), silver (Ag), or platinum (Pt). In general, Au is the most common RF electrode material. Optionally, an adhesion layer is used to promote adhesion of the RF electrodes to the upper cladding polymer layer. Conventional adhesion layers include thin film layers of chromium (Cr), titanium (Ti), titanium-tungsten (Ti/W), etc. Alternatively, the adhesion layer is formed from nickel (Ni), which has a work function similar to that of Au, to reduce galvanic corrosion. Further alternatively, the adhesion layer is encapsulated as described in U.S. Pat. Appl. No. 20030062551, or eliminated as described in U.S. Pat. No.

6,867,134 by activating the surface. The RF electrodes 805/806 are typically fabricated using one of various well-known methods, including electroplating and sputtering. The barrier layer 815a is typically formed from tantalum silicon nitride ($Ta_xSi_yN_z$), silicon nitride ($Si_yN_z$) amorphous silicon (Si), doped or undoped silicon dioxide ($SiO_2$), titanium dioxide ($TiO_2$), alumina, or some layered combination of these materials.

The bias signal electrodes 808/809 are disposed on a lower side of the substrate 801. More specifically, the bias signal electrodes 808/809 are disposed between the lower buffer layer 814 and the lower cladding polymer layer. The bias electrodes 808/809 are part of the bias electrode structure used to apply a low-frequency or DC voltage across the optical waveguides 802/803. For example, according to one embodiment, the bias electrodes generate an electric field in one or both of the optical waveguides, thus setting the operating point of the electro-optical device. In this embodiment, the RF electrodes 805/806 function as the bias ground electrodes. The bias electrodes 808/809 typically are formed from high-resistivity materials such as tantalum silicon nitride ($Ta_xSi_yN_z$), amorphous silicon (Si), indium oxide ($In_2O_3$), etc., to improve humidity tolerance. Suitable resistivity values for the bias electrode material lie between that of the RF electrode material and that of the substrate. For example, tantalum silicon nitride typically has a resistivity in the range of about ~$10^4$ to $10^6$ $\Omega$-cm @25° C., which is between 2.3× $10^6$ $\Omega$-cm @25° C. (Au) and ~$1.3 \times 10^{17}$ $\Omega$-cm @25° C. ($LiNbO_3$). Preferably, the resistivity of the bias electrode material is in the range from about 1 to $10^8$ ohm-cm ($\Omega$-cm) @25° C., more preferably from about $10^2$ to $10^7$ ohm-cm ($\Omega$-cm) @25° C., and most preferably from about $10^4$ to $10^6$ ohm-cm ($\Omega$-cm) @25° C. The lower the resistivity of the bias electrode, the more coupling that occurs with the RF signal, potentially increasing the net RF loss per unit length of the RF signal. Optical loss due to the proximity of the bias electrode near the waveguide may also increase with decreasing resistivity. Note that the response time of the bias electrode to an applied voltage is reduced as bias electrode resistivity is lowered. According to one embodiment, the bias electrodes are DC isolated from the RF electrodes to further improve humidity tolerance. One well-known method of providing DC isolation is to use a bias-tee to couple the signal bias electrode 808 and the RF signal electrode 806. Of course, various other bias control circuits are also envisioned. For example, in one circuit, the slowly varying DC components of the bias signal are passed onto the bias electrodes via a low-pass filter, whereas rapidly varying AC components of the bias signal are applied to the RF electrodes via a high-pass filter. This arrangement boosts the high end frequency response to the incoming bias signal, accommodating dither signals or other tones in the MHz frequency range, that are often summed in with the slowly varying bias voltage.

The lower buffer layer 814 is optionally provided to protect and/or insulate the bias electrodes 808/809. For example, the buffer layer may improve electrical isolation between the bias electrodes 808/809. Accordingly, the buffer layer is typically formed from a non-conductive material such as $SiO_2$, benzocyclobutene (BCB), etc. Notably, the resistivity of conventional doped $SiO_2$ buffer layers is about $10^{17}$ to $10^{19}$ $\Omega$-cm @25° C. Undoped $SiO_2$ buffer layers may have higher resistivity. The buffer layer 814 is typically disposed adjacent the lower cladding polymer layer of the substrate such that it substantially covers the lower bias electrode structure. The buffer layer 814 may be planarized throughout the wafer (e.g., as shown) or patterned.

The supporting substrate 830 is provided to increase the mechanical strength of the device and/or is used for manufacturing purposes. For example, one method of fabricating the electro-optic device is as follows. A humidity tolerant metal (not shown) is first deposited on the supporting substrate 830. The non-conductive buffer 814 is then deposited on top of the supporting substrate and vias are formed and filled with metal or some other conductor to allow for connection to the humidity tolerant metal (not shown). The bias electrodes 808/809 are then deposited and patterned on top of the non-conductive buffer layer 814. The bottom cladding polymer layer is then deposited on top of the structure. An electro-optically active polymer that also acts as the waveguide core is deposited and patterned. The top cladding polymer layer is then deposited. The resulting structure may be planar (i.e., as illustrated in FIG. 23) or may not be planar. The RF electrodes are then patterned and electroplated on the substrate 801, per conventional procedures.

Advantageously, the electro-optic device illustrated in FIG. 23 has the multi-layer electrode structure discussed above, wherein an RF electrode extends over at least part of a bias electrode (e.g., they overlap on a predetermined region of the substrate). As a result, the bias electrodes can be positioned close to the waveguides without interfering with signal propagating in the RF electrodes, resulting in a relatively compact device (i.e., compared to electro-optical devices wherein the bias electrodes are in series with the RF electrodes).

Further advantageously, the electro-optic device illustrated in FIG. 23 typically includes bias electrodes fabricated from a high resistivity material. As a result, the electro-optic device exhibits improved humidity tolerance. In addition, fabricating the RF electrodes from a high conductivity material and the bias electrodes from a relatively low conductivity, substantially prevents coupling between the bias electrodes and the RF electrodes, across the substrate. Notably this is attributed to the fact that the high resistivity materials are typically dielectric and/or transparent at RF frequencies, and conductive at DC or low frequencies.

Further advantageously, the electro-optic device illustrated in FIG. 23 does not require an upper buffer layer (e.g., like 614) because the upper cladding polymer layer functions as a buffer layer. For example, the upper cladding polymer layer, which is typically formed from a low epsilon material, provides velocity and impedance matching. In addition, bleed layers (e.g., like 615a/615b are not required, because the polymeric substrate is not pyroelectric. Optionally, the polymer core and/or cladding layers are provided with some conductivity, or matched conductivities, in order to prevent any charging effects.

Figure 24:
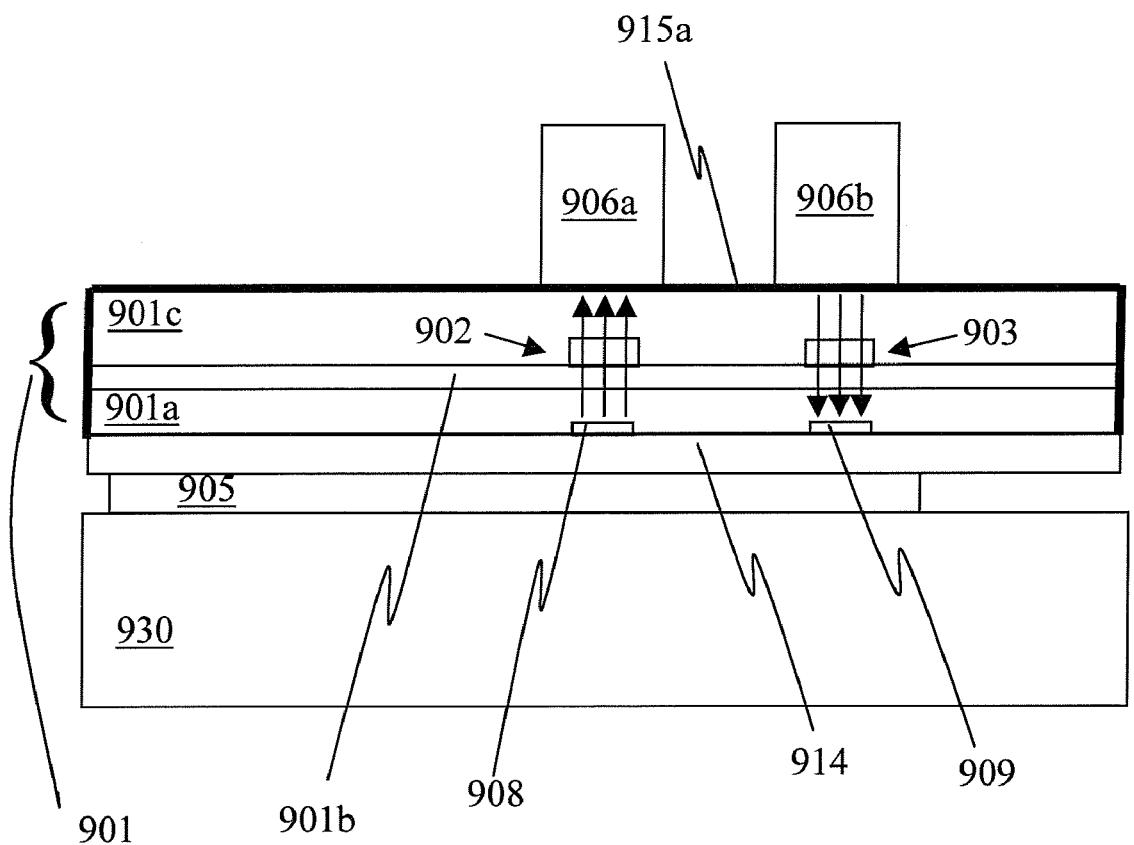
FIG. 24 is a cross-sectional view of an electro-optic device having a thin substrate in accordance with yet another embodiment of the instant invention.

FIG. 24 shows yet another embodiment of the instant invention. The electro-optic device illustrated in FIG. 24 is similar to that shown in FIG. 23 except that RF ground electrode 905 is disposed below substrate 901, and on top of supporting substrate 930. Note that the ground electrode 905 is pulled back slightly on the right side, to provide room for humidity tolerant metal traces (not shown) similar to those described with reference to FIG. 21. In addition, there are two RF signal electrodes, 906a and 906b, that provide modulation to rib waveguides 902 and 903, respectively. The two RF signal electrodes are operated in a push-pull differential fashion, sometimes referred to as "dual-drive". The bias electrodes 908/909, substrate 901 with all of its layers 901a, 901b, 901c, and optional barrier layer 915a are analogous to bias electrodes 808/809, substrate 801 with all of its layers 801a, 801b, 801c, and optional barrier layer 815a, discussed with regard to FIG. 23.

The supporting substrate 930 is provided to increase the mechanical strength of the device and/or is used for manufacturing purposes. For example, one method of fabricating the electro-optic device is as follows. Ground electrode 905 is deposited or plated onto supporting substrate 930. A humidity tolerant metal (not shown) is deposited on the supporting substrate 930 away from the ground electrode. A non-conductive buffer 914 is then deposited on top of the supporting substrate 930 and vias are formed and filled with metal or some other conductor to allow for connection between the humidity tolerant metal (not shown) and the bias electrodes 908/909. The bias electrodes 908/909 are then deposited and patterned on top of the non-conductive buffer layer 914. The bottom cladding polymer layer is then deposited on top of the structure. The top side of the bottom cladding layer may be planar as shown in FIG. 24, or may have a bump in the region where the bias electrodes as deposited. An electro-optically active polymer that also acts as the waveguide core is deposited and patterned and/or etched to form the ridges that form the waveguides. The top cladding polymer layer is then deposited. The resulting structure may be planar (i.e., as illustrated in FIG. 24) or may not be planar. The RF signal electrodes 906a and 906b are patterned and electroplated on the substrate 901, per conventional procedures.

According to another embodiment of the instant invention an optical device that is similar to the optical device illustrated in FIG. 24 is fabricated using an electro-optic substrate. More specifically, the electro-optic polymer layer 901b is replaced with an electro-optic substrate (e.g., a Z-cut lithium niobate), and the cladding layers 901a/901c are replaced with buffer layers (e.g., $SiO_2$). As illustrated in FIG. 24, the electro-optic substrate is patterned to include ridge waveguides 902/903.

Figure 25:
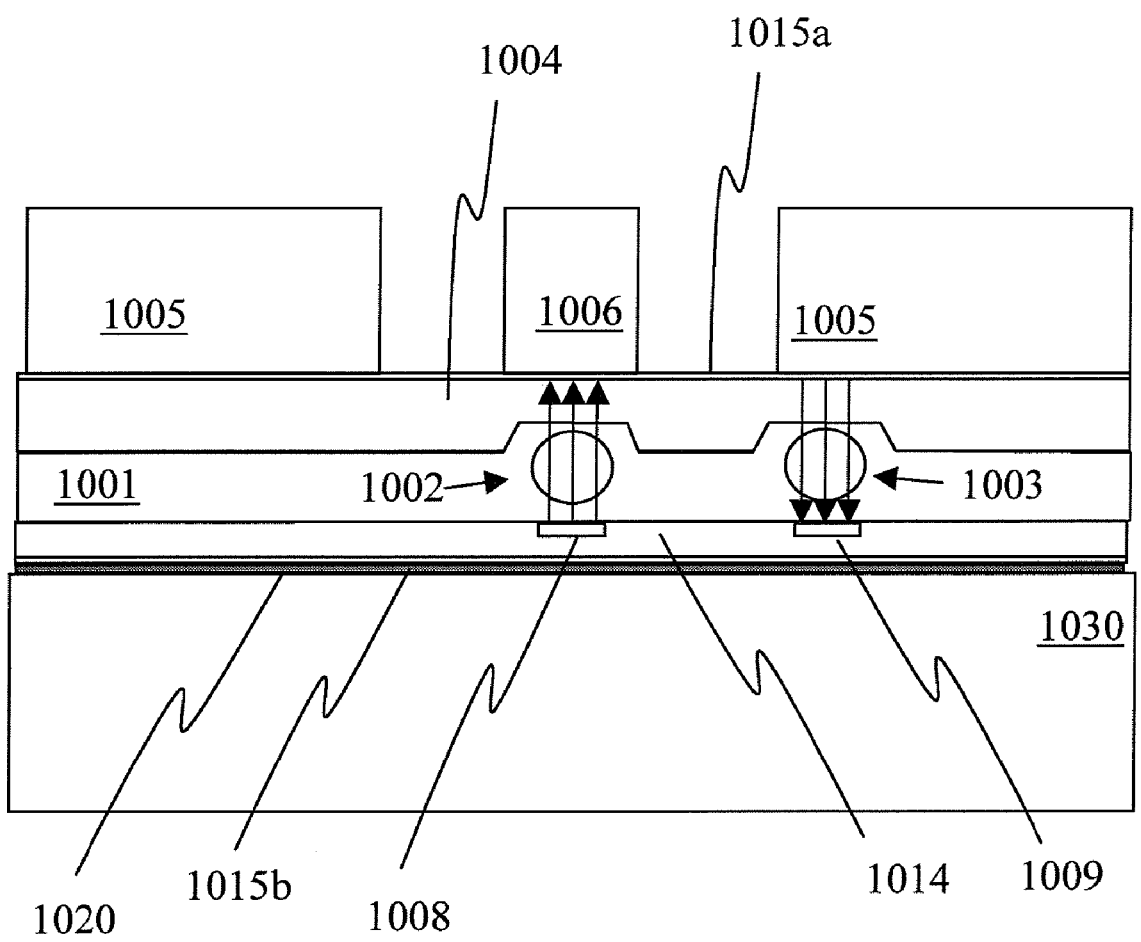
FIG. 25 is a cross-sectional view of an electro-optic device having a thin substrate in accordance with yet another embodiment of the instant invention.

Referring to FIG. 25, there is shown an electro-optic device in accordance with another embodiment of the instant invention. The electro-optic device is similar to that described with reference to FIG. 20, except that the substrate 1001 includes ridges in the vicinity of the waveguides 1002/1003. The RF electrodes 1005/1006, bias electrodes 1008/1009, buffer layers 1004 and 1014, bleed layers 1015a and 1015b, adhesive 1020, and supporting substrate 1030 are analogous to RF electrodes 605/606, bias electrodes 608/609, buffer layers 604 and 614, bleed layers 615a and 615b, adhesive 620, and supporting substrate 630, respectively. The fabrication of the structure shown in FIG. 25 is also similar to that described with regards to FIG. 20, except that substrate 1001 is etched or patterned some other way to produce the ridges in the locations of the waveguides 1002 and 1003. Advantageously, the ridges reduce the voltage that needs to be applied to the RF electrode to achieve a given amount of modulation. In addition, the buffer layer 1004 in FIG. 25 may be thinner than buffer layer 604 shown in FIG. 20, assuming that they are made of the same material.

In each of the above embodiments the barrier layers (e.g., 215, 515a, 615a, 715a, 815a, 915a, and 1015a) not only function as bleed layers and/or moisture barriers, but also protect the substrate from other contaminants. For example, the barrier layers may prevent moisture, oxygen, and/or other elements in the atmosphere from reaching the waveguides. The moisture/atmospheric barriers 815a and 915a illustrated in FIGS. 23 and 24 are particularly beneficial, since oxygen is known to be a major cause of degradation of electro-optic polymer devices. Accordingly, the instant invention provides both humidity tolerant and atmospheric tolerant electro-optic devices.

In addition, since these barrier layers are optionally selected from materials that provide good adhesion for the highly conductive metal RF electrodes, the manufacturing process is significantly simplified (e.g., adhesion layers and/or activated surfaces are not required to improve adhesion). For example, when the barrier layer is formed from $Ta_xSi_yN_z$, the RF electrodes can be deposited directly on the barrier layer (i.e., in the absence of a metal adhesion layer). Furthermore, when the bias electrode structure and barrier layers are fabricated from the same materials (e.g., $Ta_xSi_yN_z$), the fabrication process is further simplified.

Of course, the embodiments of the invention described above have been presented by way of example only. It will be understood by those skilled in the art that various omissions and substitutions may be made without departing from the spirit and scope of the invention as defined by the appended claims.

We claim:

1. An electro-optic device comprising:
   a substrate having at least one optical waveguide formed therein;
   an RF electrode structure disposed for generating an RF electric field in the at least one optical waveguide, the RF electrode structure including a first RF electrode disposed on a first side of the substrate, the first RF electrode comprising a first material having a first resistivity; and
   a bias electrode structure disposed for generating a low frequency or DC electric field in the at least one optical waveguide, the bias electrode structure including a first bias electrode disposed on a second side of the substrate, the first bias electrode comprising a second material having a second resistivity,
   wherein the first side is opposite the second side, and wherein the second resistivity is substantially higher than the first resistivity.

2. An electro-optic device according to claim 1, wherein a thickness of the substrate in a vicinity of the at least one waveguide is selected such that the RF electric field generated by the RF electrode structure and the low frequency or DC electric field generated by the bias electrode structure both reach the at least one optical waveguide.

3. An electro-optic device according to claim 2, wherein the thickness of the substrate in a vicinity of the at least one waveguide is less than about 20 microns.

4. An electro-optic device according to claim 3, wherein the substrate comprises an electro-optic substrate having a cavity, and wherein the first bias electrode is disposed within the cavity.

5. An electro-optic device according to claim 1, wherein the first bias electrode comprises a signal bias electrode, the first RF electrode comprises a signal RF electrode, and the RF electrode structure further comprises at least one RF ground electrode.

6. An electro-optic device according to claim 5, comprising a first buffer layer disposed on the second side, and substantially protecting the signal bias electrode.

7. An electro-optic device according to claim 6, comprising a supporting substrate for providing mechanical strength to the substrate, the supporting substrate coupled to the first buffer layer.

8. An electro-optic device according to claim 6, comprising a first barrier layer disposed on the first side, the first barrier layer disposed between the substrate and the signal RF electrode.

9. An electro-optic device according to claim 8, comprising a second barrier layer disposed on the second side, the second barrier layer substantially protecting the first buffer layer.

10. The electro-optic device according to claim 9, wherein the substrate comprises X-cut lithium niobate.

11. The electro-optic device according to claim 6, comprising a second buffer layer disposed on the first side, the second buffer layer disposed between the substrate and the signal RF electrode.

12. An electro-optic device according to claim 11, comprising a first bleed layer disposed on the first side, the first bleed layer disposed between the second buffer layer and the signal RF electrode.

13. An electro-optic device according to claim 12, wherein the signal RF electrode is deposited directly on the first bleed layer.

14. An electro-optic device according to claim 12, comprising a second bleed layer disposed on the second side, the second bleed layer substantially protecting the first buffer layer.

15. An electro-optic device according to claim 12, wherein the substrate comprises Z-cut lithium niobate.

16. The electro-optic device according to claim 15, wherein the at least one optical waveguide includes a first waveguide segment and a second waveguide segment, the first waveguide segment substantially parallel to the second waveguide segment, and wherein the signal bias electrode comprises a first signal bias electrode segment and a second signal bias electrode segment, the first signal bias electrode segment disposed to one side of the first waveguide segment, the second signal bias electrode segment disposed to an opposite side of the first waveguide segment.

17. The electro-optic device according to claim 15, wherein a thickness of the substrate is selected such that the signal bias electrode does not introduce a significant amount of optical loss to an optical signal propagating through the at least one optical waveguide.

18. An electro-optic device according to claim 6, wherein the substrate comprises a polymer having an electro-optic portion.

19. The electro-optic device according to claim 1, wherein the first bias electrode is in substantial alignment with the first RF electrode.

20. The electro-optic device according to claim 1, wherein the first RF electrode is an RF signal electrode and the first bias electrode is a bias signal electrode, and wherein the RF signal electrode is coupled to the bias signal electrode via a bias-tee.

21. The electro-optic device according to claim 1, wherein the electro-optic device comprises a Mach-Zehnder optical modulator.

22. The electro-optic device according to claim 1, wherein the first bias electrode comprises tantalum silicon nitride.

23. The electro-optic device according to claim 22, wherein the first RF electrode comprises gold.

24. An electro-optic device comprising:
a substrate;
an RF electrode structure supported by the substrate, the RF electrode structure disposed for receiving an RF signal for generating an RF electric field in at least one optical waveguide supported by the substrate, the RF electrode structure including a signal RF electrode; and
a bias electrode structure supported by the substrate, the bias electrode structure disposed for receiving a bias signal for generating a low frequency or DC electric field in the at least one optical waveguide, the bias electrode structure including a signal bias electrode,
wherein the signal bias electrode is DC isolated from the signal RF electrode,
wherein the signal bias electrode comprises a material having a higher resistivity than a material used to form the signal RF electrode, and
wherein the RF electrode structure and the bias electrode structure are arranged such that a line substantially perpendicular to a plane of the substrate passes through both the signal RF electrode and the signal bias electrode.

25. An electro-optic device according to claim 24, comprising a tantalum silicon nitride layer disposed between the signal RF electrode and the substrate, and wherein the signal RF electrode is deposited directly on the tantalum silicon nitride layer.

* * * * *